United States Patent
Li et al.

(10) Patent No.: US 11,516,731 B2
(45) Date of Patent: Nov. 29, 2022

(54) IDENTIFIER ALLOCATION METHOD AND APPARATUS

(71) Applicant: Huawei Technologies Co., Ltd., Shenzhen (CN)

(72) Inventors: Xiaojuan Li, Beijing (CN); Guowei Ouyang, Beijing (CN); Yiru Kuang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/290,574

(22) PCT Filed: Nov. 1, 2019

(86) PCT No.: PCT/CN2019/114925
§ 371 (c)(1),
(2) Date: Apr. 30, 2021

(87) PCT Pub. No.: WO2020/088625
PCT Pub. Date: May 7, 2020

(65) Prior Publication Data
US 2022/0007270 A1    Jan. 6, 2022

(30) Foreign Application Priority Data
Nov. 2, 2018    (CN) .......................... 201811303111.4

(51) Int. Cl.
*H04W 8/22*    (2009.01)
*H04W 48/14*    (2009.01)
(Continued)

(52) U.S. Cl.
CPC .......... *H04W 48/14* (2013.01); *H04W 8/005* (2013.01); *H04W 8/245* (2013.01)

(58) Field of Classification Search
CPC ........ H04W 8/005; H04W 8/245; H04W 8/22
See application file for complete search history.

(56) References Cited

U.S. PATENT DOCUMENTS

| 2015/0208456 A1 | 7/2015 | Guo et al. |
| 2019/0174364 A1 | 6/2019 | Jin et al. |

(Continued)

FOREIGN PATENT DOCUMENTS

| CN | 101155068 A | 4/2008 |
| CN | 101155368 A | 4/2008 |

(Continued)

OTHER PUBLICATIONS

R2-1814604, Huawei, et al., "Signalling procedure for UE capability ID report," 3GPP TSG-RAN WG2 # 103bis, Chengdu, China, Oct. 8-12, 2018, 4 pages.
(Continued)

*Primary Examiner* — Barry W Taylor
(74) *Attorney, Agent, or Firm* — Conley Rose, P.C.

(57) ABSTRACT

An identifier allocation method includes receiving, by a first core network device, a first request from a terminal device, allocating, by the first core network device, a first capability information identifier, and sending, by the first core network device, a first response to the terminal device, where the first response carries the first capability information identifier.

20 Claims, 31 Drawing Sheets

(51) Int. Cl.
*H04W 8/00* (2009.01)
*H04W 8/24* (2009.01)

(56) References Cited

U.S. PATENT DOCUMENTS

| | | | | |
|---|---|---|---|---|
| 2019/0313239 | A1* | 10/2019 | Horn | H04W 8/20 |
| 2021/0160685 | A1* | 5/2021 | Ke | H04W 8/22 |
| 2021/0297849 | A1* | 9/2021 | Alnås | H04W 8/24 |
| 2021/0360391 | A1* | 11/2021 | Gao | H04W 76/10 |
| 2022/0070661 | A1* | 3/2022 | Liu | H04L 12/00 |

FOREIGN PATENT DOCUMENTS

| | | |
|---|---|---|
| CN | 101489218 A | 7/2009 |
| CN | 102300268 A | 12/2011 |
| CN | 102958107 A | 3/2013 |
| CN | 107734569 A | 2/2018 |
| EP | 2741541 A1 | 7/2012 |
| WO | 2014047949 A1 | 4/2014 |
| WO | 2018174995 A1 | 9/2018 |

OTHER PUBLICATIONS

S2-188588 (was S2-186551), Qualcomm Incorporated, "Solution for how are the UE radio capabilities managed and signalled," SA WG2 Meeting #128bis, Aug. 20-24, 2018, Sophia Antipolis, France, 4 pages.
S2-183535, Qualcomm Incorporated, "Optimisation of UE radio capability signalling," SA WG2 Meeting #127, Apr. 16-20, 2018, Sanya, P.R.China, 7 pages.
S2-1810976, Nokia, et al., Network based control of UE radio capabilities sending and UE Capability ID allocation., SA WG2 Meeting #129, Dongguan, China, Oct. 15-19, 2018, 10 pages.
S2-188641, Vivo, "Update Key Issue #2 and Solution on how to collect the mapping of the UE capability ID and UE radio capabilies," SA WG2 Meeting #128-bis, Aug. 20-24, 2018, Sophia Antipolis, France, 4 pages.

* cited by examiner

```
Terminal        Access network      First core network                        Second core network
device          device              device                                    device
  |               |                   |                                         |
  | 2601. Send a first request, where the first request                         |
  |   carries a first globally unique temporary identity                        |
  |------------->|------------------>|                                          |
  |               |                   | 2602. Send a second request,            |
  |               |                   |  where the second request carries       |
  |               |                   |   the first globally unique             |
  |               |                   |        temporary identity               |
  |               |                   |----------------------------------------->|
  |               |                   |                                         |
  |               |                   |      2603. Query a mapping relationship |
  |               |                   |      between capability information and |
  |               |                   |         an identifier for an identifier set
  |               |                   |         corresponding to the first globally
  |               |                   |              unique temporary identity  |
  |               |                   |                                         |
  |               |                   | 2604. Send a second response,           |
  |               |                   |  where the second response              |
  |               |                   |    includes the identifier set          |
  |               |                   |<-----------------------------------------|
  |               |                   |                                         |
  |               |                   | 2605. Allocate at least one second      |
  |               |                   |  capability information identifier to the
  |               |                   |            terminal device              |
  |               |                   |                                         |
  |               |                   | 2606. Send a correspondence             |
  |               |                   |   between the second capability         |
  |               |                   |  information identifier and a first     |
  |               |                   | capability information identifier       |
  |               |                   |       that needs to be replaced         |
  |               |                   |----------------------------------------->|
  |               |                   |                                         |
  |    2607. Send a first response, where the first response                    |
  |     carries the correspondence between the second                           |
  |      capability information identifier and the first capability             |
  |       information identifier that needs to be replaced                      |
  |<-----------------------------------|                                        |
  |               |                   |                                         |
  |                                   | 2608. Replace, with the second          |
  |                                   |   capability information identifier, a  |
  |                                   |    corresponding first capability       |
  |                                   |   information identifier in a mapping   |
  |                                   |    relationship between capability      |
  |                                   |        information and an identifier    |
  |                                                                             |
2609. Replace, with the second
  capability information identifier, a
    corresponding first capability
  information identifier in a mapping
    relationship between capability
      information and an identifier
```

FIG. 26

IDENTIFIER ALLOCATION METHOD AND APPARATUS

CROSS-REFERENCE TO RELATED APPLICATIONS

This application is a U.S. National Stage of International Patent Application No. PCT/CN2019/114925 filed on Nov. 1, 2019, which claims priority to Chinese Patent Application No. 201811303111.4 filed on Nov. 2, 2018. Both of the aforementioned applications are hereby incorporated by reference in their entireties.

TECHNICAL FIELD

This application relates to the field of communication technologies, and in particular, to an identifier allocation method and apparatus.

BACKGROUND

In a communication system, an access network device needs to obtain capability information of a terminal device, and further perform a corresponding communication procedure based on the capability information of the terminal device. For example, the capability information of the terminal device may include a baseband processing capability of the terminal device, a supported modulation and coding scheme, and the like.

Usually, the terminal device sends a registration request to a core network device. For example, the core network device may be an access and mobility management function (access and mobility management function, AMF) entity or the like. After receiving the registration request, the core network device detects whether the core network device stores the capability information of the terminal device. If no capability information of the terminal device exists, the capability information is obtained from the terminal device. The terminal device sends the capability information to the access network device. After receiving the capability information, the access network device stores the capability information, and sends the capability information to the core network device. After receiving the capability information, the core network device stores the capability information, so that the capability information may be sent to another access network device later.

As a length of the capability information of the terminal device increases, a size of the capability information exceeds a transmission capability of an air interface or an interface between the access network device and the core network device. Therefore, how to save transmission resources for transmitting capability information is an urgent problem to be resolved at present.

SUMMARY

Embodiments of this application provide an identifier allocation method and apparatus, to help save transmission resources for transmitting capability information.

According to a first aspect, an embodiment of this application provides an identifier allocation method. The method includes: receiving, by a first core network device, a first request from a terminal device; allocating, by the first core network device, a first capability information identifier; and sending, by the first core network device, a first response to the terminal device, where the first response carries the first capability information identifier. Based on this method, the first core network device can allocate a capability information identifier to the terminal device, so that the terminal device can send the capability information identifier instead of capability information to another device, thereby helping save transmission resources tor transmitting the capability information.

Optionally, the first core network device may further perform the following steps: receiving, by the first core network device, a second request from the terminal device; allocating, by the first core network device, a capability information identifier count to the terminal device; and sending, by the first core network device, a second response to the terminal device, where the second response carries the capability information identifier count. Based on this optional manner, capability information identifiers stored by the terminal device can be limited, to prevent the terminal device from applying to the first core network device for a large quantity of capability information identifiers and causing a waste of capability information identifiers.

Optionally, the first request carries a first indication, and the first indication is used to set capability information of the terminal device. Optionally, the first indication is used to indicate to add storage of a group of capability information of the terminal device.

Optionally, the first request carries first capability information of the terminal device, and a specific implementation of allocating, by the first core network device, a first capability information identifier is: allocating, by the first core network device, the first capability information identifier to the first capability information. Based on this optional manner, the first capability information is carried in the first request, so that the first core network device can receive the first capability information more quickly.

Optionally, the first core network device may further perform the following steps: sending, by the first core network device, a third request to an access network device; receiving, by the first core network device, first capability information of the terminal device from the access network device; and a specific implementation of allocating, by the first core network device, a first capability information identifier is: allocating, by the first core network device, the first capability information identifier to the first capability information. Based on this optional manner, the first core network device can obtain the first capability information, to allocate an identifier to the first capability information.

Optionally, the first core network device stores a mapping relationship between the first capability information and the first capability information identifier into a second core network device. Based on this optional manner, the first core network device stores the mapping relationship between the first capability information and the first capability information identifier into the second core network device, thereby helping reduce storage pressure of the first core network device.

Optionally, the first core network device may further perform the following steps: receiving, by the first core network device, a fifth request from the terminal device, where the fifth request carries a fifth capability information identifier, and the fifth capability information identifier is an identifier corresponding to capability information that the terminal device needs to use; sending, by the first core network device, a sixth request to the second core network device, where the sixth request carries the fifth capability information identifier; receiving, by the first core network device, a sixth response from the second core network device, where the sixth response includes the capability information corresponding to the fifth capability information identifier; and sending, by the first core network device, the capability information corresponding to the fifth capability information identifier to the access network device. Based on this optional manner, when the terminal device needs to use a group of capability information, the terminal device may send a capability information identifier instead of the capability information to the first core network device without directly sending the capability information that needs to be used to the first core network device, thereby saving transmission resources for transmitting the capability information.

Optionally, a specific implementation of sending, by the first core network device, a sixth request to the second core network device is: sending the sixth request to the second core network device when the capability information corresponding to the fifth capability information identifier does not exist in a preset database of the first core network device, where the preset database stores a preconfigured mapping relationship between capability information and an identifier; and obtaining the capability information corresponding to the fifth capability information identifier from the preset database when the capability information corresponding to the fifth identifier exists in the preset database, and sending the capability information corresponding to the fifth capability information identifier to the access network device. Based on this implementation, capability information corresponding to the fifth capability information identifier can be quickly obtained.

Optionally, the second core network device stores mapping relationships between at least two groups of capability information of the terminal device and identifiers. The second core network device stores mapping relationships between at least two groups of capability information of the terminal device and identifiers, so that the terminal device can be prevented from reapplying to the first core network device for allocation of a capability information identifier each time the terminal device switches used capability information.

Optionally, the first core network device may alternatively store a mapping relationship between the first capability information and the first capability information identifier. Based on this optional manner, the first core network device can store the mapping relationship between the first capability information and the first capability information identifier into the first core network device, to help subsequently obtain the first capability information.

Optionally, the first core network device may further perform the following steps: receiving, by the first core network device, a fifth request from the terminal device, where the fifth request carries a fifth capability information identifier, and the fifth capability information identifier is an identifier corresponding to capability information that the terminal device needs to use; and sending, by the first core network device, the capability information corresponding to the fifth capability information identifier to the access network device. Based on this optional manner, when the terminal device needs to use a group of capability information, the terminal device may send a capability information identifier instead of the capability information to the first core network device without directly sending the capability information that needs to be used to the first core network device, thereby saving transmission resources for transmitting the capability information.

Optionally, the first core network device stores mapping relationships between at least two groups of capability information of the terminal device and identifiers. The first core network device stores mapping relationships between at least two groups of capability information of the terminal device and identifiers, so that the terminal device can be prevented from reapplying to the first core network device tor allocation of a capability information identifier each time the terminal device switches used capability information.

Optionally, the first core network device may further allocate a capability information identifier count to the terminal device, and the first response further includes the capability information identifier count. Based on this optional manner, capability information identifiers stored by the terminal device can be limited, to prevent the terminal device from applying to the first core network device for a large quantity of capability information identifiers and causing a waste of capability information identifiers.

Optionally, the first request carries an indication indicating that the terminal device supports radio capability signaling.

According to a first aspect, an embodiment of this application provides an identifier allocation method, applicable to a terminal device, where a plurality of groups of capability information are configured on the terminal device, and the method includes: sending, by the terminal device, a first request to a first core network device; and receiving, by the terminal device, a first response from the first core network device, where the first response carries a first capability information identifier.

Optionally, the terminal device may further perform the following steps: sending, by the terminal device, a second request to the first core network device; receiving, by the terminal device, a second response from the first core network device, where the second response carries a capability information identifier count.

Optionally, the first request carries a first indication, and the first indication is used to set capability information of the terminal device.

Optionally the setting capability information of the terminal device includes an addition operation. Optionally, the first indication is used to indicate to add storage of a group of capability information of the terminal device.

Optionally, the first request carries first capability information of the terminal device.

Optionally, the terminal device may further perform the following steps: receiving, by the terminal device, a fourth request from an access network device; and sending, by the terminal device, first capability information to the access network device.

Optionally, the terminal device may further store a mapping relationship between the first capability information and the first capability information identifier.

Optionally, the terminal device may further send a fifth request to the first core network device, where the fifth request carries a fifth capability information identifier, and the fifth capability information identifier is an identifier corresponding to capability information that the terminal device needs to use.

Optionally, the terminal device stores mapping relationships between at least two groups of capability information of the terminal device and identifiers.

Optionally, the first response further carries the capability information identifier count.

Optionally, a specific implementation of sending, by the terminal device, a first request to a first core network device is: sending, by the terminal device, the first request to the first core network device when no identifier corresponding to the first capability information exists in a preset database of the terminal device, where the preset database stores a preconfigured mapping relationship between capability information and an identifier.

Optionally, the first request carries an indication indicating that the terminal device supports radio capability signaling.

Based on a same inventive concept, tor a principle of resolving a problem by the terminal device and beneficial effects, refer to the first aspect or a possible implementation of the first aspect, and beneficial effects thereof. Details are not described again.

According to a third aspect, an embodiment of this application provides a method for setting capability information. The method includes: receiving, by a first core network device, a first request from a terminal device, where the first request carries a first indication and a first capability information identifier, and the first indication is used to set capability information of the terminal device; and sending, by the first core network device, a first response to the terminal device. The capability information of the terminal device can be set based on this method.

Optionally, the first core network device may further perform the following steps: receiving, by the first core network device, a second request from the terminal device; allocating, by the first core network device, a capability information identifier count to the terminal device; and sending, by the first core network device, a second response to the terminal device, where the second response carries the capability information identifier count. Based on this optional manner, capability information identifiers stored by the terminal device can be limited, to prevent the terminal device from applying to the first core network device for a large quantity of capability information identifiers and causing a waste of capability information identifiers.

Optionally, the setting capability information of the terminal device includes one of an activation operation, an update operation, and a deletion operation. Optionally, when the setting capability information of the terminal device includes the activation operation, the first indication is used to indicate to activate a group of capability information of the terminal device. Optionally, when the setting capability information of the terminal device includes the update operation, the first indication is used to indicate to update a group of capability information of the terminal device. Optionally, when the setting capability information of the terminal device includes the deletion operation, the first indication is used to indicate to delete a group of capability information of the terminal device.

Optionally, the setting capability information of the terminal device includes the activation operation, and the first core network device may further perform the following steps: sending, by the first core network device, a third request to a second core network device, where the third request carries the first capability information identifier; receiving, by the first core network device, a third response from the second core network device, where the third response carries first capability information corresponding to the first capability information identifier; and sending, by the first core network device, the first capability information to an access network device. The capability information of the terminal device can be activated based on this optional manner.

Optionally, the setting capability information of the terminal device includes the update operation, the first request further includes first capability information, and the first core network device may further perform the following steps: sending, by the first core network device, a fourth request to a second core network device, where the fourth request carries the first capability information and the first capability information identifier, and the fourth request is used to indicate the second core network device to replace, with the first capability information, capability information corresponding to the first capability information identifier in a mapping relationship between capability information and an identifier; and receiving, by the first core network device, a fourth response front the second core network device, where the fourth response carries indication information used to indicate that the update succeeds. The capability information of the terminal device can be updated based on this optional manner.

Optionally, the setting capability information of the terminal device includes the update operation, and the first core network device may further perform the following steps: sending, by the first core network device, a fourth request to an access network device; receiving, by the first core network device, first capability information of the terminal device from the access network device; and sending, by the first core network device, a sixth request to a second core network device, where the sixth request carries the first capability information and the first capability information identifier, and the sixth request is used to indicate the second core network device to replace, with the first capability information, capability information corresponding to the first capability information identifier in a mapping relationship between capability information and an identifier; and receiving, by the first core network device, a sixth response from the second core network device, where the sixth response carries indication information used to indicate that the update succeeds. The capability information of the terminal device can be updated based on this optional manner.

Optionally, the setting capability information of the terminal device includes the deletion operation, and the first core network device may further perform the following steps: sending, by the first core network device, a seventh request to a second core network device, where the seventh request carries the first capability information identifier, and the seventh request is used to indicate the second core network device to delete the first capability information identifier and capability information corresponding to the first capability information identifier; and receiving, by the first core network device, a seventh response from the second core network device, where the seventh response carries indication information used to indicate that the deletion succeeds. The capability information of the terminal device can be deleted based on this optional manner.

Optionally, the second core network device stores mapping relationships between at least two groups of capability information of the terminal device and identifiers. The second core network device stores mapping relationships between at least two groups of capability information of the terminal device and identifiers, so that the terminal device can be prevented from reapplying for allocation of a capability information identifier each time the terminal device switches used capability information.

Optionally, the setting capability information of the terminal device includes the activation operation, and the first core network device may further perform the following steps: sending, by the first core network device, first capability information to an access network device. The capability information of the terminal device can be activated based on this optional manner.

Optionally, the setting capability information of the terminal device includes the update operation, the first request further includes first capability information, and the first core network device may further replace, with the first capability information, capability information corresponding to the first capability information identifier in a mapping relationship between capability information and an identifier. The capability information of the terminal device can be updated based on this optional manner.

Optionally, the setting capability information of the terminal device includes the update operation, and the first core network device may further perform the following steps: sending, by the first core network device, a fourth request to an access network device; receiving, by the first core network device, first capability information of the terminal device from the access network device; and replacing, by the first core network device with the first capability information, capability information corresponding to the first capability information identifier in a mapping relationship between capability information and an identifier. The capability information of the terminal device can be updated based on this optional manner.

Optionally, the setting capability information of the terminal device includes the deletion operation, and the first core network device may further delete the stored first capability information identifier and capability information corresponding to the first capability information identifier. The capability information of the terminal device can be deleted based on this optional manner.

Optionally, the first core network device stores a mapping relationships between at least two groups of capability information of the terminal device and identifiers. The first core network device stores mapping relationships between at least two groups of capability information of the terminal device and identifiers, so that the terminal device can be prevented from reapplying for allocation of a capability information identifier each time the terminal device switches used capability information.

Optionally, the first request further carries an indication indicating that the terminal device supports radio capability signaling.

According to a fourth aspect, an embodiment of this application provides a method for setting capability information, applicable to a terminal device, where a plurality of groups of capability information are configured on the terminal device, and the method includes: sending, by the terminal device, a first request to a first core network device, where the first request carries a first indication and a first capability information identifier, and the first indication is used to set capability information of the terminal device; and receiving, by the terminal device, a first response from the first core network device.

Optionally, the terminal device may further perform the following steps: sending, by the terminal device, a second request to the first core network device; and receiving, by the terminal device, a second response, where the second response carries a capability information identifier count.

Optionally, the setting capability information of the terminal device includes one of an activation operation, an update operation, and a deletion operation.

Optionally, when the setting capability information of the terminal device includes the activation operation, the first indication is used to indicate to activate a group of capability information of the terminal device.

Optionally, when the setting capability information of the terminal device includes the update operation, the first indication is used to indicate to update a group of capability information of the terminal device.

Optionally, when the setting capability information of the terminal device includes the deletion operation, the first indication is used to indicate to delete a group of capability information of the terminal device.

Optionally, the setting capability information of the terminal device includes the update operation, the first request further includes first capability information, and the terminal device may further replace, with the first capability information, capability information corresponding to the first capability information identifier in a mapping relationship between capability information and an identifier.

Optionally, the setting capability information of the terminal device includes the update operation, and the terminal device may further perform the following steps: receiving, by the terminal device, a fifth request from an access network device; sending, by the terminal device, first capability information to the access network device, replacing, by the terminal device with the first capability information, capability information corresponding to the first capability information identifier in a mapping relationship between capability information and an identifier.

Optionally, the setting capability information of the terminal device includes the deletion operation, and the terminal device may further delete the first capability information identifier and capability information corresponding to the first capability information identifier.

Optionally, the terminal device stores mapping relationships between at least two groups of capability information of the terminal device and identifiers.

Optionally, the first request further carries an indication indicating that the terminal device supports radio capability signaling.

Based on a same inventive concept, for a principle of resolving a problem by the terminal device and beneficial effects, refer to the third aspect or a possible implementation of the third aspect, and beneficial effects thereof. Details are not described again.

According to a fifth aspect, an embodiment of this application provides an identifier allocation method. The method includes: receiving, by a first core network device, a first request from a terminal device, where the first request carries a first globally unique temporary identity allocated by a third core network device to the terminal device; sending, by the first core network device, a second request to a second core network device, where the second request carries the first globally unique temporary identity; receiving, by the first core network device, a second response from the second core network device, where the second response carries an identifier set and the identifier set includes at least one first capability information identifier allocated by the third core network device to the terminal device; allocating, by the first core network device, at least one second capability information identifier to the terminal device; sending, by the first core network device, a correspondence between the second capability information identifier and a first capability information identifier that needs to be replaced to the second core network device; and sending, by the first core network device, a first response to the terminal device, where the first response carries the correspondence between the second capability information identifier and the first capability information identifier that needs to be replaced. Based on this method, when the terminal device moves front the third core network device to be under the first core network device, the first core network device may reallocate a capability information identifier to the terminal device, so that the first core network device can identity the capability information identifier sent by the terminal device in a subsequent process.

Optionally, the first core network device may further perform the following steps: determining, by the first core network device, a capability information identifier count, where the first response further carries the capability information identifier count. Based on this optional manner, capability information identifiers stored by the terminal device can be limited, to prevent the terminal device from applying to the first core network device for a large quantity of capability information identifiers and causing a waste of capability information identifiers.

Optionally, a specific implementation of allocating, by the first core network device, at least one second capability information identifier to the terminal device is: allocating the at least one second capability information identifier to the terminal device when the first core network device is incapable of identifying a capability information identifier in the identifier set. An identifier is reallocated to the terminal device only when the capability information identifier in the identifier set cannot be identified, thereby reducing a quantity of times of reallocating the identifier to the terminal device, and helping save network transmission resources.

Optionally, the first request carries an indication indicating that the terminal device supports radio capability signaling.

According to a sixth aspect, an embodiment of this application provides an identifier allocation method. The method includes: receiving, by a first core network device, a first request sent by a third core network device, where the first request carries an identifier set, and the identifier set includes at least one first capability information identifier allocated by the third core network device to a terminal device; allocating, by the first core network device, at least one second capability information identifier to the terminal device; sending, by the first core network device, a correspondence between the second capability information identifier and a first capability information identifier that needs to be replaced to a second core network device; and sending, by the first core network device, the correspondence between the second capability information identifier and the first capability information identifier that needs to be replaced to the terminal device. Based on this method, when the terminal device moves from the third core network device to be under the first core network device, the first core network device may reallocate a capability information identifier to the terminal device, so that the first core network device can identity the capability information identifier sent by the terminal device in a subsequent process.

Optionally, the first core network device may further perform the following steps: determining, by the first core network device, a capability information identifier count; and sending, by the first core network device, the capability information identifier count to the terminal device. Based on this optional manner, capability information identifiers stored by the terminal device can be limited, to prevent the terminal device from applying to the first core network device for a large quantity of capability information identifiers and causing a waste of capability information identifiers.

Optionally, a specific implementation of allocating, by the first core network device, at least one second capability information identifier to the terminal device is: allocating the at least one second capability information identifier to the terminal device when the first core network device is incapable of identifying a capability information identifier in the identifier set. An identifier is reallocated to the terminal device only when the capability information identifier in the identifier set cannot be identified, thereby reducing a quantity of times of reallocating the identifier to the terminal device, and helping save network transmission resources.

According to a seventh aspect, an embodiment of this application provides an identifier allocation method. The method includes: receiving, by a second core network device, a first request from a first core network device, where the first request carries first capability information of a terminal device; allocating, by the second core network device, a first capability information identifier to the first capability information; storing, by the second core network device, a mapping relationship between the first capability information and the first capability information identifier; and sending, by the second core network device, the first capability information identifier to the terminal device. Based on this method, the second core network device can allocate a capability information identifier to the terminal device, so that the terminal device can send the capability information identifier instead of capability information to another device, thereby helping save transmission resources for transmitting the capability information.

Optionally, the second core network device may further determine a capability information identifier count, and send the capability information identifier count to the terminal device. Based on this optional manner, capability information identifiers stored by the terminal device can be limited, to prevent the terminal device from applying to the first core network device for a large quantity of capability information identifiers and causing a waste of capability information identifiers.

According to an eighth aspect, an embodiment of this application provides an identifier allocation method. The method includes: receiving, by a first core network device, a first request from a terminal device; allocating, by the first core network device, a first capability information identifier to capability information of the terminal device; and sending, by the first core network device, a second request to an access network device, where the second request carries the first capability information identifier. Based on this method, the first core network device can allocate a capability information identifier to the terminal device, so that the terminal device can send the capability information identifier instead of capability information to another device, thereby helping save transmission resources for transmitting the capability information.

Optionally, the first core network device may further perform the following steps: receiving, by the first core network device, a fourth request from the terminal device; allocating, by the first core network device, a capability information identifier count to the terminal device; and sending, by the first core network device, a fourth response to the terminal device, where the fourth response carries the capability information identifier count. Based on this optional manner, capability information identifiers stored by the terminal device can be limited, to prevent the terminal device from applying to the first core network device for a large quantity of capability information identifiers and causing a waste of capability information identifiers.

Optionally, the first request carries a first indication, and the first indication is used to set capability information of the terminal device.

Optionally, the setting capability information of the terminal device includes an addition operation.

Optionally, the first indication is used to indicate to add storage of a group of capability information of the terminal device.

Optionally, the first core network device may further receive first capability information of the terminal device from the access network device, and store a mapping relationship between the first capability information and the first capability information identifier into a second core network device. Based on this optional manner, the first core network device stores the mapping relationship between the first capability information and the first capability information identifier into the second core network device, thereby helping reduce storage pressure of the first core network device.

Optionally, the first core network device may further perform the following steps: receiving, by the first core network device, a fifth request front the terminal device, where the fifth request carries a fifth capability information identifier, and the fifth capability information identifier is an identifier corresponding to capability information that the terminal device needs to use; sending, by the first core network device, a sixth request to the second core network device, where the sixth request carries the fifth capability information identifier; receiving, by the first core network device, a sixth response from the second core network device, where the sixth response includes the capability information corresponding to the fifth capability information identifier; and sending, by the first core network device, the capability information corresponding to the fifth capability information identifier to the access network device. Based on this optional manner, when the terminal device needs to use a group of capability information, the terminal device may send a capability information identifier instead of the capability information to the first core network device without directly sending the capability information that needs to be used to the first core network device, thereby saving transmission resources for transmitting the capability information.

Optionally, a specific implementation of sending, by the first core network device, a sixth request to the second core network device is: sending the sixth request to the second core network device when the capability information corresponding to the fifth capability information identifier does not exist in a preset database of the first core network device, where the preset database stores a preconfigured mapping relationship between capability information and an identifier; and obtaining, by the first core network device, the capability information corresponding to the fifth capability information identifier from the preset database when the capability information corresponding to the fifth identifier exists in the preset database, and sending the capability information corresponding to the fifth capability information identifier to the access network device. Based on this implementation, capability information corresponding to the fifth capability information identifier can be quickly obtained.

Optionally, the second core network device stores mapping relationships between at least two groups of capability information of the terminal device and identifiers. The second core network device stores mapping relationships between at least two groups of capability information of the terminal device and identifiers, so that the terminal device can be prevented from reapplying to the first core network device for allocation of a capability information identifier each time the terminal device switches used capability information.

Optionally, the first core network device may alternatively receive first capability information of the terminal device from the access network device, and store a mapping relationship between the first capability information and the first capability information identifier. Based on this optional manner, the first core network device can store the mapping relationship between the first capability information and the first capability information identifier into the first core network device, to help subsequently obtain the first capability information.

Optionally, the first core network device may further perform the following steps: receiving, by the first core network device, a fifth request from the terminal device, where the fifth request carries a fifth capability information identifier, and the fifth capability information identifier is an identifier corresponding to capability information that the terminal device needs to use; and sending, by the first core network device, the capability information corresponding to the fifth capability information identifier to the access network device. Based on this optional manner, when the terminal device needs to use a group of capability information, the terminal device may send a capability information identifier instead of the capability information to the first core network device without directly sending the capability information that needs to be used to the first core network device, thereby saving transmission resources for transmitting the capability information.

Optionally, the first core network device stores mapping relationships between at least two groups of capability information of the terminal device and identifiers. The first core network device stores mapping relationships between at least two groups of capability information of the terminal device and identifiers, so that the terminal device can be prevented from reapplying to the first core network device for allocation of a capability information identifier each time the terminal device switches used capability information.

Optionally, the first core network device may further perform the following steps: allocating, by the first core network device, a capability information identifier count to the terminal device, where the second request further includes the capability information identifier count. Based on this optional manner, capability information identifiers stored by the terminal device can be limited, to prevent the terminal device from applying to the first core network device for a large quantity of capability information identifiers and causing a waste of capability information identifiers.

Optionally, the first request carries an indication indicating that the terminal device supports radio capability signaling.

According to a ninth aspect, an embodiment of this application provides an identifier allocation method, applicable to a terminal device, where a plurality of groups of capability information are configured on the terminal device, and the method includes: sending, by the terminal device, a first request to a first core network device; and receiving, by the terminal device, a third request from an access network device, where the third request carries a first capability information identifier.

Optionally, the terminal device may further perform the following steps: sending, by the terminal device, a fourth request to the first core network device; and receiving, by the terminal device, a fourth response from the first core network device, where the fourth response carries a capability information identifier count.

Optionally, the first request carries a first indication, and the first indication is used to set capability information of the terminal device.

Optionally, the setting capability information of the terminal device includes an addition operation.

Optionally, the first indication is used to indicate to add storage of a group of capability information of the terminal device.

Optionally, the terminal device may further send first capability information to the access network device, and the terminal device may further store a mapping relationship between the first capability information and the first capability information identifier.

Optionally, the terminal device may further send a fifth request to the first core network device, where the fifth request carries a fifth capability information identifier, and the fifth capability information identifier is an identifier corresponding to capability information that the terminal device needs to use.

Optionally, the terminal device stores mapping relationships between at least two groups of capability information of the terminal device and identifiers.

Optionally, the third request further carries the capability information identifier count.

Optionally, a specific implementation of sending, by the terminal device, a first request to the first core network device is: sending, by the terminal device, the first request to the first core network device when no identifier corresponding to the first capability information exists in a preset database of the terminal device, where the preset database stores a preconfigured mapping relationship between capability information and an identifier.

Optionally, the first request carries an indication indicating that the terminal device supports radio capability signaling.

Based on a same inventive concept, for a principle of resolving a problem by the terminal device and beneficial effects, refer to the eighth aspect or a possible implementation of the eighth aspect, and beneficial effects thereof. Details are not described again.

According to a tenth aspect, an identifier allocation apparatus is provided. The identifier allocation apparatus may perform the method described in any one of the first aspect, the second aspect, the fifth aspect to the ninth aspect, the possible implementations of the first aspect, the possible implementations of the second aspect, and the possible implementations of the fifth aspect to the possible implementations of the ninth aspect, the function may be implemented by using hardware, or may be implemented by hardware executing corresponding software. The hardware or software includes one or more units corresponding to the foregoing functions. The unit may be software and/or hardware. Based on a same inventive concept, for a principle of resolving a problem by the identifier allocation apparatus and beneficial effects, refer to the principles and beneficial effects of the first aspect, the second aspect, the fifth aspect to the ninth aspect, the possible implementations of the first aspect, the possible implementations of the second aspect, and the possible implementations of the fifth aspect to the possible implementations of the ninth aspect. Details are not described again.

According to an eleventh aspect, an apparatus for setting capability information is provided. The apparatus for setting capability information may perform the method described in the third aspect, the fourth aspect, a possible implementation of the third aspect, or a possible implementation of the fourth aspect. The function may be implemented by using hardware, or may be implemented by hardware executing corresponding software. The hardware or software includes one or more units corresponding to the foregoing functions. The unit may be software and/or hardware. Based on a same inventive concept, for a principle of resolving a problem by the apparatus for setting capability information and beneficial effects, refer to the principles and beneficial effects of the third aspect, the fourth aspect, a possible implementation of the third aspect, or a possible implementation of the fourth aspect. Details are not described again.

According to a twelfth aspect, an identifier allocation apparatus is provided. The identifier allocation apparatus includes a processor, and the processor is coupled to a memory. The memory is configured to store instructions. The processor is configured to execute the instructions in the memory, to cause the identifier allocation apparatus to perform the method described in any one of the first aspect, the second aspect, the fifth aspect to the ninth aspect, the possible implementations of the first aspect, the possible implementations of the second aspect, and the possible implementations of the fifth aspect to the possible implementations of the ninth aspect. For an implementation of resolving a problem by the identifier allocation apparatus and beneficial effects, refer to the principles and beneficial effects of the first aspect, the second aspect, the fifth aspect to the ninth aspect, the possible implementations of the first aspect, the possible implementations of the second aspect, and the possible implementations of the fifth aspect to the possible implementations of the ninth aspect. Details are not described again.

According to a twelfth aspect, an apparatus for setting capability information is provided. The apparatus for setting capability information includes a processor, and the processor is coupled to a memory. The memory is configured to store instructions. The processor is configured to execute the instructions in the memory, to cause the apparatus for setting capability information to perform the method described in the third aspect, the fourth aspect, a possible implementation of the third aspect, or a possible implementation of the fourth aspect. For an implementation of resolving a problem by the apparatus for setting capability information and beneficial effects, refer to the principles and beneficial effects of the third aspect, the fourth aspect, a possible implementation of the third aspect, or a possible implementation of the fourth aspect. Details are not described again.

According to a thirteenth aspect, a computer program product is provided. When run on a computer, the computer program product, causes the computer to perform the method described in any one of the first aspect, the second aspect, the fifth aspect to the ninth aspect, the possible implementations of the first aspect, the possible implementations of the second aspect, and the possible implementations of the fifth aspect to the possible implementations of the ninth aspect.

According to a fourteenth aspect, a computer program product is provided. When run on a computer, the computer program product causes the computer to perform the method described in the third aspect the fourth aspect, a possible implementation of the third aspect, or a possible implementation of the fourth aspect.

According to a fifteenth aspect, a chip product is provided, and performs the method described in any one of the first aspect, the second aspect, the fifth aspect to the ninth aspect, the possible implementations of the first aspect, the possible implementations of the second aspect, and the possible implementations of the fifth aspect to the possible implementations of the ninth aspect.

According to a sixteenth aspect, a chip product is provided, and performs the method described in the third aspect, the fourth aspect, a possible implementation of the third aspect, or a possible implementation of the fourth aspect.

According to a seventeenth aspect, a computer-readable storage medium is provided, and the computer-readable storage medium stores instructions. When, run on a computer, the instructions cause the computer to perform the method described in any one of the first aspect, the second aspect, the fifth aspect, to the ninth aspect, the possible implementations of the first aspect, the possible implementations of the second aspect, and the possible implementations of the fifth aspect to the possible implementations of the ninth aspect.

According to an eighteenth aspect, a computer-readable storage medium is provided, and the computer-readable storage medium stores instructions. When run on a computer, the instructions cause the computer to perform the method described in the third aspect, the fourth aspect, a possible implementation of the third aspect, or a possible implementation of the fourth aspect.

BRIEF DESCRIPTION OF DRAWINGS

FIG. 26 to FIG. 29 are schematic flowcharts of identifier allocation methods according to embodiments of this application;

DESCRIPTION OF EMBODIMENTS

The following further describes specific embodiments of this application in detail with reference to accompanying drawings.

To save transmission resources for transmitting capability information, embodiments of this application provide an identifier allocation method and apparatus.

To make embodiments of this application more comprehensible, the following describes a communication system to which the embodiments of this application are applicable.

Figure 1:
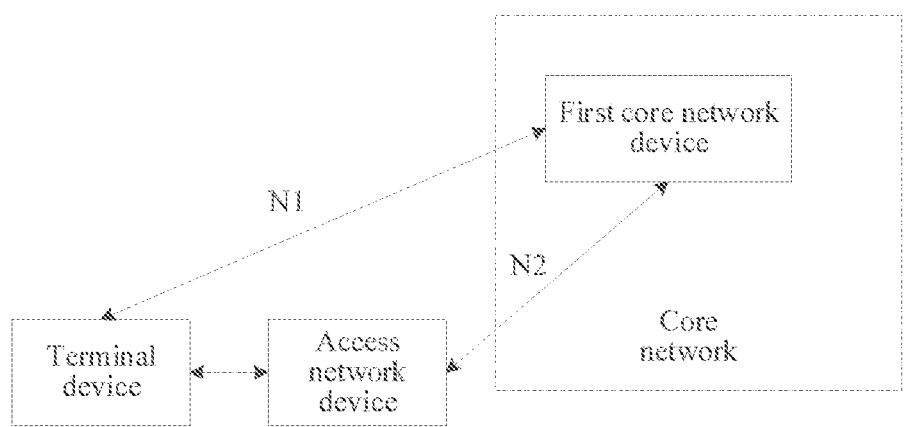
FIG. 1 and FIG. 2 are schematic diagrams of communication systems according to embodiments of this application.
Figure 2:
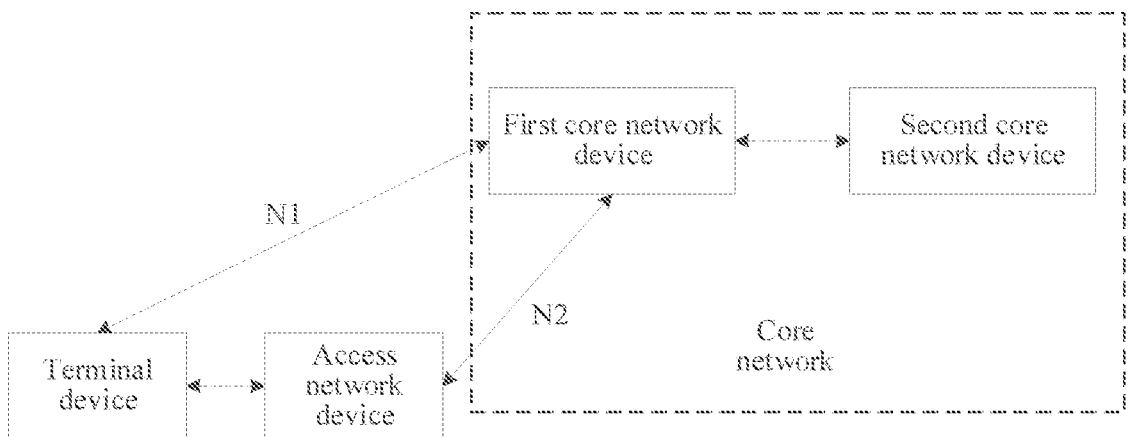

FIG. 1 and FIG. 2 are schematic diagrams of two communication systems according to embodiments of this application. The communication system shown in FIG. 1 includes at least a terminal device, an access network device, and a first core network device. The communication system shown in FIG. 2 includes at least a terminal device, an access network device, a first core network device, and a second core network device, in FIG. 1 and FIG. 2, the terminal device may communicate with the first core network device through the access network device. The access network device communicates with the access network device through an N2 interface. Certainly, the terminal device may alternatively communicate with the first core network device through an N1 interface. In FIG. 2, the first core network device is connected to the second core network device, and the first core network device may communicate with the second core network device. In FIG. 1 and FIG. 2, an example in which the communication system includes one terminal device, one access network device, one first core network device, and one second core network device is used. The communication system may alternatively include a plurality of terminal devices, a plurality of access network devices, a plurality of first core network devices, and a plurality of second core network devices. This is not limited in this embodiment of this application.

The terminal device may also be referred to as an access terminal, user equipment (user equipment, UE), a subscriber unit, a subscriber station, a mobile station, a mobile console, a remote station, a remote terminal, a mobile terminal, a user terminal, a terminal, a wireless communication device, a user agent, a user apparatus, or the like. The access terminal may be a cellular phone, a cordless phone, a Session Initiation Protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, an in-vehicle device, a wearable device, a terminal device in the Internet of Things, a virtual reality device, a terminal device in a future 5G network, or a terminal device in a future evolved public land mobile network (public land mobile network, PLMN).

The access network device may be an access device through which a terminal device is connected to the mobile communication system in a wireless manner, and may be a base station NodeB, an evolved NodeB eNodeB, a base station in a 5G mobile communication system, a base station in a future mobile communication system, an access node in a Wi-Fi system, or the like. A specific technology and a specific device form used by the access network device are not limited in this embodiment of this application.

The first core network device may be an access and mobility management function (access and mobility management function, AMP) entity or another core network device.

The second core network device may be an unstructured data storage network function (unstructured data storage network function, UDSF) entity or another core network device having a storage function.

The terminal device has capability information (UE radio capability). For example, the capability information of the terminal device may specifically include a packet data convergence protocol (packet data convergence protocol, PDCP) parameter, a physical layer parameter, a radio frequency parameter, a measurement parameter, and the like. These capability parameters specifically correspond to capability information of capabilities such as band combination (band combination), a baseband processing capability (baseband processing capability), a supported carrier aggregation bandwidth class (CA bandwidth class), and a modulation and coding scheme (modulation and coding scheme). The capability parameters and the capability information are examples of capability parameter s and capability information. The capability information of the terminal device may include one or more of the capability parameters and capability information. Specific complete capability information is not described herein in the present invention.

A plurality of groups of capability information are configured on the terminal device. For example, the following three groups of capability information may be configured in the terminal device based on actual usage of the terminal device. Capability information in a high-speed mode: The group of capability information includes all capability information of the terminal device. Capability information in a medium-speed mode: In the group of capability information, 5-component carrier (component carrier, CC) is adjusted to 2CC, and 4*4 multiple-input multiple-output (multiple-input multiple-output MIMO) is adjusted to 2*2 MIMO. In this way, when the terminal device is overheated, the terminal device may be switched to a medium-speed mode, so that the terminal device can maintain a specific rate, and the terminal device is prevented front being overheated. Capability information in a low-power consumption mode: In the group of capability information, only a basic data connection function of the terminal device is maintained, that is, MIMO may be canceled in the low-power consumption mode. The foregoing modes may be selected and switched by a vendor of the terminal device or a user of the terminal device based on a condition of the terminal device.

The following further describes an identifier allocation method and apparatus provided in this application.

Figure 3:
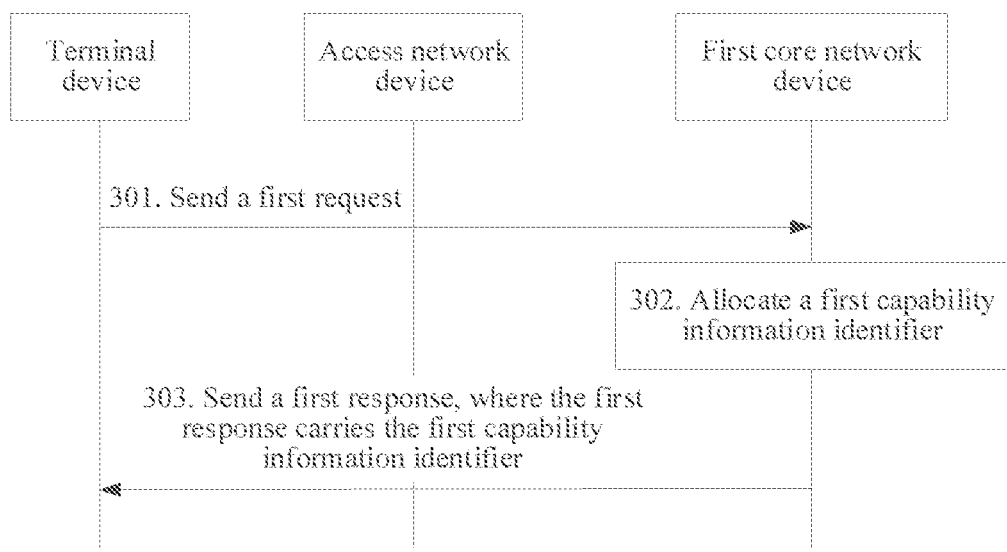
FIG. 3 to FIG. 8 are schematic flowcharts of identifier allocation methods according to embodiments of this application.

Based on the communication system described in FIG. 1. FIG. 3 is a schematic diagram of an identifier allocation method according to an embodiment of this application. As shown in FIG. 3, the identifier allocation method includes the following step 301 to step 303.

301. The terminal device sends a first request to lite first core network device.

Specifically, the terminal device sends a first request to the access network device, and then the access network device sends the first request to the first core network device. Optionally, the first request may be a registration request (registration request).

Optionally, the first request carries an indication indicating that the terminal device supports radio capability signaling (radio capability signaling, RACS). The First core network device may determine, according to the indication, that the terminal device supports and can identify a mapping relationship between a capability information identifier and corresponding capability information, so that the first core network device can allocate a corresponding identifier to capability information of the terminal device.

Optionally, the first request may be sent by the terminal device in an idle state (CM-IDLE state). Alternatively, the first request may be sent by the terminal device when the terminal device needs to use a group of capability information to which no capability information identifier is allocated. Optionally, the first request may be an initial registration request. That is, the first request may be a registration request sent by the terminal device to the first core network device for the first time. Alternatively, the first request may not be an initial registration request. This is not limited in this embodiment of tins application.

In an optional implementation, the first request carries a first indication, and the first indication is used to set capability information of the terminal device. In this implementation, the first request is not an initial registration request. In other words, in this implementation, before the terminal device sends the first request to the first core network device, the terminal device has sent an initial registration request to the first core network device.

Optionally, the setting capability information of the terminal device includes an addition operation. Optionally, when the setting capability information of the terminal device includes the addition operation, the first indication is used to indicate to add storage of a group of capability information of the terminal device.

In an optional implementation, when no identifier corresponding to first capability information exists in a preset database of the terminal device, the terminal device sends the first request to the first core network device. The preset database of the terminal device stores a preconfigured mapping relationship between a group of capability information and an identifier or preconfigured mapping relationships between a plurality of groups of capability information and identifiers. The terminal device may first determine whether an identifier corresponding to the first capability information exists in the preset database, and send the first request to the first core network device through the access network device when no identifier corresponding to the first capability information exists in the preset database.

302. The first core network device allocates a first capability information identifier.

In this embodiment of this application, after the first core network device receives the first request from the terminal device, the first core network device allocates a first capability information identifier to a group of capability information of the terminal device.

303. The first core network device sends a first response to the terminal device.

In this embodiment of this application, after allocating the first capability information identifier, the first core network device sends a first response to the terminal device. The first response carries the first capability information identifier. The first response is a response to the first request. Optionally, the first response may be a registration response (registration accept) to the first request.

Specifically, the first core network device first sends the first response to the access network device, and then the access network device sends the first response to the terminal device.

Correspondingly, the terminal device may receive the first response from the first core network device. Specifically, the terminal device receives the first response from the first core network device through the access network device. Optionally, after receiving the first response, the terminal device may store a mapping relationship between the first capability information identifier and the first capability information. The first capability information is capability information to which an identifier needs to be allocated. Optionally, the terminal device may store mapping relationships between at least two groups of capability information of the terminal device and identifiers. For example, the terminal device may store a mapping relationship between capability information in a high-speed mode and ID1, a mapping relationship between capability information in a medium-speed mode and ID2, and a mapping relationship between capability information in a low-power consumption mode and ID3.

It can be seen that, by performing the method described in FIG. 3, the first core network device can allocate a capability information identifier to the terminal device, so that the terminal device can send the capability information identifier instead of capability information to another device.

Therefore, the method described in FIG. 3 is performed to help save transmission resources for transmitting the capability information.

Figure 4:
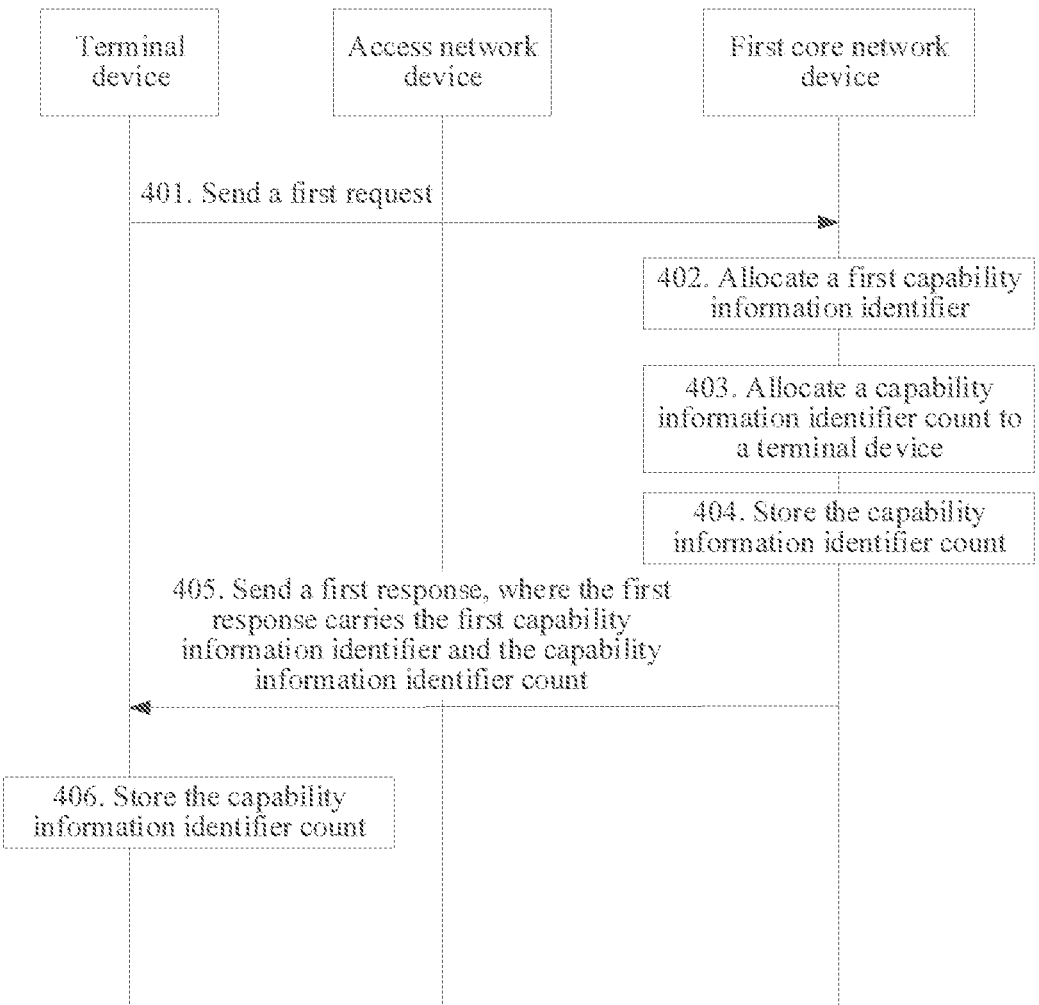

Based on the communication system described in FIG. 1, FIG. 4 is a schematic diagram of an identifier allocation method according to an embodiment of this application. As shown in FIG. 4, the identifier allocation method includes the following step 401 to step 406.

401. The terminal device sends a first request to the first core network device.

The first request may be an initial registration request. For other descriptions of step 401, refer to the descriptions corresponding to step 301. Details are not described herein again.

402. The first core network device allocates a first capability information identifier.

A specific implementation of step 402 is the same as a specific implementation of step 302. For details, refer to the descriptions corresponding to step 302. Details are not described herein again.

403. The first core network device allocates a capability information identifier count to the terminal device.

In this embodiment of this application, after receiving the first request from the terminal device, the first core network device allocates a capability information identifier count to the terminal device. Optionally, the capability information identifier count is a maximum quantity of capability information identifiers in the terminal device. For example, if capability information identifier data is 3, the terminal device can store a maximum of three capability information identifiers.

An order of performing steps 402 and 403 is not limited in this embodiment of this application.

404. The first core network device stores the capability information identifier count.

In this embodiment of this application, after allocating the capability information identifier count to the terminal device, the first core network device stores the capability information identifier count. Step 404 is an optional step.

405. The first core network device sends a first response to the terminal device.

In this embodiment of this application, after allocating the capability information identifier count to the terminal device and allocating the capability information identifier count to the terminal device, the first core network device sends a first response to the terminal device. The first response carries the first capability information identifier and the capability information identifier count. The first response is a response to the first request. Optionally, the first response may be a registration response (registration accept) to the first request. An order of performing steps 404 and 405 is not limited in this embodiment of this application.

Specifically, the first core network device first sends the first response to the access network device, and then the access network device sends the first response to the terminal device. Correspondingly, the terminal device may receive the first response from the first core network device. Specifically, the terminal device receives the first response from the first core network device through the access network device. Optionally, after receiving the first response, the terminal device may store a mapping relationship between the first capability information identifier and the first capability information. The first capability information is capability information to which an identifier needs to be allocated.

406. The terminal device stores the capability information identifier count.

In this embodiment of this application, after receiving the first response from the first core network device, the terminal device stores the capability information identifier count. Step 406 is an optional step.

It is assumed that a capability information identifier count is 3, the terminal device has four groups of capability information, and the terminal device has stored mapping relationships between three groups of capability information and identifiers, which are respectively a mapping relationship between capability information 1 and a capability information identifier 1, a mapping relationship between capability information 2 and a capability information identifier 3, and a mapping relationship between capability information 3 and a capability information identifier 3. When the terminal device needs the first core network device to allocate an identifier to the capability information 4, the terminal device needs to first delete an identifier corresponding to a group of capability information, so that the first core network device can allocate a capability information identifier to the capability information 4. Therefore, by performing the method described in FIG. 4, capability information identifiers stored by the terminal device can be limited, to prevent the terminal device from applying to the first core network device for a large quantity of capability information identifiers and causing a waste of capability information identifiers.

Figure 5:
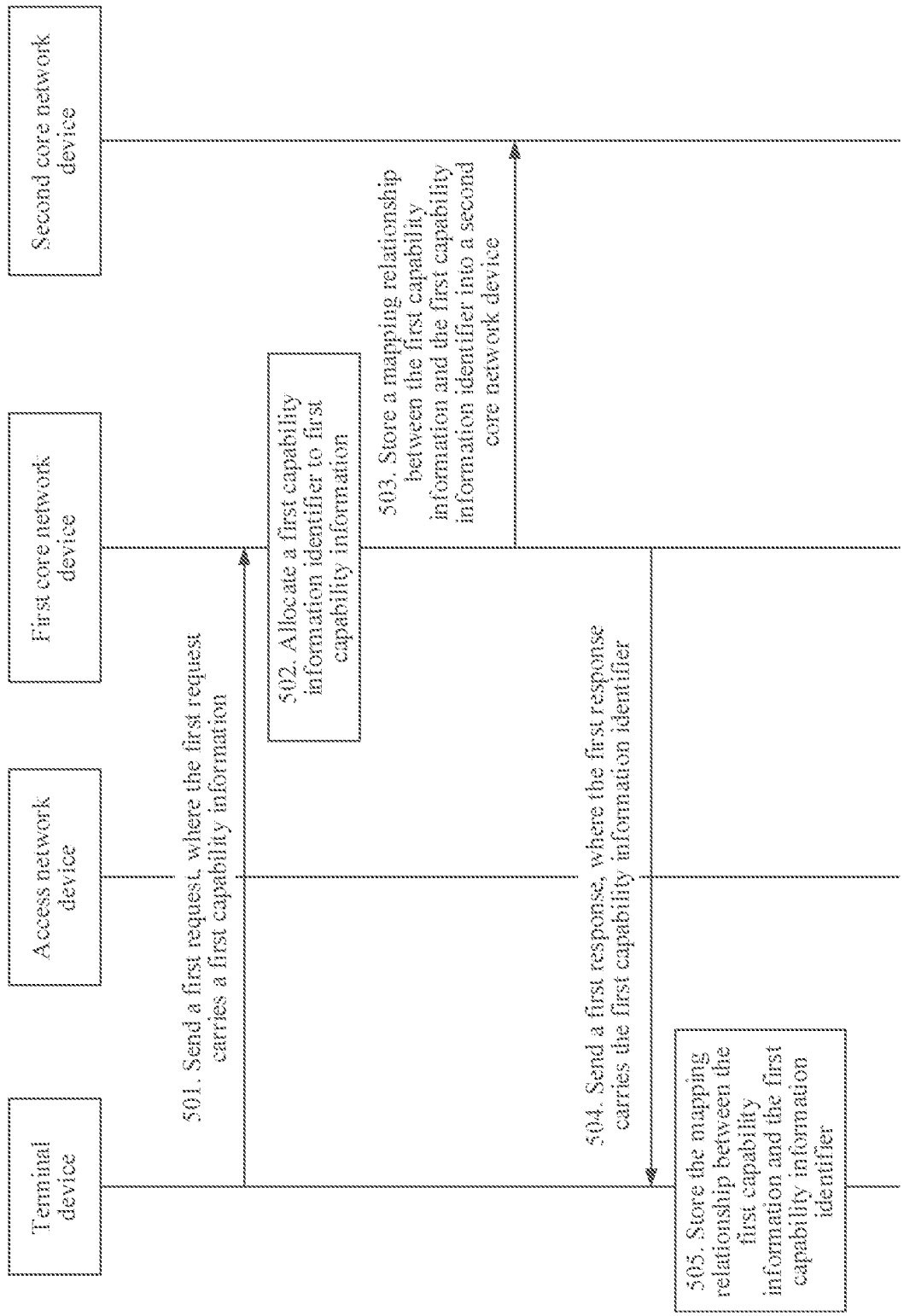

Based on the communication system described in FIG. 2, FIG. 5 is a schematic diagram of an identifier allocation method according to an embodiment of this application. As shown in FIG. 5, the identifier allocation method includes the following step 501 to step 505.

501. The terminal device sends a first request to the first core network device.

Specifically, the terminal device sends a first request to the access network device, and then the access network device sends the first request to the first core network device. The first request carries first capability information of the terminal device. The first capability information may be any group of capability information for which no capability information identifier is allocated. Alternatively, the first capability information is a group of to-be-used capability information for which no identifier is allocated. For other descriptions of the first request, refer to the descriptions corresponding to step 301. Details are not described herein again.

502. The first core network device allocates a first capability information identifier to the first capability information.

Step 502 is a specific implementation of step 302. After receiving the first request from the terminal device, the first core network device allocates a first capability information identifier to the first capability information. For example, the first capability information may be capability information in a high-speed mode. The first capability information identifier allocated by the first core network device to the capability information in the high-speed mode is ID1.

503. The first core network device stores a mapping relationship between the first capability information and the first capability information identifier into the second core network device.

In this embodiment of this application, after allocating the first capability information identifier to the first capability information, the first core network device sends a mapping relationship between the first capability information and the first capability information identifier to the second core network device. After receiving the mapping relationship between the first capability information and the first capability information identifier, the second core network device stores the mapping relationship between the first capability information and the first capability information identifier.

Optionally, the first core network device may add the mapping relationship between the first capability information and the first capability information identifier to a creation request and send the creation request to the second core network device for storage. Optionally, after storing the mapping relationship, the second core network device may return a creation response to the first core network device. Correspondingly, the first core network device may receive the creation response from the second core network device.

In optional implementation, the second core network device stores mapping relationships between at least two groups of capability information of the terminal device and identifiers. The terminal device stores mapping relationships between at least two groups of capability information of the terminal device and identifiers. For example, both the second core network device and the terminal device store a mapping relationship between capability information in a high-speed mode and ID1, a mapping relationship between capability information in a medium-speed mode and ID2, and a mapping relationship between capability information in a low-power consumption mode and ID3. Both the terminal device and the second core network device store mapping relationships between at least two groups of capability information of the terminal device and identifiers, so that the terminal device can be prevented from reapplying to the first core network device for allocation of a capability information identifier each time the terminal device switches used capability information.

504. The first core network device sends a first response to the terminal device.

A specific implementation of step 504 is the same as a specific implementation of step 303. For details, refer to the descriptions corresponding to step 303. Details are not described herein again. An order of performing step 503 and step 504 is not limited in this embodiment of this application.

505. The terminal device stores the mapping relationship between the first capability information and the first capability information identifier.

In this embodiment of this application, after receiving the first response from the first core network device, the terminal device stores the mapping relationship between the first capability information and the first capability information identifier.

It can be seen that, by performing the method described in FIG. 5, the first core network device can allocate a capability information identifier to the terminal device, so that the terminal device can send the capability information identifier instead of capability information to another device. Therefore, the method described in FIG. 5 is performed to help save transmission resources for transmitting the capability information.

Figure 6:
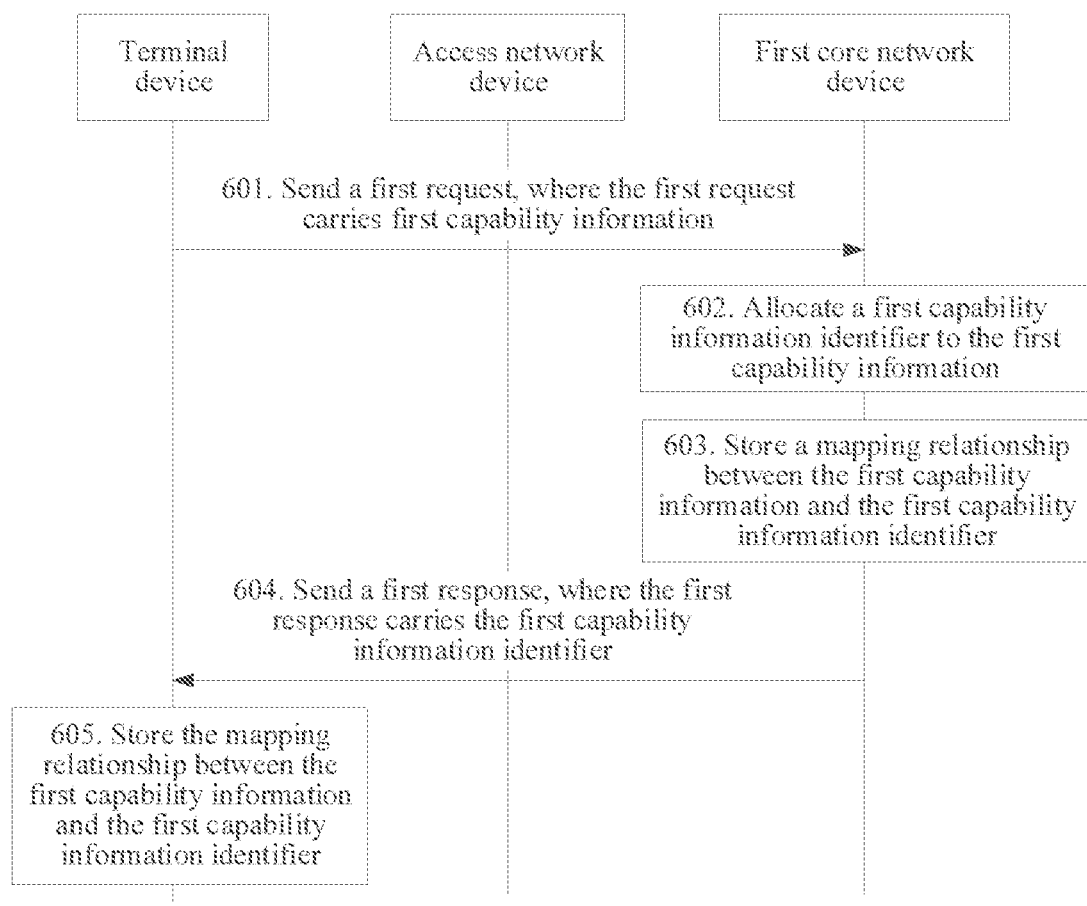

Based on the communication system described in FIG. 1. FIG. 6 is a schematic diagram of an identifier allocation method according to an embodiment of this application. FIG. 6 differs from FIG. 5 in that in FIG. 5, a mapping relationship between capability information and an identifier is stored into the second core network device, while in FIG. 6, a mapping relationship between capability information and an identifier is stored into the first core network device. As shown in FIG. 6, the identifier allocation method includes the following step 601 to step 605.

601. The terminal device sends a first request to the first core network device.

602. The first core network device allocates a first capability information identifier to first capability information.

Specific implementations of step 601 and step 602 are the same as specific implementations of step 501 and step 502. For details, refer to the descriptions corresponding to step 501 and step 502. Details are not described herein again.

603. The first core network device stores a mapping relationship between the first capability information and the first capability information identifier.

In this embodiment of this application, after the first core network device allocates the first capability information identifier to the first capability information, the first core network device stores a mapping relationship between the first capability information and the first capability information identifier into the first core network device.

In an optional implementation, the first core network device stores mapping relationships between at least two groups of capability information of the terminal device and identifiers. The terminal device stores mapping relationships between at least two groups of capability information of the terminal device and identifiers. For example, both the first core network device and the terminal device store a mapping relationship between capability information in a high-speed mode and ID1, a mapping relationship between capability information in a medium-speed mode and ID2, and a mapping relationship between capability information in a low-power consumption mode and ID3. Both the terminal device and the first core network device store mapping relationships between at least two groups of capability information of the terminal device and identifiers, so that the terminal device can be prevented from reapplying to the first core network device for allocation of a capability information identifier each time the terminal device switches used capability information.

604. The first core network device sends a first response to the terminal device.

An order of performing step 603 and step 604 is not limited in this embodiment of this application.

605. The terminal device stores the mapping relationship between the first capability information and the first capability information identifier.

Specific implementations of step 604 and step 605 are the same as specific implementations of step 505 and step 506. For details, refer to the descriptions corresponding to step 505 and step 506. Details are not described herein again.

It can be seen that, by performing the method described in FIG. 6, the first core network device can allocate a capability information identifier to the terminal device, so that the terminal device can send the capability information identifier instead of capability information to another device. Therefore, the method described in FIG. 6 is performed to help save transmission resources for transmitting the capability information.

Figure 7:
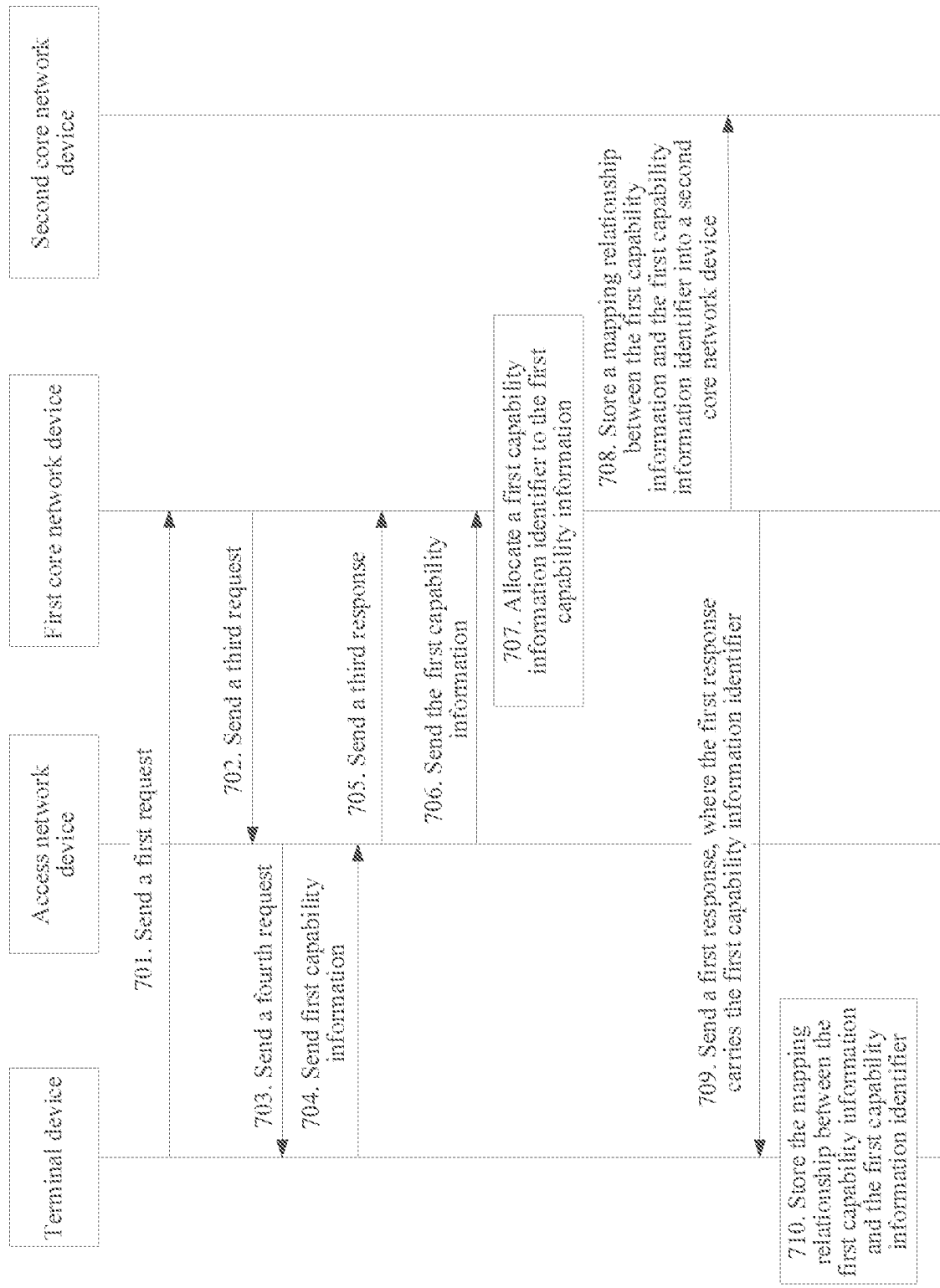

Based on the communication system described in FIG. 2, FIG. 7 is a schematic diagram of an identifier allocation method according to an embodiment of this application. FIG. 7 differs from FIG. 5 in that in FIG. 7, the first capability information is not carried in the first request, and in FIG. 7, the first core network device obtains the first capability information from the terminal device after receiving the first request. As shown in FIG. 7, the identifier allocation method includes the following step 701 to step 710.

701. The terminal device sends a first request to the first core network device.

The first request does not carry first capability information. For other descriptions of step 701, refer to the descriptions corresponding to step 301. Details are not described herein again.

702. The first core network device sends a third request to the access network device.

In this embodiment of this application, after the First core network device receives the first request from the terminal device, the first core network device sends a third request to the access network device. The third request is used by the access network device to obtain capability information of the terminal device. Optionally, the third request may be a terminal device capability matching request (UE capability match request).

703. The access network device sends a fourth request to the terminal device.

In this embodiment of this application, after receiving the third request from the first core network device, the access network device sends a fourth request to the terminal device. The fourth request is used to obtain capability information of the terminal device. Optionally, the fourth request may be a terminal device capability query request (UK capability enquiry).

704. The terminal device sends first capability informal ion to the access network device.

In this embodiment of this application, after receiving the fourth request from the access network device, the terminal device sends first capability information to the access network device. The first capability information may be any group of capability information for which no capability information identifier is allocated. Alternatively, the first capability information is a group of to-be-used capability information for which no identifier is allocated.

705. The access network device sends a third response to the third request to the first core network device.

In this embodiment of this application, after receiving the first capability information from the terminal device, the access network device sends a third response to the third request to the first core network device. The third response may be a UE capability match response. Correspondingly, the first core network device may receive the third response from the access network device. Step 705 is an optional step.

706. The access network device sends the first capability information to the first core network device.

In this embodiment of this application, after receiving the first capability information from the terminal device, the access network device sends the first capability information to the first core network device. Optionally, the first capability information sent by the access network device to the first core network device may be carried in a terminal device capability information indication (UE capability info indication). An order of performing step 705 and step 706 is not limited in this embodiment of this application.

707. The first core network device allocates a first capability information identifier to the first capability information.

Step 707 is a specific implementation of step 302. In this embodiment of this application, after receiving the first capability information of the terminal device from the access network device, the first core network device allocates a first capability information identifier to the first capability information. For example, the first capability information may be capability information in a high-speed mode. The first capability information identifier allocated by the first core network device to the capability information in the high-speed mode is ID1.

708. The first core network device stores a mapping relationship between the first capability information and the first capability information identifier into the second core network device.

In this embodiment of this application, after allocating the first capability information identifier to the first capability information, the first core network device stores a mapping relationship between the first capability information and the first capability information identifier into the second core network device. After receiving the mapping relationship between the first capability information and the first capability information identifier, the core network device stores the mapping relationship between the first capability information and the first capability information identifier.

Optionally, the first core network device may add the mapping relationship between the first capability information and the first capability information identifier to a creation request and send the creation request to the second core network device for storage. Optionally, after storing the mapping relationship, the second core network device may return a creation response to the first core network device. Correspondingly, the first core network device may receive the creation response from the second core network device.

In an optional implementation, the second core network device stores mapping relationships between at least two groups of capability information of the terminal device and identifiers. The terminal device stores mapping relationships between at least two groups of capability information of the terminal device and identifiers. For example, both the second core network device and the terminal device store a mapping relationship between capability information in a high-speed mode and ID1, a mapping relationship between capability information in a medium-speed mode and ID2, and a mapping relationship between capability information in a low-power consumption mode and ID3.

709. The first core network device sends a first response to the terminal device.

A specific implementation of step 709 is the same as a specific implementation of step 303. For details, refer to the descriptions corresponding to step 303. Details are not described herein again. An order of performing step 708 and step 709 is not limited in this embodiment of this application.

710. The terminal device stores the mapping relationship between the first capability information and the first capability information identifier.

In this embodiment of this application, after receiving the first response from the first core network device, the terminal device stores the mapping relationship between the first capability information and the first capability information identifier.

It can be seen that, by performing the method described in FIG. 7, the first core network device can allocate a capability information identifier to the terminal device, so that the terminal device can send the capability information identifier instead of capability information to another device. Therefore, the method described in FIG. 7 is performed to help save transmission resources tor transmitting the capability information.

Figure 8:
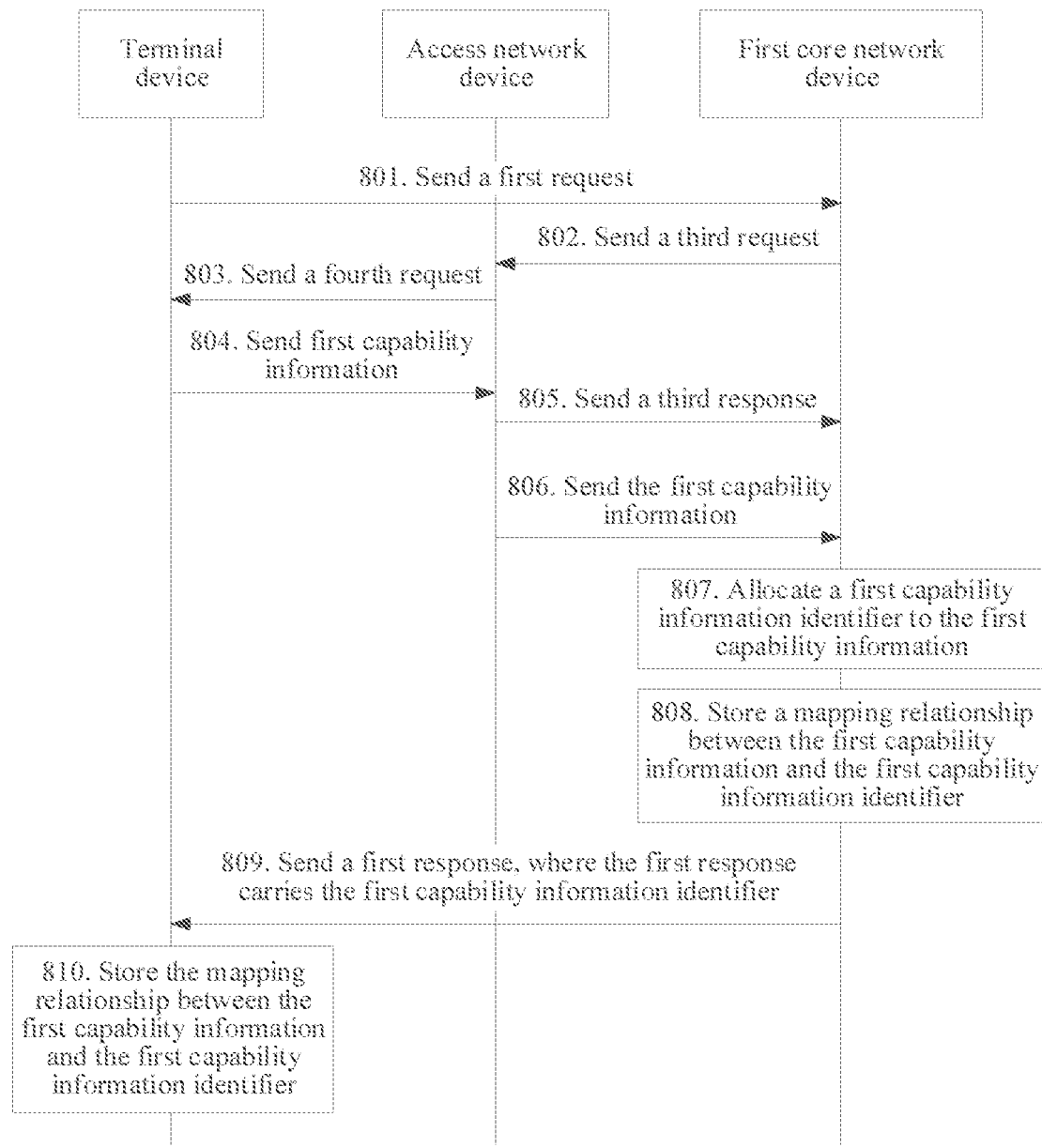

Based on the communication system described in FIG. 1, FIG. 8 is a schematic diagram of an identifier allocation method according to an embodiment of this application. FIG. 8 differs from FIG. 7 in that in FIG. 7, a mapping relationship between capability information and an identifier is stored into the second core network device, while in FIG. 8, a mapping relationship between capability information and an identifier is stored into the first core network device.

As shown in FIG. 8, the identifier allocation method includes the following step 801 to step 810.

801. The terminal device sends a first request to the first core network device.

802. The first core network device sends a third request to the access network device.

803. The access network device sends a fourth request to the terminal device.

804. The terminal device sends first capability information to the access network device.

805. The access network device sends a third response to the third request to the first core network device.

806. The access network device sends the first capability information to the first core network device.

807. The first core network device allocates a first capability information identifier to the first capability information.

Specific implementations of step 801 to step 807 are the same as specific implementations of step 701 to step 707. For details, refer to the descriptions corresponding to step 701 to step 707. Details are not described herein again.

808. The first core network device stores a mapping relationship between the first capability information and the first capability information identifier.

In this embodiment of this application, after the first core network device allocates the first capability information identifier to the first capability information, the first core network device stores a mapping relationship between the first capability information and the first capability information identifier into the first core network device.

In an optional implementation, the first core network device stores mapping relationships between at least two groups of capability information of the terminal device and identifiers. The terminal device stores mapping relationships between at least two groups of capability information of the terminal device and identifiers. For example, both the first core network device and the terminal device store a mapping relationship between capability information in a high-speed mode and ID1, a mapping relationship between capability information in a medium-speed mode and ID2, and a mapping relationship between capability information in a low-power consumption mode and ID3.

809. The first core network device sends a first response to the terminal device.

810. The terminal device stores the mapping relationship between the first capability information and the first capability information identifier.

Specific implementations of step 809 and step 810 are the same as specific implementations of step 709 and step 710. For details, refer to the descriptions corresponding to step 709 and step 710. Details are not described herein again.

It can be seen that, by performing the method described in FIG. 8, the first core network device can allocate a capability information identifier (o the terminal device, so that the terminal device can send the capability information identifier instead of capability information to another device. Therefore, the method described in FIG. 8 is performed to help save transmission resources for transmitting the capability information.

Figure 9:
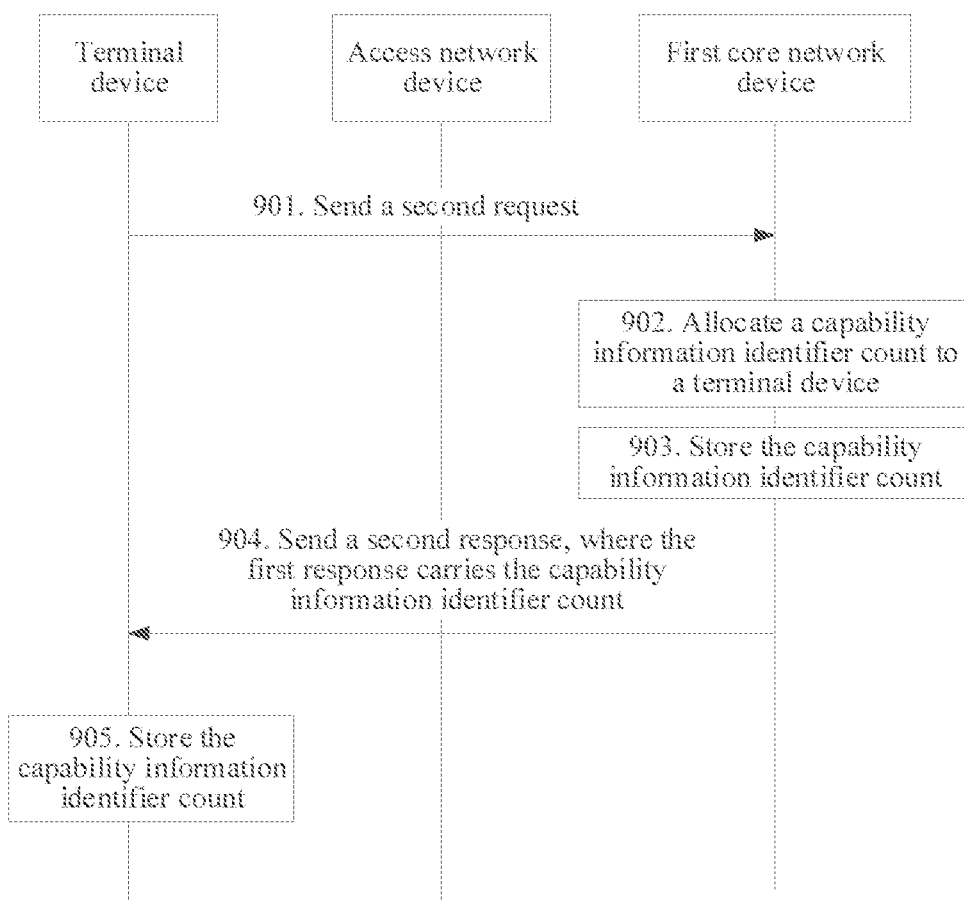
FIG. 9 is a schematic flowchart of a method for allocating a capability information identifier count according to an embodiment of this application.

Based on the communication system described in FIG. 1. FIG. 9 is a schematic diagram of a method for allocating a capability information identifier count according to an embodiment of (his application. As shown in FIG. 9, the identifier allocation method includes the following step 901 to step 905.

901. The terminal device sends a second request to the first core network device.

Specifically, the terminal device first sends a second request to the access network device, and then the access network device sends the second request (o the first core network device. Optionally, the second request may be a registration request (registration request). For example, the second request may be an initial registration request. When the second request is a registration request, the second request may carry an indication indicating that the terminal device supports radio capability signaling. Alternatively; the second request may be a service request.

902. The first core network device allocates a capability information identifier count to the terminal device.

In this embodiment of this application, after the First core network device receives the second request, the first core network device allocates a capability information identifier count to the terminal device. Specifically, the first core network device receives the second request through the access network device.

Optionally, the capability information identifier count is a maximum quantity of capability information identifiers in the terminal device. For example, if capability information identifier data is 3, the terminal device can store a maximum of three capability information identifiers.

903. The first core network device stores the capability information identifier count.

In this embodiment, of this application, after the first core network device allocates the capability information identifier count to the terminal device, the first core network device stores the capability information identifier count. Step 993 is an optional step.

904. The first core network device sends a second response to the terminal device.

In this embodiment of this application, after allocating the capability information identifier count to the terminal device, the first core network device sends a second response to the terminal device. The second response carries the capability information identifier count. The second response is a response to the second request. The second response may be a registration response (registration accept) to the second request.

An order of performing steps 903 and 904 is not limited in this embodiment of this application.

995. The terminal device stores the capability information identifier count.

In this embodiment of this application, after receiving the second response from the first core network device, the terminal device stores the capability information identifier count. Step 905 is an optional step.

It can be seen that, by performing the method described in FIG. 9, the first core network device can allocate a capability information identifier count to the terminal device, so that capability information identifiers stored by the terminal device can be limited, to prevent the terminal device from applying to the first core network device for a large quantity of capability information identifiers and causing a waste of capability information identifiers.

Step 901 to step 905 shown in FIG. 9 may be combined with steps shown in any one or more of FIG. 3 and FIG. 5 to FIG. 8. For example, step 901 to step 905 shown in FIG. 9 may be performed before or after step 301 to step 303 shown in FIG. 3. Step 901 to step 905 shown in FIG. 9 may be performed before or after step 501 to step 505 shown in FIG. 5. Step 901 to step 905 shown in FIG. 9 may be performed before or after step 601 to step 605 shown in FIG. 6. Step 901 to step 905 shown in FIG. 9 may be performed before or after step 701 to step 710 shown in FIG. 7. Step 901 to step 905 shown in FIG. 9 may be performed before or after step 801 to step 810 shown in FIG. 8. Alternatively, step 901 to step 905 shown in FIG. 9 may not be combined with the steps shown in FIG. 3 and FIG. 5 to FIG. 8. This is not limited in this embodiment of this application.

Figure 10:
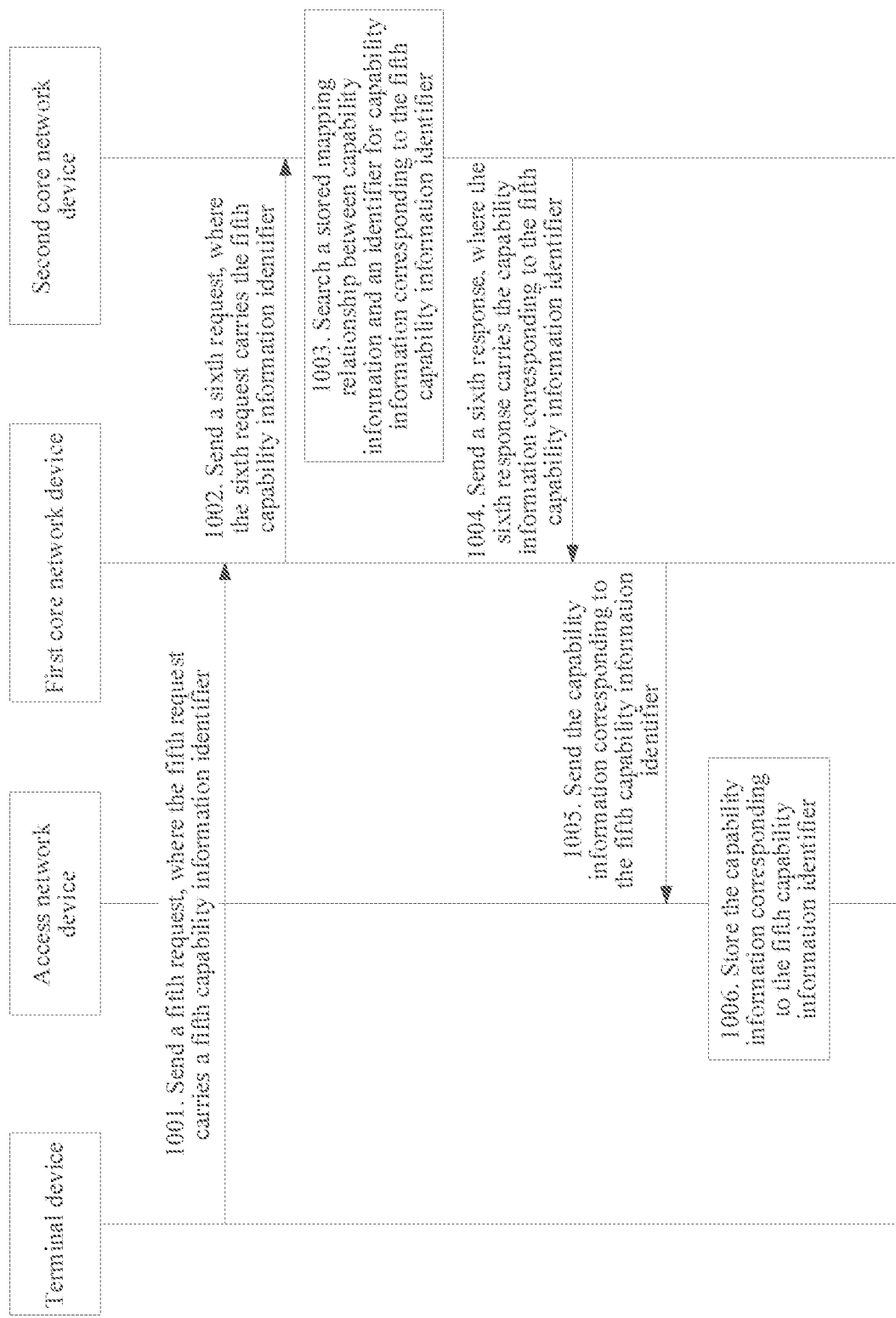
FIG. 10 and FIG. 11 are schematic flowcharts of communication methods according to embodiments of this application.

Based on the communication system described in FIG. 2, FIG. 10 is a schematic diagram of another communication method according to an embodiment of this application. As shown in FIG. 10, the communication method includes the following step 1001 to step 1006.

1001. The terminal device sends a fifth request to the first core network device.

In this embodiment of this application, the terminal device first sends a fifth request to the access network device, and then the access network device sends the fifth request to the first core network device. The filth request carries a fifth capability information identifier, and the fifth capability information identifier is an identifier corresponding to capability information that the terminal device needs to use. Optionally, the fifth request is a service request.

In this embodiment of this application, when the terminal device sends the fifth request to the first core network device, the first core network device has allocated one or more capability information identifiers to the terminal device.

For example, when the terminal device sends the fifth request to the first core network device through the access network device, the terminal device and the second core network device have stored a mapping relationship between capability information in a high-speed mode and ID1, a mapping relationship between capability information in a medium-speed mode and ID2, and a mapping relationship between capability information in a low-power consumption mode and ID3. If the terminal device needs to use the capability information in the high-speed mode, the terminal device sends a fifth request to the first core network device through the access network device, where the fifth request carries ID1.

1002. The first core network device sends a sixth request to the second core network device.

In this embodiment of this application, after the first core network device receives the fifth request, the first core network device sends a sixth request to the second core network device. The sixth request carries the fifth capability information identifier. Optionally, the sixth request may be a query request.

To an optional implementation, a preset database of the terminal device stores a preconfigured mapping relationship between a group of capability information and an identifier or preconfigured mapping relationships between a plurality of groups of capability information and identifiers. After receiving the fifth request, the first core network device may first determine whether capability information corresponding to the fifth capability information identifier exists in a preset database of the first core network device. When the capability information corresponding to the fifth capability information identifier does not exist in the preset database of the first core network device, step 1002 is performed. When the capability information corresponding to the fifth capability information identifier exists in the preset database of the first core network device, the first core network device obtains the capability information corresponding to the fifth capability information identifier from the preset database, and sends the capability information corresponding to the fifth capability information identifier to the access network device. After receiving the capability information corresponding to the fifth capability information identifier, the access network device stores the capability information corresponding to the fifth capability information identifier. Based on this implementation, capability information corresponding to the fifth capability information identifier can be quickly obtained.

1003. The second core network dev ice searches a stored mapping relationship between capability information and an identifier for capability information corresponding to the fifth capability information identifier.

In this embodiment of this application, after receiving the sixth request, the second core network device searches a stored mapping relationship between capability information and an identifier for capability information corresponding to the fifth capability information identifier.

1004. The second core network device sends a sixth response to the first core network device.

In this embodiment of this application, after finding the capability information corresponding to the fifth capability information identifier, the second core network device sends a sixth response to the first core network device. The sixth response carries the capability information corresponding to the fifth capability information identifier, the sixth response is a response to the sixth request.

1005. The first core network device sends the capability information corresponding to the fifth capability information identifier to the access network device.

In this embodiment of this application, after receiving the sixth response from the second core network device, the first core network device sends the capability information corresponding to the fifth capability information identifier to the access network device.

1006. The access network device stores the capability information corresponding to the fifth capability information identifier.

In this embodiment of this application, after receiving the capability information corresponding to the fifth capability information identifier, the access network device stores the capability information corresponding to the fifth capability information identifier for subsequent use.

It can be seen that, by performing the method described in FIG. 10, when the terminal device needs to use a group of capability information, the terminal device may send a capability information identifier instead of the capability information to the first core network device without directly sending the capability information that needs to be used to the first core network device. Therefore, the method described in FIG. 10 is performed to help save transmission resources for transmitting the capability information.

Step 1001 to step 1006 shown in FIG. 10 may be combined with steps shown in any one or more of FIG. 3 to FIG. 5, FIG. 7, and FIG. 9. For example, step 1001 to step 1006 shown in FIG. 10 may be performed before or after step 301 to step 303 shown in FIG. 3. Step 1001 to step 1006 shown in FIG. 10 may be performed after step 401 to step 406 shown in FIG. 4. Step 1001 to step 1006 shown in FIG. 10 may be performed before or after step 501 to step 505 shown in FIG. 5. Step 1001 to step 1006 shown in FIG. 10 may be performed before or after step 701 to step 710 shown in FIG. 7. Step 1001 to step 1006 shown in FIG. 10 may be performed after step 901 to step 905 shown in FIG. 9. Alternatively, the solution shown in FIG. 10 may not be combined with the steps shown in FIG. 3 to FIG. 5, FIG. 7, FIG. 9, and FIG. 10.

Figure 11:
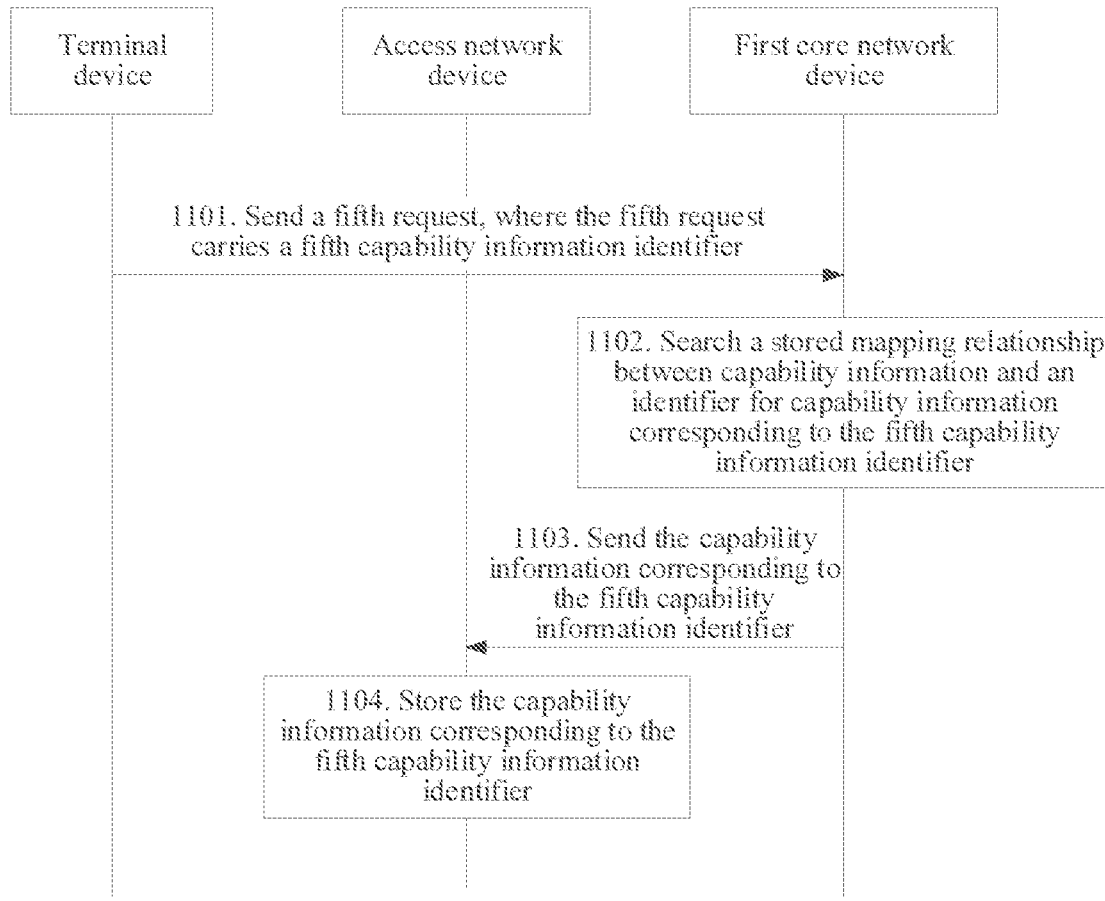

Based on the communication system described in FIG. 1. FIG. 11 is a schematic diagram of another communication method according to an embodiment of this application. FIG. 11 differs from FIG. 10 in that locations for storing a mapping relationship between capability information and an identifier are different. In the method in FIG. 10, a mapping relationship between capability information and an identifier is stored into the second core network device. In the method in FIG. 11, a mapping relationship between capability information and an identifier is stored into the first core network device. As shown in FIG. 11, the communication method includes the following step 1101 to step 1104.

1101. The terminal device sends a fifth request to the first core network device.

A specific implementation of step 1101 is the same as a specific implementation of step 1001. For details, refer to the specific implementation of step 1001. Details are not described herein again.

1102. The first core network device obtains capability information corresponding to the fifth capability information identifier from a stored mapping relationship between capability information and an identifier.

In this embodiment of this application, after receiving the fifth request, the first core network device searches a stated mapping relationship between capability information and aft identifier for capability information corresponding to the fifth capability information identifier. Step 1102 is an optional step.

1103. The first core network device sends the capability information corresponding to the fifth capability information identifier to the access network device.

In this embodiment of this application, after finding the capability information corresponding to the fifth capability information identifier, the first core network device sends the capability information corresponding to the fifth capability information identifier to the access network device.

1104. The access network device stores the capability information corresponding to the fifth capability information identifier.

In this embodiment of this application, after receiving the capability information corresponding to the fifth capability information identifier, the access network device stores the capability information corresponding to the fifth capability information identifier for subsequent use. For example, as shown in FIG. 11, the access network device stores capability information in a high-speed mode.

It can be seen that, by performing the method described in FIG. 11, when the terminal device needs to use a group of capability information, the terminal device may send a capability information identifier instead of the capability information to the first core network device without directly sending the capability information that needs to be used to the first core network device, therefore, the method described in FIG. 11 is performed to help save transmission resources for transmitting the capability information.

Step 1101 to step 1104 shown in FIG. 11 may be combined with steps shown in any one or more of FIG. 3, FIG. 4, FIG. 6, FIG. 8, and FIG. 9. For example, step 1101 to step 1104 shown in FIG. 11 may be performed before or after step 301 to step 303 shown in FIG. 3. Step 1101 to step 1104 shown in FIG. 11 may be performed after step 401 to step 406 shown in FIG. 4. Step 1101 to step 1104 shown in FIG. 11 may be performed before or after step 601 to step 605 shown in FIG. 6. Step 1101 to step 1104 shown in FIG. 11 may be performed before or after step 801 to step 810 shown in FIG. 8. Step 1101 to step 1104 shown in FIG. 11 may be performed after step 901 to step 905 shown in FIG. 9. Alternatively, the solution shown in FIG. 11 may not be combined with the steps shown in FIG. 3, FIG. 4, FIG. 6, FIG. 8, FIG. 9, and FIG. 11.

Figure 12:
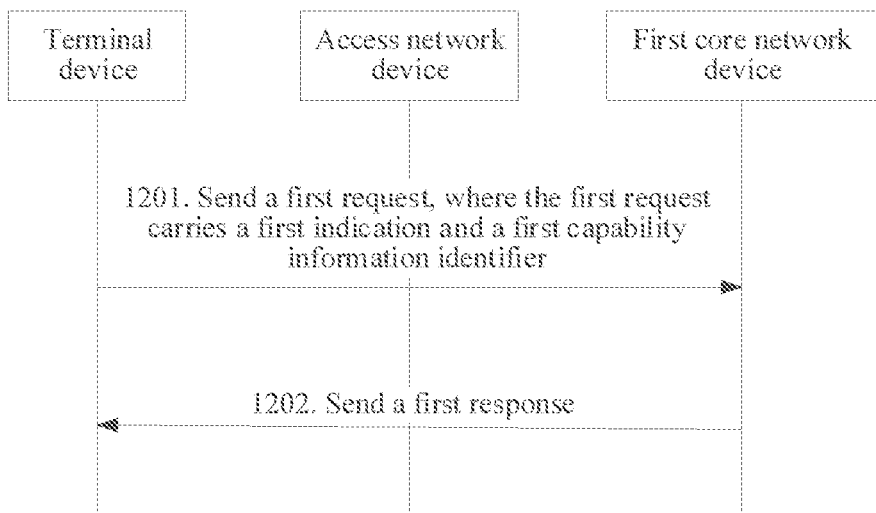
FIG. 12 to FIG. 20 are schematic flowcharts of methods for setting capability information according to embodiments of this application.

Based on the communication system described in FIG. 1, FIG. 12 is a schematic diagram of a method for setting capability information according to an embodiment of this application. As shown in FIG. 12, the method for setting capability information includes the following step 1201 and step 1202.

1201. The terminal device sends a first request to the first core network device.

Specifically, the terminal device sends a first request to the access network device, and then the access network device sends the first request, to the first core network device. The first request carries a first indication and a first capability information identifier, and the first indication is used to set capability information of the terminal device. Optionally, the first request may be a registration request (registration request). Optionally, the first request carries an indication indicating that the terminal device supports radio capability signaling (radio capability signaling, RACS).

Optionally, the selling capability information of the terminal device includes one of an activation operation, an update operation, and a deletion operation. The update operation may also be referred to as a replacement operation. The activated capability information is capability information available to the terminal device in a connected state.

Optionally, when the setting capability information of the terminal device includes the activation operation, the first indication is used to indicate to activate a group of capability information of the terminal device. When the setting capability information of the terminal device includes the update operation, the first indication is used to indicate to update a group of capability information of the terminal device. When the setting capability information of the terminal device includes the deletion operation, the first indication is used to indicate to delete a group of capability information of the terminal device.

The first capability information identifier is an identifier corresponding to capability information that needs to be set. For example, the terminal device stores a mapping relationship between capability information in a high-speed mode and ID1, a mapping relationship between capability information in a medium-speed mode and ID2, and a mapping relationship between capability information in a low-power consumption mode and ID3. If the capability information in the high-speed mode needs to be activated, the first capability information identifier may be ID1. If the capability information in the high-speed mode needs to be updated or replaced, the first capability information identifier may be ID1. If the capability information in the high-speed mode needs to be deleted, the first capability information identifier may be ID1.

1202. The first core network device sends a first response to the terminal device.

In this embodiment of this application, after the first core network device receives the first request, the first core network device may set capability information corresponding to the first capability information identifier, for example, activate, update, or delete the capability information corresponding to the first capability information identifier. For details about how the first core network device sets the capability information corresponding to the first, capability information identifier, refer to descriptions corresponding to the following FIG. 14, FIG. 17, FIG. 18, and FIG. 20. Details are not described herein again.

Alternatively, after receiving the first request, the first core network device sends the request to the second core network device, to indicate the second core network device to set capability information corresponding to the first capability information identifier, where the second core network device is a device that stores a mapping relationship between capability information and an identifier. For details about how the second core network device sets the capability information corresponding to the first capability information Identifier, refer to descriptions corresponding to the following FIG. 13, FIG. 15. FIG. 16, and FIG. 16. Details are not described herein again.

In this embodiment of this application, after the first core network device or the second core network device completes setting of the capability information corresponding to the first capability information identifier, the first core network device sends a first response to the terminal device. Specifically, the first core network device first sends the first response to the access network device, and then the access network device sends the first response to the terminal device. The first response is a response to the first request. Optionally, the first response indicates that the setting is completed. Correspondingly; the terminal device may receive the first response from the first core network device.

It can be seen that, by performing the method described in FIG. 12, the capability information of the terminal device can be set.

Step 1201 and step 1202 shown in FIG. 12 may be combined with steps shown in any one or more of FIG. 3 to FIG. 11. For example, step 1201 and step 1202 shown in FIG. 12 may be performed before or after step 301 to step 303 shown in FIG. 3. Step 1201 and step 1202 shown its FIG. 12 may be performed after step 401 to step 406 shown in FIG. 4. Step 1201 and step 1202 shown in FIG. 12 may be performed before or after step 501 to step 505 shown in FIG. 5. Step 1201 and step 1202 shown in FIG. 12 may be performed before or after step 601 to step 605 shown in FIG. 6. Step 1201 and step 1202 shown in FIG. 12 may be performed before or after step 701 to step 710 shown in FIG. 7. Step 1201 and step 1202 shown in FIG. 12 may be performed be lore or after step 801 to step 810 shown in FIG. 8. Step 1201 and step 1202 shown in FIG. 12 may be performed after step 901 to step 905 shown in FIG. 9. Step 1201 and step 1202 shown in FIG. 12 may be performed before or after step 1001 to step 1006 shown in FIG. 10. Step 1201 and step 1202 shown in FIG. 12 may be performed before or after step 1001 to step 1004 shown in FIG. 11. Alternatively, the solution shown in FIG. 12 may not be combined with the steps shown in FIG. 3 to FIG. 11.

Figure 13:
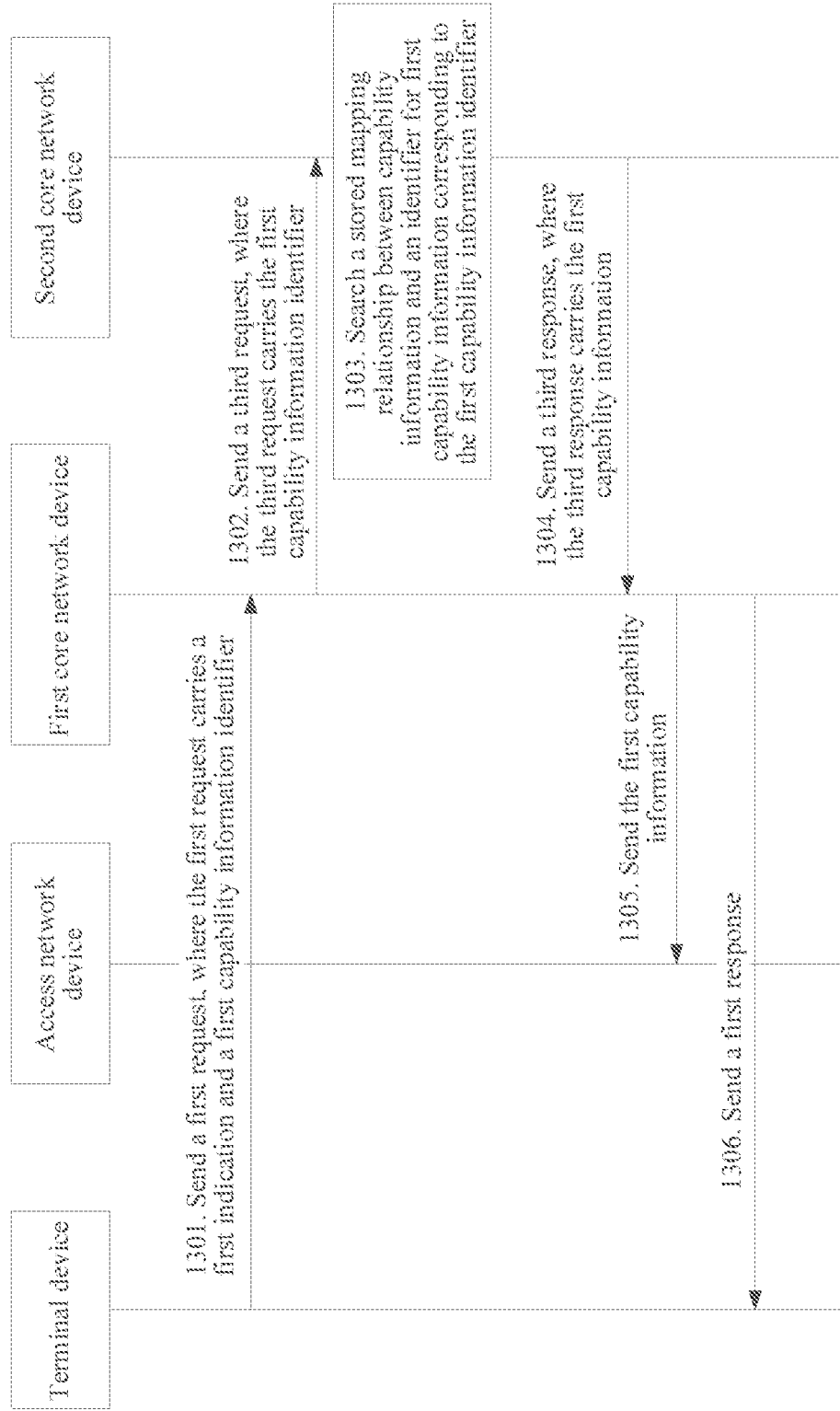

Based on the communication system described in FIG. 2. FIG. 13 is a schematic diagram of a method for setting capability information according to an embodiment of this application, in the method for setting capability information described in FIG. 13, the second core network device stores a mapping relationship between capability information and an identifier. The method for setting capability information described in FIG. 13 is used to activate capability information. As shown in FIG. 13, the method for setting capability information includes the following step 1301 to step 1306.

1301. The terminal device sends a first request to the first core network device.

Specifically, the terminal device sends a first request to the access network device, and then the access network device sends the first request to the first core network device. The first request carries a first indication and a first capability information identifier, and the first indication is used to set capability information of the terminal device. The setting capability information of the terminal device includes an activation operation. The activated capability information is capability information available to the terminal device in a connected state. Optionally, when the setting capability information of the terminal device includes the activation operation, the first indication is used to indicate to activate a group of capability information of the terminal device. Optionally, the first request may be a registration request (registration request). Optionally, the first request carries an indication indicating that the terminal device supports radio capability signaling (radio capability signaling, RACS).

For example, capability information in a high-speed mode needs to be activated, and the first capability information identifier is ID1. The terminal device and the second core network device store a mapping relationship between capability information in a high-speed mode and ID1, a mapping relationship between capability information in a medium-speed mode and ID2, and a mapping relationship between capability information in a low-power consumption mode and ID3. If the terminal device needs to activate the capability information in the high-speed mode, the terminal device sends a first request to the first core network device. The first request carries ID1 and a first indication, where the first indication is used to activate the capability information of the terminal device.

1302. The first, core network device sends a third request to the second core network device.

In this embodiment of this application, after receiving the first request from the terminal device, the first core network device sends a third request to the second core network device, where the third request carries the first capability information identifier. Optionally, the third request may be a query request.

1303. The second core network device searches a stored mapping relationship between capability information and an identifier for first capability information corresponding to the first capability information identifier.

In this embodiment of this application, after receiving the third request, the second core network device searches a stored mapping relationship between capability information and an identifier for first capability information corresponding to the first capability information identifier.

1304. The second core network device sends a third response to the first core network device.

In this embodiment of this application, after finding the first capability information corresponding to the first capability information identifier, the second core network device sends a third response to the first core network device, where the third response carries the first capability information corresponding to the first capability information identifier. The third response is a response to the third request. For example, if the first capability information identifier is ID1, the second core network device finds that the first capability information is capability information in a high-speed mode. The second core network device sends a third response to the first core network device, w here the third response carries the capability information in the high-speed mode.

1305. The first core network device sends the first capability information to the access network device.

In this embodiment of this application, after receiving the third response from the second core network device, the first core network device sends the first capability information to the access network device, to activate the first capability information. Optionally, the first core network device may add the first capability information in a terminal device capability matching request (UE capability match request) and send the terminal device capability matching request to the access network device. Correspondingly, after the access network device receives the first capability information, the first core network device may store the first capability information, and return a response to the first core network device. The first core network device may receive the response.

1306. The first core network device sends a first response to the terminal device.

In this embodiment of this application, after receiving the third response from the second core network device, the first core network device sends 3 first response to the terminal device. Specifically, the first core network device first sends the first response to the access network device, and then the access network device sends the first response to the terminal device. The first response is a response to the first request. Optionally, the first response indicates that the activation is completed. Correspondingly, the terminal device may receive the first response from the first core network device.

An order of performing step 1305 and step 1306 is not limited in this embodiment of this application.

It can be seen that, by performing the method described in FIG. 13, the capability information of the terminal device can be activated.

Step 1301 to step 1306 shown in FIG. 13 may be combined with steps shown in any one or more of FIG. 3 to FIG. 5, FIG. 7, FIG. 9, and FIG. 10. For example, step 1301 to step 1306 shown in FIG. 13 may be performed before or after step 301 to step 303 shown in FIG. 3. Step 1301 to step 1306 shown in FIG. 13 may be performed after step 401 to step 406 shown in FIG. 4. Step 1301 to step 1306 shown in FIG. 13 may be performed before or after step 501 to step 505 shown in FIG. 5. Step 1301 to step 1306 shown in FIG. 13 may be performed before or after step 701 to step 710 shown in FIG. 7. Slop 1301 to step 1306 shown in FIG. 13 may be performed alter step 901 to step 905 shown in FIG. 9. Step 1301 to step 1306 shown in FIG. 13 may be performed before or alter step 1001 to step 1006 shown in FIG. 10. Alternatively, the solution shown in FIG. 13 may not be combined with the steps shown in FIG. 3 to FIG. 5, FIG. 7. FIG. 9, and FIG. 10.

Figure 14:
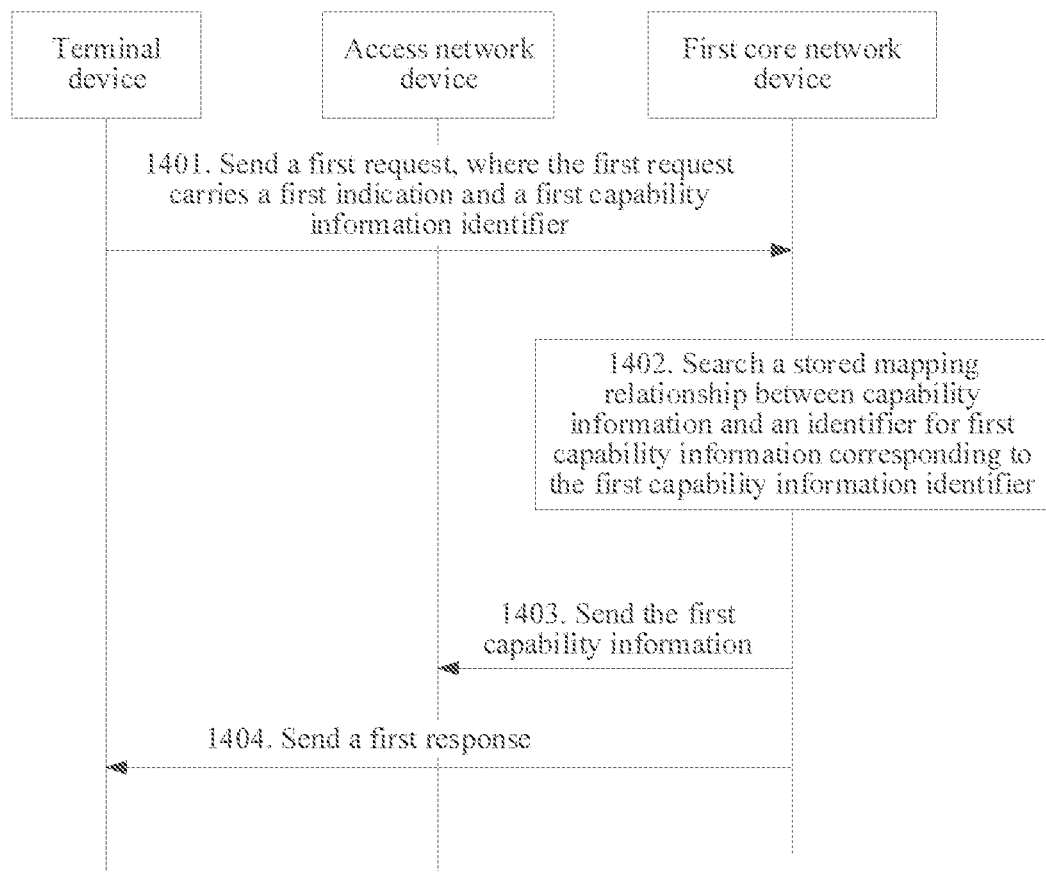

Based on the communication system described its FIG. 1, FIG. 14 is a schematic diagram of a method for setting capability information according to an embodiment of this application. The method for setting capability information shown in FIG. 14 differs from the method for setting capability information shown in FIG. 13 in that, in the method for setting capability information shown in FIG. 14, the first core network device stores a mapping relationship between capability information and an identifier, while in the method for setting capability information shown in FIG. 13, the second core network device stores a mapping relationship between capability information and an identifier. As shown in FIG. 14, the method for setting capability information includes the following step 1401 to step 1404.

1401. The terminal device sends a first request to the first core network device.

A specific implementation of step 1401 is the same as a specific implementation of step 1301. For details, refer to She specific implementation of step 1301. Details are not described herein again.

1402. The first core network device searches a stored mapping relationship between capability information and an identifier for first capability information corresponding to a first capability information identifier.

In this embodiment of this application, after receiving the first request, the first core network device searches a stored mapping relationship between capability information and an identifier for first capability information corresponding to a first capability information identifier. Step 1402 is an optional step.

For example, capability information in a high-speed mode needs to be activated, and the first capability information identifier is ID1. The terminal device and the first core network device store a mapping relationship between capability information in a high-speed mode and ID1, a mapping relationship between capability information in a medium-speed mode and ID2, and a mapping relationship between capability information in a low-power consumption mode and ID3. If the terminal device needs to activate the capability information in the high-speed mode, the terminal device sends a first request to the first core network device. The first request carries ID1and a first indication, where the first indication is used to activate the capability information of the terminal device. After receiving the first request, the first core network device finds, from tire stored mapping relationship between capability information and an identifier, that the first capability information corresponding to ID1 is the capability information in the high-speed mode. The first core network device sends the capability information in the high-speed mode to the access network device.

1403. The first core network device sends the first capability information to the access network device.

In this embodiment of this application, after finding the first capability information corresponding to the first capability information identifier, the first core network device sends the first capability information to the access network device, to activate the first capability information.

1404. The first core network device sends a first response to the terminal device.

In this embodiment of this application, after finding the first capability information corresponding to the first capability information identifier, the first core network device sends a first response to the terminal device.

Specific implementations of step 1403 and step 1404 are the same as specific implementations of step 1305 and step 1306. For details, refer to the specific implementations of step 1305 and step 1306. Details are not described herein again.

It can be seen that, by performing the method described in FIG. 14, the capability information of the terminal device can be activated.

Step 1401 to step 1404 shown in FIG. 14 may be combined with steps shown in any one or more of FIG. 3. FIG. 4, FIG. 6, FIG. 8, FIG. 9, and FIG. 11. For example, step 1401 to step 1404 shown in FIG. 14 may be performed before or after step 301 to step 303 shown in FIG. 3. Step 1401 to step 1404 shown in FIG. 14 may be performed after step 401 to step 406 shown in FIG. 4. Step 1401 to step 1404 shown in FIG. 14 may be performed before or after step 601 to step 605 shown in FIG. 6. Step 1401 to step 1404 shown in FIG. 14 may be performed before or after step 801 to step 810 shown in FIG. 8. Step 1401 to step 1404 shown in FIG. 14 may be performed after step 901 to step 905 shown in FIG. 9. Step 1401 to step 1404 shown in FIG. 14 may be performed before or after step 1101 to step 1104 shown in FIG. 11. Alternatively, the solution shown in FIG. 14 may not be combined with the steps shown in FIG. 3, FIG. 4, FIG. 6, FIG. 8. FIG. 9, and FIG. 11.

Figure 15:
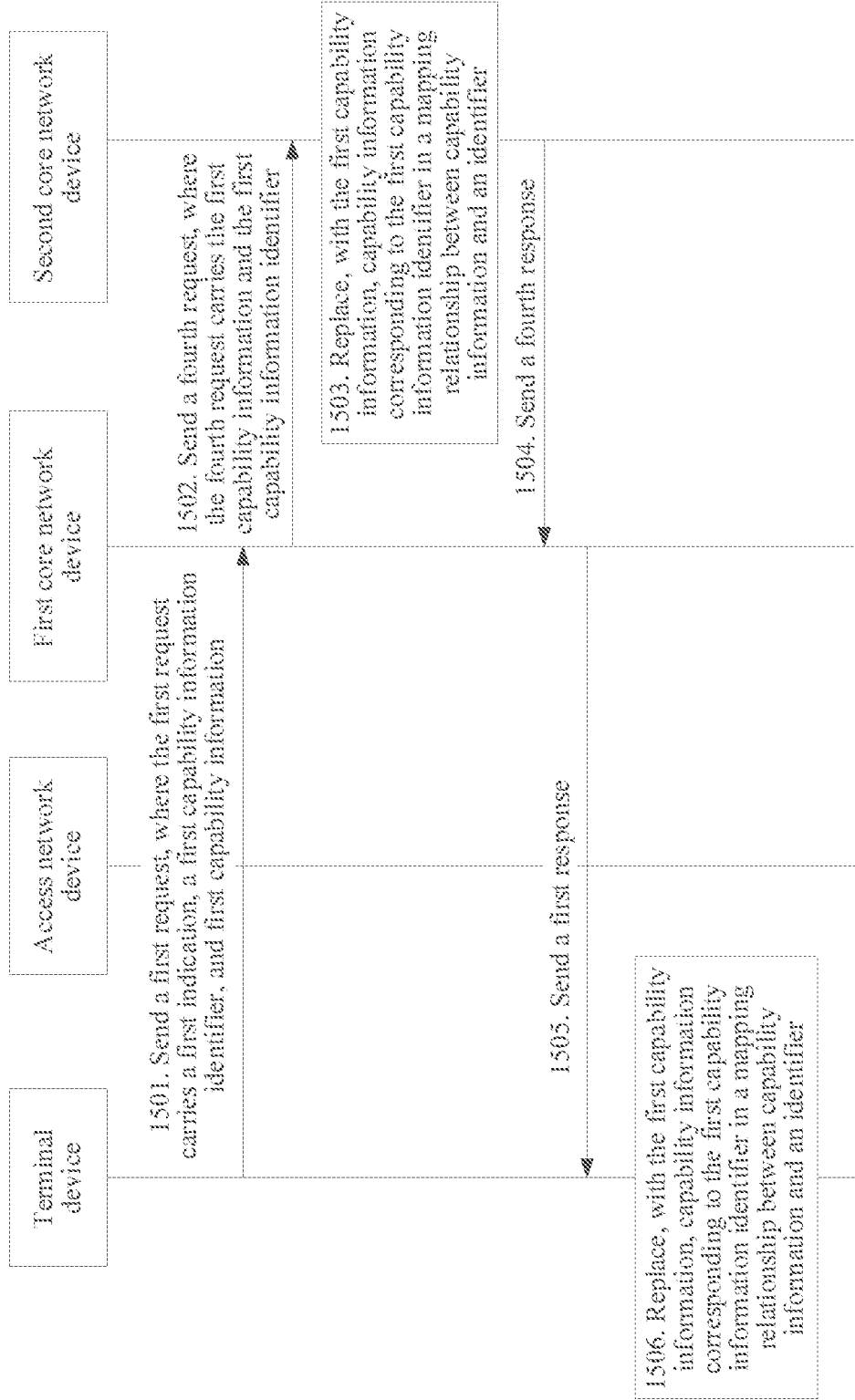
Figure 16:
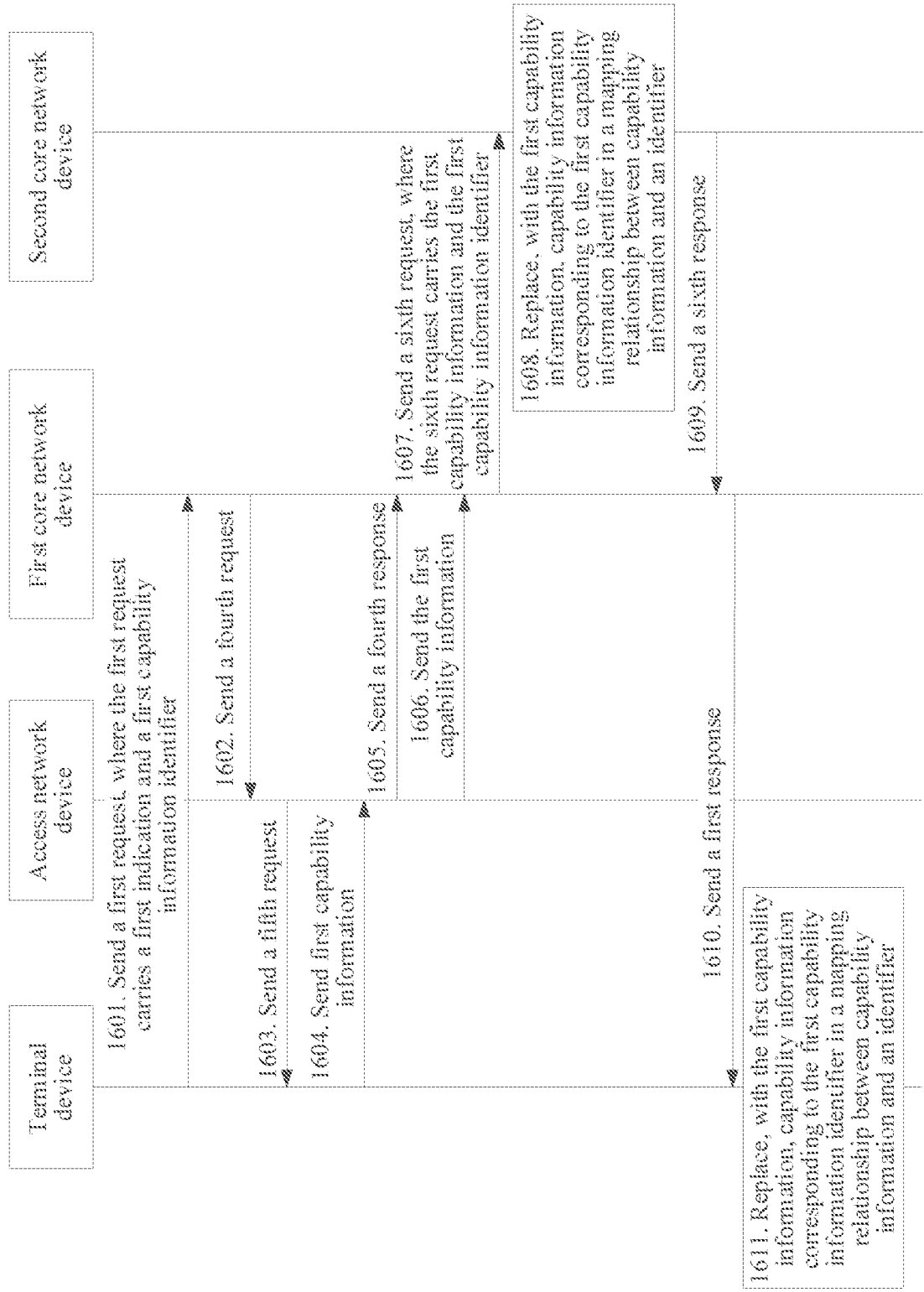

Based on She communication system described in FIG. 2, FIG. 15 is a schematic diagram of a method for setting capability information according to an embodiment of this application. In the method for setting capability information described in FIG. 15, the second core network device stores a mapping relationship between capability information and an identifier. The method tor setting capability information described in FIG. 15 is used to update capability information. As shown in FIG. 15, the method for setting capability information includes the following step 1501 to step 1506.

1501. The terminal device sends a first request to the first core network device.

Specifically, the terminal device sends a first request to the access network device, and then the access network device sends the first request to the first core network device. The first request carries a first indication, a first capability information identifier, and first capability information, and the first indication is used to set capability information of the terminal device. The setting capability information of the terminal device includes an update operation. Optionally, when the setting capability information of the terminal device includes the update operation, the first indication is used to indicate to update a group of capability information of the terminal device. Optionally, the first request is a registration request (registration request). Optionally, the first request carries an indication indicating that the terminal device supports radio capability signaling.

For example, capability information in a high-speed mode needs to be updated, and the first capability information identifier is ID1. The terminal device and the second core network device store a mapping relationship between capability information in a high-speed mode and ID1, a mapping relationship between capability information in a medium-speed mode and ID2, and a mapping relationship between capability information in a low-power consumption mode and ID3. If site terminal device needs to replace the capability information in the high-speed mode with first capability information, the terminal device sends a first request to the first core network device. The first request carries the first capability information, ID1, and a first indication, and the first indication is used to update the capability information of the terminal device.

1502. The first core network device sends a fourth request to the second core network device.

In this embodiment of this application, after receiving the first request from the terminal device, the first core network device sends a fourth request to the second core network device. The fourth request carries the first capability information and the first capability information identifier, and the fourth request is used to indicate the second core network device to replace, with the first capability information, capability information corresponding to the first capability information identifier in a mapping relationship between capability information and an identifier. For example, the fourth request carries the first capability information and ID1.

1503. The second core network device replaces, with the first capability information, capability information corresponding to the first capability information identifier in a mapping relationship between capability information and an identifier.

In this embodiment of this application, after receiving the fourth request, the second core network device replaces, with the first capability information, capability information corresponding to the first capability information identifier in a mapping relationship between capability information and an identifier. For example, as shown in FIG. 15, the capability information in the high-speed mode is replaced with the first capability information.

1504. The second core network device sends a fourth response to the first core network device.

In this embodiment of this application, after replacing, with the first capability information, the capability information corresponding to the first capability information identifier in the mapping relationship between capability information and an identifier, the second core network device sends a fourth response to the first core network device. The fourth response is a response to the fourth request. Optionally, the fourth response is used to indicate that the update succeeds.

1505. The first core network device sends a first response to the terminal device.

In this embodiment of this application, after receiving the fourth response from the second core network device, the first core network device sends a first response to the terminal device. Specifically, the first core network device first sends the first response to the access network device, and then the access network device sends the first response to the terminal device. The first response is a response to the first request. Optionally, the first response indicates that the update is completed. Correspondingly, the terminal device may receive the first response from the first core network device.

1506. The terminal device replaces, with the first capability information, capability information corresponding to tire first capability information identifier in a mapping relationship between capability information and an identifier.

In this embodiment of this application, the terminal device may replace, with the first capability information, capability information corresponding to the first capability information identifier in a mapping relationship between capability information and an identifier after receiving the first response. Alternatively, the terminal device may replace, with the first capability information, capability information corresponding to the first capability information identifier in a mapping relationship between capability information and an identifier before receiving the first response.

It can be seen that, by performing the method described in FIG. 15, the capability information of the terminal device can be updated.

Step 1501 to step 1506 shown in FIG. 15 may be combined with steps shown in any one or more of FIG. 3 to FIG. 5. FIG. 7, FIG. 9, FIG. 10, and FIG. 3. For example, step 1501 to step 1506 shown in FIG. 15 may be performed before or after step 301 to step 303 shown in FIG. 3. Step 1501 to step 1506 shown in FIG. 15 may be performed after step 401 to step 406 shown in FIG. 4. Step 1501 to step 1506 shown in FIG. 15 may be performed before or after step 501 to step 505 shown in FIG. 5. Step 1501 to step 1506 shown in FIG. 15 may be performed before or after step 701 to step 710 shown in FIG. 7. Step 1501 to step 1506 show n in FIG. 15 may be performed before or after step 901 to step 905 shown in FIG. 9. Step 1501 to step 1506 shown in FIG. 15 may be performed before or after step 1001 to step 1006 shown in FIG. 10. Step 1501 to step 1506 shown in FIG. 15 may be performed before or after step 1301 to step 1306 shown in FIG. 13. Alternatively, the solution shown in FIG. 15 may not be combined with the steps shown in FIG. 3 to FIG. 5. FIG. 7. FIG. 9, FIG. 10, and FIG. 13.

Based on the communication system described in FIG. 2, FIG. 16 is a schematic diagram of a method for setting capability information according to an embodiment of this application. In the method for setting capability information described in FIG. 16, the first, core network device stores a mapping relationship between capability information and an identifier. The method for setting capability information described in FIG. 16 is used to update capability information. As shown in FIG. 16, the method for setting capability information includes the following step 1601 to step 1611.

1601. The terminal device sends a first request to the first core network device.

Specifically, the terminal device sends a first request to the access network device, and then the access network device sends the first request to the first core network device. The first request carries a first indication and a first capability information identifier, and the first indication is used to set capability information of the terminal device. The setting capability information of the terminal device includes an update operation. Optionally, when the setting capability information of the terminal device includes the update operation, the first indication is used to indicate to update a group of capability information of the terminal device. Optionally, the first request is a registration request (registration request). Optionally, the first request carries an indication indicating that the terminal device supports radio capability signaling.

For example, capability information in a high-speed mode needs to be updated, and the first capability information identifier is ID1. The terminal device and the second core network device store a mapping relationship between capability information in a high-speed mode and ID1, a mapping relationship between capability information in a medium-speed mode and ID2, and a mapping relationship between capability information in a low-power consumption mode and ID3. If the terminal device needs to replace the capability information in the high-speed mode with first capability information, the terminal device sends a first request to the first core network device. The first request carries ID1 and a first indication, and the first indication is used to update the capability information of the terminal device.

1602. The first core network device sends a fourth request to the access network device.

In this embodiment of this application, after receiving the first request front the terminal device, the first core network device sends a fourth request to the access network device. The fourth request is used by the access network device to obtain capability information from the terminal device. Optionally, the fourth request may be a terminal device capability matching request (UE capability match request).

1603. The access network device sends a fifth request to the terminal device.

In this embodiment of this application, after receiving the fourth request, the access network device sends a fifth request to the terminal device. The fifth request is used to obtain capability information of the terminal device. Optionally, the fifth request may be a terminal device capability query request (UE capability enquiry).

1604. The terminal device sends first capability information to Site access network device.

In this embodiment of this application, after receiving the fifth request, the terminal device sends first capability information to the access network device. For example, if the terminal device needs to update She capability information in the high-speed mode to Site first capability information, the terminal device sends the first capability information to the access network device.

1605. The access network device sends a fourth response to the fourth request to the first core network device.

In this embodiment of this application, after receiving the first capability information, the access network device sends a fourth response to the fourth request to the first core network device. The fourth response is a response to the fourth request.

1606. The access network device sends the first capability information to fee first core network device.

In this embodiment of this application, after receiving the first capability information, the access network device sends the first capability information to the first core network device. An order of performing step 1605 and step 1606 is not limited in this embodiment of this application.

1607. The first, core network device sends a sixth request to the second core network device.

In this embodiment of this application, after receiving the first capability information from the access network device, the first core network device sends a sixth request to the second core network device. The sixth request carries the first capability information and the first capability information identifier, and the sixth request is used to indicate the second core network device to replace, with the first capability information, capability information corresponding to the first capability information identifier in a mapping relationship between capability information and an identifier.

1608. The second core network device replaces, with the first capability information, capability information corresponding to the first capability information identifier in a mapping relationship between capability information and an identifier.

In this embodiment of this application, after receiving the sixth request, the second core network device replaces, with the first capability information, capability information corresponding to She first capability information identifier in a mapping relationship between capability information and an identifier.

1609. The second core network device sends a sixth response to the first core network device.

In this embodiment of this application, after replacing, with the first capability information, the capability information corresponding to the first capability information identifier in a mapping relationship between capability information and an identifier, the second core network device sends a sixth response to the first core network device. The sixth response is a response to the sixth request. Optionally, the sixth response is used to indicate that the update succeeds.

1610. The first core network device sends a first response to the terminal device.

In this embodiment of this application, after receiving the sixth response from the second core network device, the first core network device sends a first response to the terminal device. Specifically, the first core network device first sends the first response to the access network device, and then the access network device sends the first response to the terminal device. The first response is a response to the first request. Optionally, the first response indicates that the update is completed. Correspondingly, the terminal device may receive the first response from the first core network device.

1611. The terminal device replaces, with the first capability information, capability information corresponding to the first capability information identifier in a snapping relationship between capability information and an identifier.

In this embodiment of this application, the terminal device may replace, with the first capability information, capability information corresponding to the first capability information identifier in a mapping relationship between capability information and an identifier after receiving the first response. Alternatively, the terminal device may replace, with the first capability information, capability information corresponding to the first capability information identifier in a mapping relationship between capability information and an identifier before receiving the first response.

It can be seen that, by performing the method described in FIG. 16, the capability information of the terminal device can be updated.

Step 1601 to step 1611 shown in FIG. 16 may be combined with steps shown in any one or more of FIG. 3 to FIG. 5, FIG. 7, FIG. 9, FIG. 10, and FIG. 13. For example, step 1601 to step 1611 shown in FIG. 16 may be performed before or after step 301 to step 303 shown in FIG. 3. Step 1601 to step 1611 shown in FIG. 16 may be performed after step 401 to step 406 shown in FIG. 4. Step 1601 to step 1611 shown in FIG. 16 may be performed before or after step 501 to step 505 shown in FIG. 5. Step 1601 to step 1611 shown in FIG. 16 may be perforated before or alter step 701 to step 710 shown in FIG. 7. Step 1601 to step 1611 shown in FIG. 16 may be performed before or after step 901 to step 905 shown in FIG. 9. Step 1601 to step 1611 shown in FIG. 16 may be performed before or after step 1001 to step 1006 shown in FIG. 10. Step 1601 to step 1611 shown in FIG. 16 may be performed before or after step 1301 to step 1306 shown in FIG. 13. Alternatively, the solution shown in FIG. 16 may not be combined with the steps shown in FIG. 3 to FIG. 5, FIG. 7, FIG. 9. FIG. 10, and FIG. 13.

Figure 17:
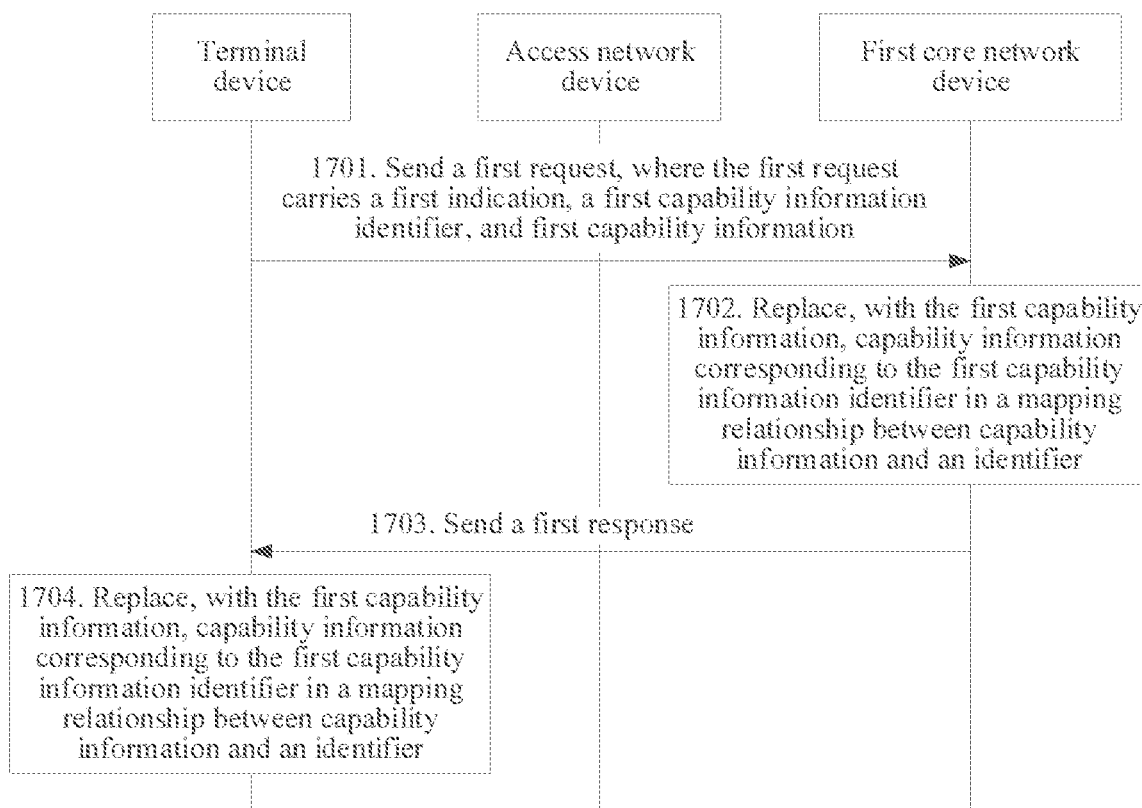

Based on the communication system described in FIG. 1, FIG. 17 is a schematic diagram of a method for setting capability information according to an embodiment, of this application. The method described in FIG. 17 differs from the method described in FIG. 15 in that in the method described in FIG. 1.5, the second core network device stores a mapping relationship between capability information and an identifier, while in the method described in FIG. 17, the first core network device stores a mapping relationship between capability information and an identifier. As shown in FIG. 17, the method for setting capability information includes the following step 1701 to step 1704.

1701. The terminal device sends a first request to the first core network device.

A specific implementation of step 1701 is the same as a specific implementation of step 1501. For details, refer to the specific Implementation of step 1501. Details are not described herein again.

1702. The first core network device replaces, with the first capability information, capability information corresponding to the first capability information identifier in a mapping relationship between capability information and an identifier.

In this embodiment of this application, after receiving the first request, the first core network device replaces, with the first capability information, capability information corresponding to the first capability information identifier in a mapping relationship between capability information and an identifier. For example, if the terminal device needs to replace capability information in a high-speed mode with first capability information, the terminal device sends a first request to the first core network device. The first request carries the first capability information, ID1, and a first indication, and the first indication is used to update the capability information of the terminal device. After receiving the first request, the first core network device replaces, with the first capability information, the capability information in the high-speed mode in a mapping relationship between capability information and an identifier.

1703. The first core network device sends a first response to the terminal device.

In this embodiment of this application, after replacing, with the first capability information, the capability information corresponding to the first capability information identifier in a mapping relationship between capability information and an identifier, the first core network device sends a first response to the terminal device.

1704. The terminal device replaces, with the first capability information, capability information corresponding to the first capability Information identifier in a mapping relationship between capability information and an identifier.

Specific implementations of step 1703 and step 1704 are the same as specific implementations of step 1505 and step 1506. For details, refer to the specific implementations of step 1505 and step 1506. Details are not described herein again.

It can be seen that, by performing the method described in FIG. 17, the capability information of the terminal device can be updated.

Step 1701 to step 1704 shown in FIG. 17 may be combined with steps shown in any one or more of FIG. 3. FIG. 4, FIG. 6. FIG. 8. FIG. 9, FIG. 11, and FIG. 14. For example, step 1701 to step 1704 shown in FIG. 17 may be performed before or after step 301 to step 303 shown in FIG. 3. Step 1701 to step 1704 shown in FIG. 17 may be performed after step 401 to step 406 shown in FIG. 4. Step 1701 to step 1704 shown in FIG. 17 may be performed before or after step 601 to step 605 shown in FIG. 6. Step 1701 to step 1704 shown in FIG. 17 may be performed before or after step 801 to step 810 shown in FIG. 8. Step 1701 to step 1704 shown in FIG. 17 may be performed after step 901 to step 905 shown in FIG. 9. Step 1701 to step 1704 shown in FIG. 17 may be performed be fore or after step 1101 to step 1104 shown in FIG. 0.11. Step 1701 to step 1704 shown in FIG. 17 may be performed before or after step 1401 to step 1404 shown in FIG. 14. Alternatively, the solution shown in FIG. 17 may not be combined with the steps shown in FIG. 3, FIG. 4, FIG. 6, FIG. 8. FIG. 9, FIG. 11, and FIG. 14.

Figure 18:
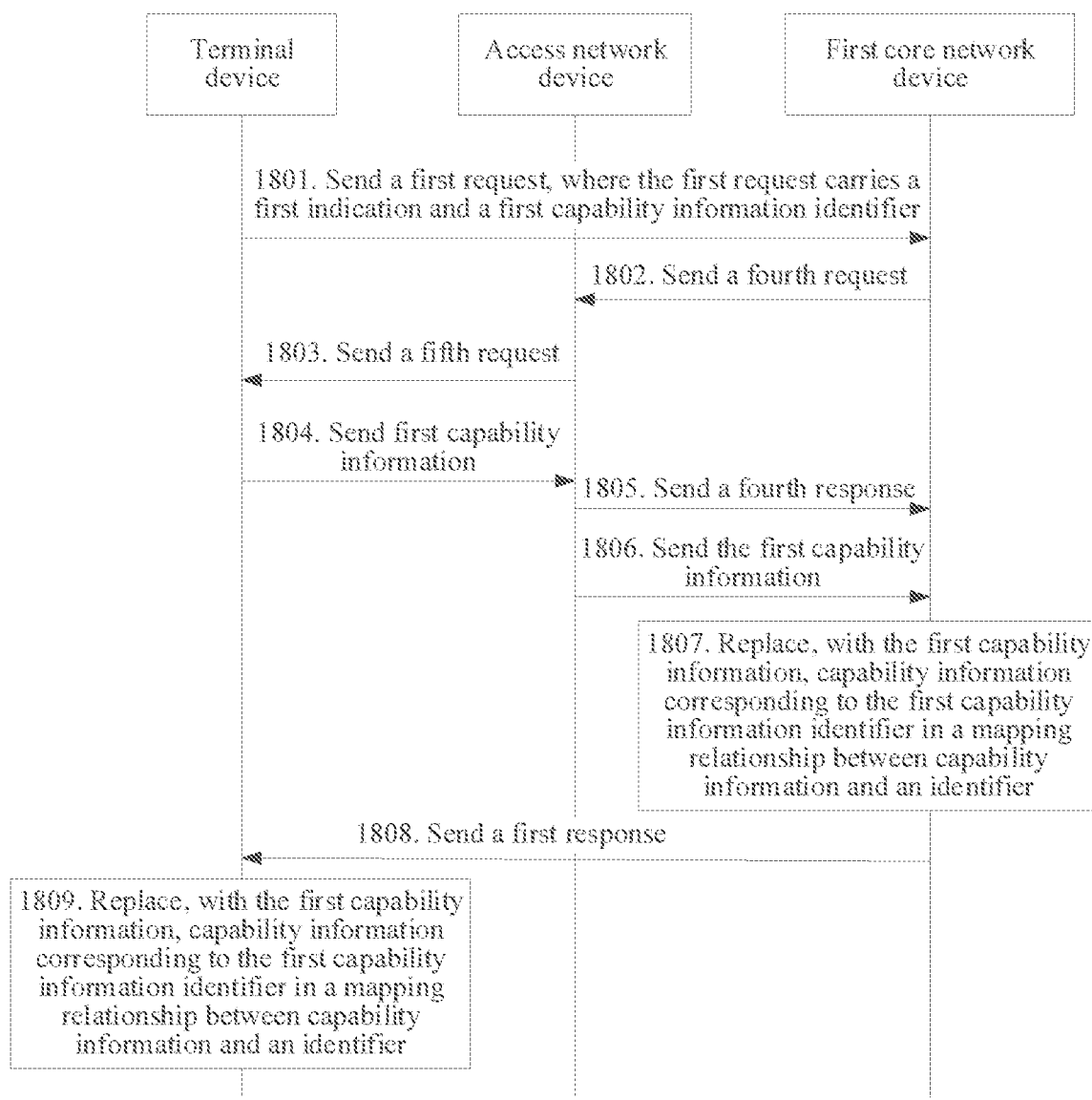

Based on the communication system described in FIG. 1, FIG. 18 is a schematic diagram of a method for setting capability information according to an embodiment of this application. The method described in FIG. 18 differs from the method described in FIG. 16 in that in the method described in FIG. 16, the second core network device stores a mapping relationship between capability information and an identifier, while in the method described in FIG. 18, the first core network device stores a mapping relationship between capability information and an identifier. As shown in FIG. 18, the method for setting capability information includes the following step 1801 to step 1809.

1801. The terminal device sends a first request to the first core network device.

1802. The first core network device sends a fourth request to the access network device.

1803. The access network device sends a fifth request to the terminal device.

1804. The terminal device sends first capability information to the access network device.

1805. The access network device sends a fourth response to the fourth request to the first core network device.

1806. The access network device sends the first capability information to the first core network device.

Specific implementations of step 1801 to step 1806 are the same as specific implementations of step 1601 to step 1606. For details, refer to the specific implementations of step 1601 to step 1606. Details are not described herein again.

1807. The first core network device replaces, with the first capability information, capability information corresponding to the first capability information identifier in a mapping relationship between capability information and an identifier.

In this embodiment of this application, after receiving the first capability information from the access network device, the first core network device replaces, with the first capability information, capability information corresponding to the first capability information identifier in a mapping relationship between capability information and an identifier.

1808. The first core network device sends a first response to the terminal device.

In this embodiment of this application, after replacing, with the first capability information, the capability information corresponding to the first capability information identifier in a mapping relationship between capability information and an identifier, the first core network device sends a first response to the terminal device.

1809. The terminal device replaces, with the first capability information, capability information corresponding to the first capability information identifier in a mapping relationship between capability information and an identifier.

Specific implementations of step 1808 and step 1809 are the same as specific implementations of step 1610 and step 1611. For details, refer to the specific implementations of step 1610 and step 1611. Details are not described herein again.

It can be seen that, by performing the method described in FIG. 18, the capability information of the terminal device can be updated.

Step 1801 to step 1809 shown in FIG. 18 may be combined with steps shown in any one or more of FIG. 3, FIG. 4, FIG. 6, FIG. 8, FIG. 9, FIG. 11, and FIG. 14. For example, step 1801 to step 1809 shown in FIG. 18 may be performed before or after step 301 to step 303 shown in FIG. 3. Step 1801 to step 1809 shown in FIG. 18 may be performed alter step 401 to step 406 shown in FIG. 4. Step 1801 to step 1809 shown in FIG. 18 may be performed before or after step 601 to step 605 shown in FIG. 6. Step 1801 to step 1809 shown in FIG. 18 may be performed before or after step 801 to step 810 shown in FIG. 8. Step 1801 to step 1809 shown in FIG. 18 may be performed after step 901 to step 905 shown in FIG. 9. Step 1801 to step 1809 shown in FIG. 18 may be performed be fore or after step 1101 to step 1104 shown in FIG. 11. Step 1801 to step 1809 shown in FIG. 18 may be performed before or after step 1401 to step 1404 shown in FIG. 14. Alternatively, the solution shown in FIG. 18 may not be combined with the steps shown in FIG. 3, FIG. 4, FIG. 6, FIG. 8, FIG. 9. FIG. 11, and FIG. 14.

Figure 19:
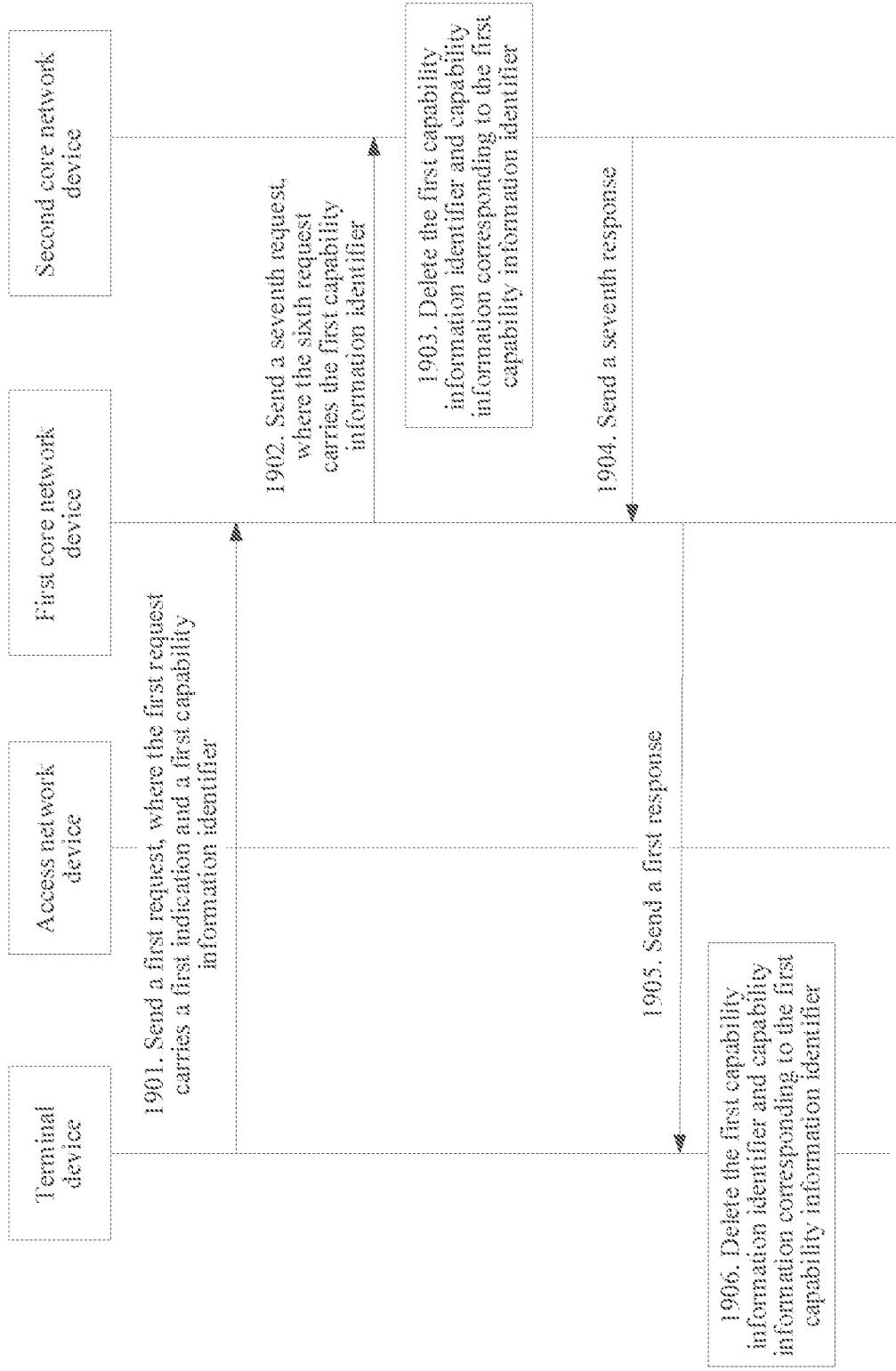

Based on the communication system described in FIG. 2, FIG. 19 is a schematic diagram of another method for setting capability information according to an embodiment of this application. In the method described in FIG. 19, the second core network device stores a mapping relationship between capability information and an identifier, and the method shown in FIG. 19 is used to delete the capability information. As shown in FIG. 19, the method for setting capability information, includes the following step 1901 to step 1906.

1901. The terminal device sends a first request to the first core network device.

Specifically, the terminal device first sends a first request to the access network device, and then the access device sends the first request to the first core network device. In this embodiment of this application, the first request carries a first capability information identifier and a first indication, and the first indication sets capability information of the terminal device. The setting capability information of the terminal device includes a deletion operation. Optionally, when the setting capability information of the terminal device includes the deletion operation, the first indication is used to indicate to delete a group of stored capability information of the terminal device. Optionally, the first request further carries an indication indicating that the terminal device supports radio capability si gosling. Optionally, the first request is a registration request.

The first capability information identifier is an identifier corresponding to capability information that needs to be deleted. In this embodiment of this application, when the terminal device sends the first request to the first core network device, the first core network device has allocated one or more capability information identifiers to the terminal device. For example, when the terminal device sends the first request to the first core network device, the terminal device and the second core network device have stored a mapping relationship between capability information in a high-speed mode and ID1, a mapping relationship between capability information in a medium-speed mode and ID2, and a mapping relationship between capability information in a low-power consumption mode and ID3. If the terminal device needs to delete the capability information in the high-speed mode, the terminal device sends a first request to the first core network device through the access network device, where the first request carries ID1 and a first indication.

1902. The first, core network device sends a seventh request to the second core network device.

In this embodiment of this application, after receiving the first request, the first core network device sends a seventh request to the second core network device. The seventh request carries the first capability information identifier, and the seventh request is used to indicate the second core network device to delete She first capability information identifier and capability information corresponding to the first capability information identifier. The seventh request may be specifically a deletion request.

1903. The second core network device deletes the first capability information identifier and capability information corresponding to the first capability information identifier.

In this embodiment of this application, after receiving the seventh request from the first core network device, the second core network device deletes the first capability information identifier and capability information corresponding to the first capability information identifier.

1904. The second core network device sends a seventh response so the first core network device.

In this embodiment of this application, after deleting the first capability information identifier and the capability information corresponding to the first capability information identifier, the second core network device sends a seventh response to the first core network device. The seventh response is a response to the seventh request.

1905. The first core network device sends a first response to the terminal device.

In this embodiment of this application, after receiving the seventh response from the first core network device, the first core network device sends a first response to the terminal device. The first response is a response to the first request. Optionally, the first response indicates that the deletion succeeds. Correspondingly, the terminal device may receive the first response.

1906. The terminal device deletes the first capability information identifier and capability information corresponding to the first capability information identifier.

Optionally, the terminal device may delete the first capability information identifier and capability information corresponding to the first capability information identifier after receiving the first response. Alternatively, the terminal device may delete the first capability information identifier and capability information corresponding to the first capability information identifier after sending the first request.

Alternatively, the terminal device may delete the first capability information identifier and capability information corresponding to the first capability information identifier before sending the first request.

It can be seen that, by performing the method described in FIG. 19, the capability information of the terminal device can be deleted.

Step 1901 to step 1906 shown in FIG. 19 may be combined with steps shown in any one or more of FIG. 3 to FIG. 5, FIG. 7, FIG. 9, FIG. 10, FIG. 13, FIG. 15, and FIG. 16. For example, step 1901 to step 1906 shown in FIG. 19 may be performed before or after step 301 to step 303 shown in FIG. 3. Step 1901 to step 1906 shown in FIG. 19 may be performed after step 401 to step 406 shown in FIG. 4. Step 1901 to step 1906 shown in FIG. 19 may be performed before or after step 501 to step 505 shown in FIG. 5. Step 1901 to step 1906 shown in FIG. 19 may be performed before or after step 701 to step 710 shown in FIG. 7. Step 1901 so step 1906 shown in FIG. 19 may be performed before or after step 901 to step 905 shown in FIG. 9. Step 1901 to step 1906 shown in FIG. 19 may be performed before or after step 1001 to step 1006 shown in FIG. 10. Step 1901 to step 1906 shown in FIG. 19 may be performed before or after step 1301 to step 1306 shown in FIG. 13. Step 1901 to step 1906 shown in FIG. 19 may be performed before or after step 1501 to step 1506 shown in FIG. 15. Step 1901 to step 1906 shown in FIG. 19 may be performed before or after step 1601 to step 1611 shown in FIG. 16. Alternatively, the solution shown in FIG. 19 may not be combined with the steps shown in FIG. 3 to FIG. 5, FIG. 7, FIG. 9, FIG. 10, FIG. 13, FIG. 15, and FIG. 16.

Figure 20:
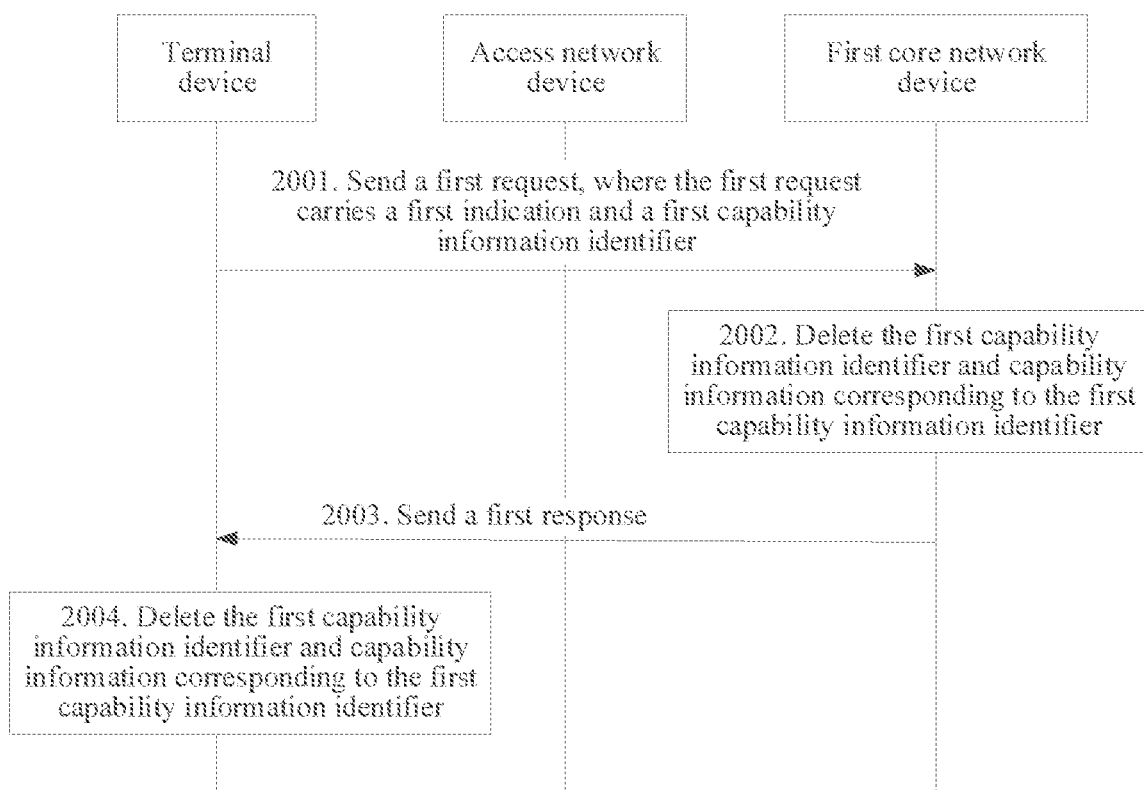

Based on the communication system described in FIG. 1. FIG. 20 is a schematic diagram of another method for setting capability information according to an embodiment of this application. FIG. 20 differs from FIG. 19 in that locations for storing a mapping relationship between capability information and an identifier are different, in the method shown in FIG. 19, a mapping relationship between capability information and an identifier is stored into the second core network device, and the mapping relationship between capability information and an identifier needs to be deleted by the second core network device. In the method shown in FIG. 20, a mapping relationship between capability information and an identifier is stored into the first core network device, and the mapping relationship between capability information and an identifier needs to be deleted by the first core network device. As shown in FIG. 20, the method for setting capability information includes the following step 2001 to step 2004.

2001. The terminal device sends a first request to the first core network device.

A specific implementation of step 2001 is the same as a specific implementation of step 1901. For details, refer to the specific implementation of step 1901. Details are not described herein again.

2002. The first core network device deletes stored first capability information identifier and capability information corresponding to the first capability information identifier.

In this embodiment of this application, after receiving the first request, the first core network device deletes stored first capability information identifier and capability information corresponding to the first capability information identifier. For example, if the terminal device needs to delete capability information in a high-speed mode, the terminal device sends a first request to the first core network device through the access network device, where the first, request carries ID1 and a first indication. After receiving the first request, the first core network device deletes a mapping relationship between the capability information in the high-speed mode and ID1.

2003. The first core network device sends a first response to the terminal device through the access network device.

In this embodiment of this application, after deleting the first capability information identifier and the capability information corresponding to the first capability information identifier, the first core network device sends a first response to the terminal device through the access network device. The first response is a response to the first, request. Optionally, the first response indicates that the deletion succeeds.

2004. The terminal device deletes first capability information identifier and capability information corresponding to the first capability information identifier.

Optionally, the terminal device may delete the first capability information identifier and capability information corresponding to the first capability information identifier after receiving the first response. Alternatively, the terminal device may delete the first capability information identifier and capability information corresponding to the first capability information identifier after sending the first request. Alternatively, the terminal device may delete the first capability information identifier and capability information corresponding to the first capability information identifier before sending the first request.

It can be seen that, by performing the method described in FIG. 20, the capability information of the terminal device can be deleted.

Step 2001 to step 2004 shown in FIG. 20 may be combined with steps shown in any one or more of FIG. 3, FIG. 4, FIG. 6. FIG. 8, FIG. 9, FIG. 11, FIG. 14, FIG. 17, and FIG. 18. For example, step 2001 to step 2004 shown in FIG. 20 may be performed before or after step 301 to step 303 shown in FIG. 3. Step 2001 to step 2004 shown in FIG. 20 may be performed after step 401 to step 406 shown in FIG. 4. Step 2001 to step 2004 shown in FIG. 20 may be performed before or after step 601 to step 605 show n in FIG. 6. Step 2001 to step 2004 shown in FIG. 20 may be performed before or after step 801 to step 810 shown in FIG. 8. Step 2001 to step 2004 shown in FIG. 20 may be performed after step 901 to step 905 shown in FIG. 9. Step 2001 to step 2004 shown in FIG. 20 may be performed before or after step 1011 to step 1104 shown in FIG. 11. Step 2001 to step 2004 shown in FIG. 20 may be performed before or after step 1401 to step 1404 shown in FIG. 14. Step 2001 to step 2004 shown in FIG. 20 may be performed before or after step 1701 to step 1704 shown in FIG. 17. Step 2001 to step 2004 shown in FIG. 20 may be performed before or after step 1801 to step 1809 shown in FIG. 18. Alternatively, the solution shown in FIG. 20 may not be combined with the steps shown in FIG. 3, FIG. 4. FIG. 6, FIG. 8, FIG. 9, FIG. 11, FIG. 14, FIG. 17, and FIG. 18.

Figure 21:
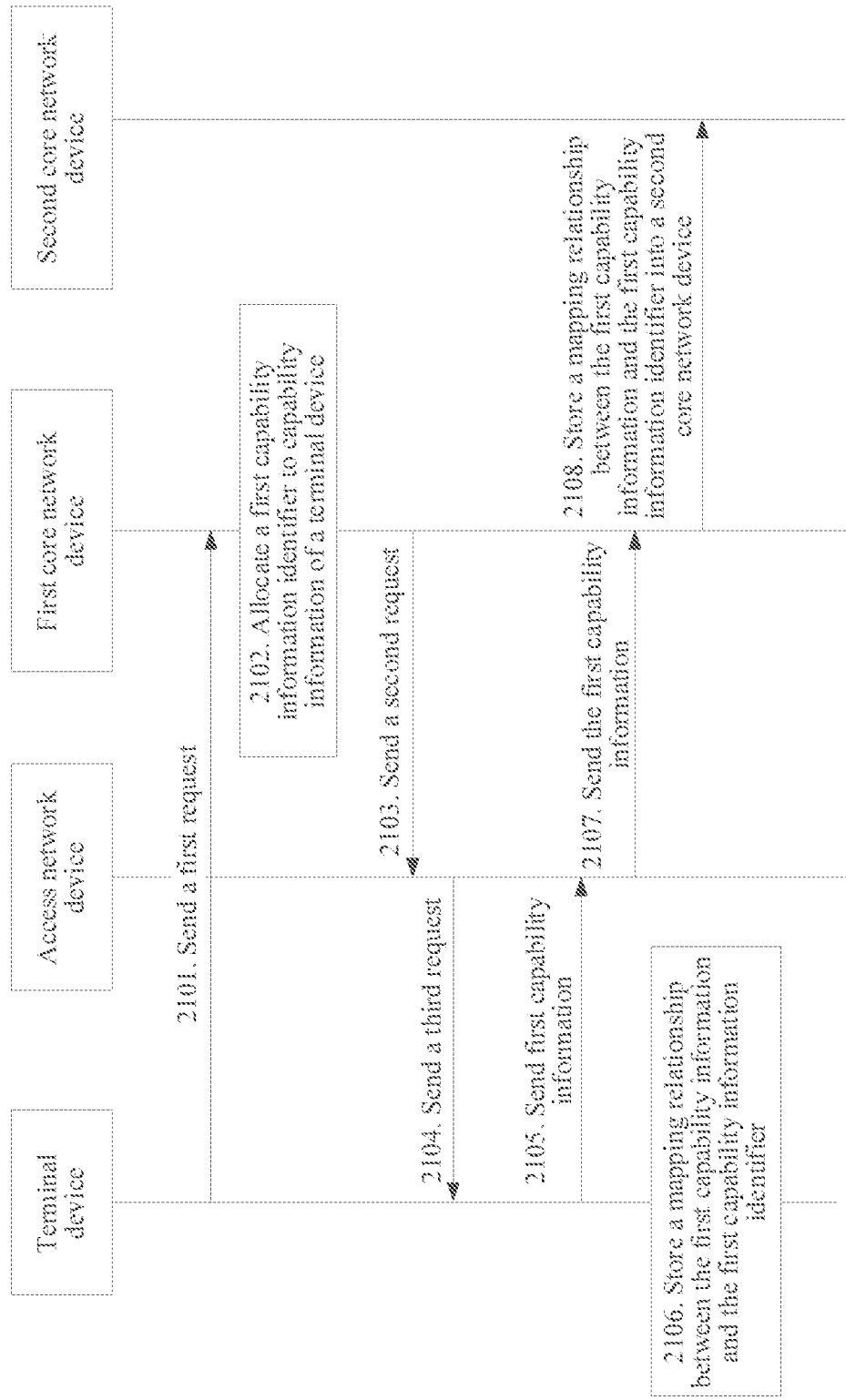
FIG. 21 to FIG. 24 are schematic flowcharts of identifier allocation methods according to embodiments of this application.

Based on the communication system described in FIG. 2, FIG. 21 is a schematic diagram of an identifier allocation method according to an embodiment of this application. As shown in FIG. 21, the identifier allocation method includes the following step 2101 to step 2108.

2101. The terminal device sends a first request to the first core network device.

A specific implementation of step 2101 is the same as a specific implementation of step 301. For details, refer to the specific implementation of step 301. Details are not described herein again.

2102. The first core network device allocates a first capability information identifier to capability information of the terminal device.

In tins embodiment of this application, after receiving the first request, the first core network device allocates a first capability information identifier to capability information of the terminal device.

2103. Site first core network device sends a second request to the access network device.

In this embodiment of this application, after the first core network device allocates the first capability information identifier to the capability information of the terminal device, the first core network device sends a second request to the access network device. The second request carries the first capability information identifier. The second request is used by the access network device to obtain capability information from the terminal device. Optionally, the second request may be a terminal device capability matching request (UE capability match request).

2104. The access network device sends a third request to the terminal device.

In this embodiment of this application, after receiving the second request, the access network device sends a third request to the terminal device. The third request carries the first capability information identifier. The third request is used to obtain capability information of the terminal device. Optionally, the third request may be a terminal device capability query request (UE capability enquiry).

2105. The terminal device sends first capability information to the access network device.

In this embodiment of this application, after receiving the third request from the access network device, the terminal device sends first capability information to the access network device.

2106. The terminal device stores a mapping relationship between the first capability information and the first capability information identifier.

In this embodiment of this application, after receiving the third request, the terminal device stores a trapping relationship between the first capability information and the first capability information identifier. An order of performing step 2105 and step 2106 is not limited in this embodiment of this application.

2107. The access network device sends the first capability information to the first core network device.

In this embodiment of this application, after receiving the first, capability information from the terminal device, the access network device sends the first capability information to the first core network device.

Optionally, alter receiving the first capability information from the terminal device, the access network device sends a second response its the second request to the first core network device. The second response may be a UE capability match response. Correspondingly, the first core network device may receive the second response from the access network device.

2108. The first core network device stores a mapping relationship between the first capability information and the first capability information identifier into the second core network device.

In this embodiment of this application, after receiving the first capability information, the first core network device stores a mapping relationship between the first capability information and the first capability information identifier into the second core network device. After receiving the mapping relationship between the first capability information and the first capability information identifier, the core network device stores the mapping relationship between the first capability information and the first capability information identifier.

Step 2105 to step 2108 are optional steps.

Optionally, the first core network device may add the mapping relationship between the first capability information and the first capability information identifier to a creation request and send the creation request to the second core network device for storage. Optionally, after storing the mapping relationship, the second core network device may return a creation response to the first core network device. Correspondingly, the first core network device may receive the creation response from the second core network device.

In an optional implementation, the second core network device stores mapping relationships between at least two groups of capability information of the terminal device and identifiers. The terminal device stores mapping relationships between at least two groups of capability information of the terminal de vice and identifiers. For example, both the second core network device and the terminal device store a mapping relationship between capability information in a high-speed mode and ID1, a mapping relationship between capability information in a medium-speed muds and ID2, and a mapping relationship between capability information in a low-power consumption mode and ID3. Both the terminal device and the second core network device store mapping relationships between at least two groups of capability information of the terminal device and identifiers, so that the terminal device can be prevented from reapplying to the first core network device for allocation of a capability information identifier each time the terminal device switches used capability information.

In an optional implementation, after receiving the first request, the first core network device may further allocate a capability information identifier count to She terminal device. The second request further carries the capability information identifier count. Optionally, the first core network device may further store the capability information identifier count. Correspondingly, the third request further carries the capability information identifier count. Optionally, after receiving the third request, the terminal device stores the capability information identifier count. Optionally, the capability Information identifier count is a maximum quantity of capability information identifiers in the terminal device. The first core network device may first allocate a capability information identifier count to the terminal device, and then allocate a first capability information identifier to the capability information of the terminal device. Alternatively, the first core network device may first allocate a first capability information identifier to the capability information of the terminal device, and then allocate a capability information identifier count to the terminal device. The terminal device may first store a mapping relationship between the first capability information and the first capability information identifier, and then store the capability information identifier count. Alternatively, the terminal device may first store the capability information identifier count, and then store a mapping relationship between the first capability information and the first capability information identifier. By implementing this implementation, capability information identifiers stored by the terminal device can be limited, so prevent the terminal device from applying to the first core network device for a large quantity of capability information identifiers and causing a waste of capability information identifiers.

It can be seen that, by performing the method described in FIG. 21, the first core network device can allocate a capability information identifier to the terminal device, so that the terminal device can send the capability information identifier instead of capability information to another device.

Therefore, the method described in FIG. 21 is performed to help save transmission resources for transmitting the capability information.

Step 2101 to step 2108 shown in FIG. 21 may be combined with steps shown in any one or more of FIG. 9, FIG. 10. FIG. 13. FIG. 15. FIG. 16, and FIG. 19. For example, step 2101 to step 2108 shown in FIG. 21 may be performed before or after step 901 to step 905 shown in FIG. 9. Step 2101 to step 2108 shown in FIG. 21 may be performed before or after step 1001 to step 1006 shown in FIG. 10. Step 2101 to step 2108 shown in FIG. 21 may be performed before or after step 1301 to step 1306 shown in FIG. 13. Step 2101 to step 2108 shown in FIG. 21 may be performed before or after step 1501 to step 1506 shown in FIG. 15. Step 2101 to step 2108 shown in FIG. 21 may be performed before or after step 1601 to step 1611 shown in FIG. 16. Step 2101 to step 2108 shown in FIG. 21 may be performed before or after step 1901 to step 1906 shown in FIG. 19. Alternatively; the solution shown in FIG. 21 may not be combined with the steps shown in FIG. 9. FIG. 10, FIG. 13, FIG. 15, FIG. 16, and FIG. 19.

Figure 22:
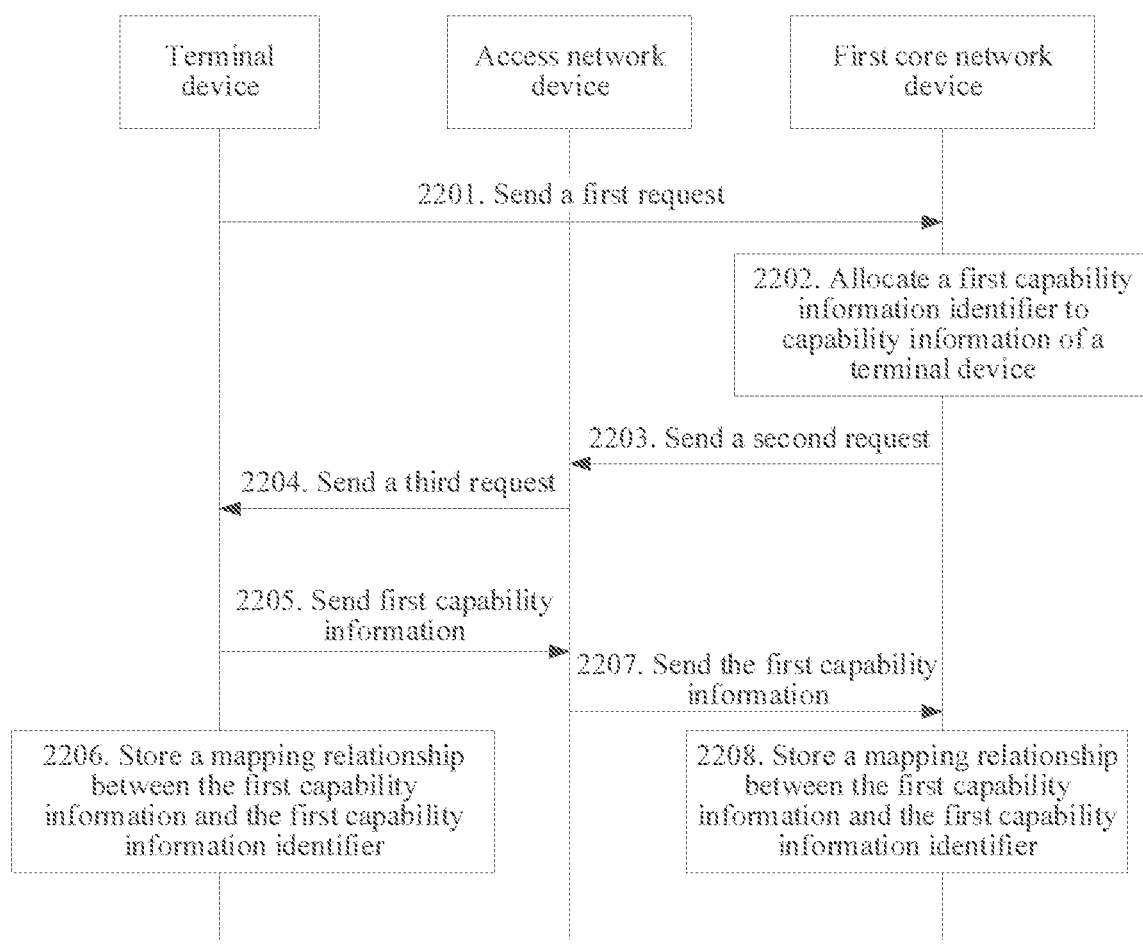

Based on the communication system described in FIG. 1, FIG. 22 is a schematic diagram of an identifier allocation method according to an embodiment of this application. FIG. 22 differs from FIG. 21 in that in FIG. 22, a mapping relationship between capability information and an identifier is stored into the first core network device, while in FIG. 21, a mapping relationship between capability information and an identifier is stored into the second core network device. As shown in FIG. 22, the identifier allocation method includes the following step 2201 to step 2208.

2201. The terminal device sends a first request to the first core network device.

2202. The first core network device allocates a first capability information identifier to capability information of the terminal device.

2203. The first core network device sends a second request to the access network device.

2204. The access network device sends a third request to the terminal device.

2205. The terminal device sends first capability information to the access network device.

2206. The terminal device stores a mapping relationship between the first capability information and the first capability information identifier.

2207. The access network device sends the first capability information to the first core network device.

Specific implementations of step 2201 to step 2207 are the same as specific implementations of step 2101 to step 2107. For details, refer to the specific implementations of step 2101 to step 2107. Detail are not described herein again.

2208. The first core network device stores a mapping relationship between the first capability information and the first capability information identifier.

In this embodiment of this application, after receiving the first capability information, the first core network device stores a mapping relationship between the first capability information and the first capability information identifier.

In an optional implementation, the first core network device stores mapping relationships between at least two groups of capability information of the terminal device and identifiers. The terminal device stores mapping relationships between at least two groups of capability information of the terminal device and identifiers. For example, both the second core network device and the terminal device store a mapping relationship between capability information in a high-speed mode and ID1, a mapping relationship between capability information in a medium-speed mode and ID2, and a mapping relationship between capability information in a low-power consumption mode and ID3. Both the terminal device anil the first core network device store mapping relationships between at least two groups of capability information of the terminal device and identifiers, so that the terminal device can be prevented from reapplying to the first core network device for allocation of a capability information identifier each time the terminal device switches used capability information.

In an optional implementation, after receiving the first request, the first core network device may further allocate a capability information identifier count to the terminal device. The second request further carries the capability information identifier count. Optionally, the first core network device may further store the capability information identifier count. Correspondingly, the third request further carries the capability information identifier count. Optionally, after receiving the third request, the terminal device stores the capability information identifier count. Optionally, the capability information identifier count is a maximum quantity of capability information identifiers in the terminal device. The first core network device may first allocate a capability information identifier count to the terminal device, and then allocate a first capability information identifier to the capability information of the terminal device. Alternatively, the first core network device may first allocate a first capability information identifier to the capability information of the terminal device, and then allocate a capability information identifier count to the terminal device. The terminal device may first store a mapping relationship between the first capability information and the first capability information identifier, and then store the capability information identifier count. Alternatively, the terminal device may first store the capability information identifier count, and then store a mapping relationship between the first capability information and the first capability information identifier. By implementing this implementation, capability information identifiers stored by the terminal device can be limited, to prevent the terminal device from applying to the first core network device for a large quantity of capability information identifiers and causing a waste of capability information identifiers.

It can be seen that, by performing the method described in FIG. 22, the first core network device can allocate a capability information identifier to the terminal device, so that the terminal device can send the capability information identifier instead of capability information to another device. Therefore, the method described in FIG. 22 is performed to help save transmission resources for transmitting the capability information.

Step 2201 to step 2204 shown in FIG. 22 may be combined with steps shown in any one or more of FIG. 9, FIG. 11, FIG. 14, FIG. 17, FIG. 18, and FIG. 20. For example, step 2201 to step 2208 shown in FIG. 22 may be performed alter step 901 to step 905 shown in FIG. 9. Step 2201 to step 2208 shown in FIG. 22 may be performed before or after step 1101 to step 1104 shown in FIG. 11. Step 2201 to step 2208 shown in FIG. 22 may be performed before or after step 1401 to step 1404 shown in FIG. 14. Step 2201 to step 2208 shown in FIG. 22 may be performed before or after step 1701 to step 1704 shown in FIG. 17. Step 2201 to step 2208 shown in FIG. 22 may be performed before or after step 1801 to step 1809 shown in FIG. 18. Step 2201 to step 2208 shown in FIG. 22 may be performed before or after step 2001 to step 2004 shown in FIG. 20. Alternatively, the solution shown in FIG. 22 may not be combined with the steps shown in FIG. 9, FIG. 11, FIG. 14, FIG. 17. FIG. 18, and FIG. 20.

Figure 23:
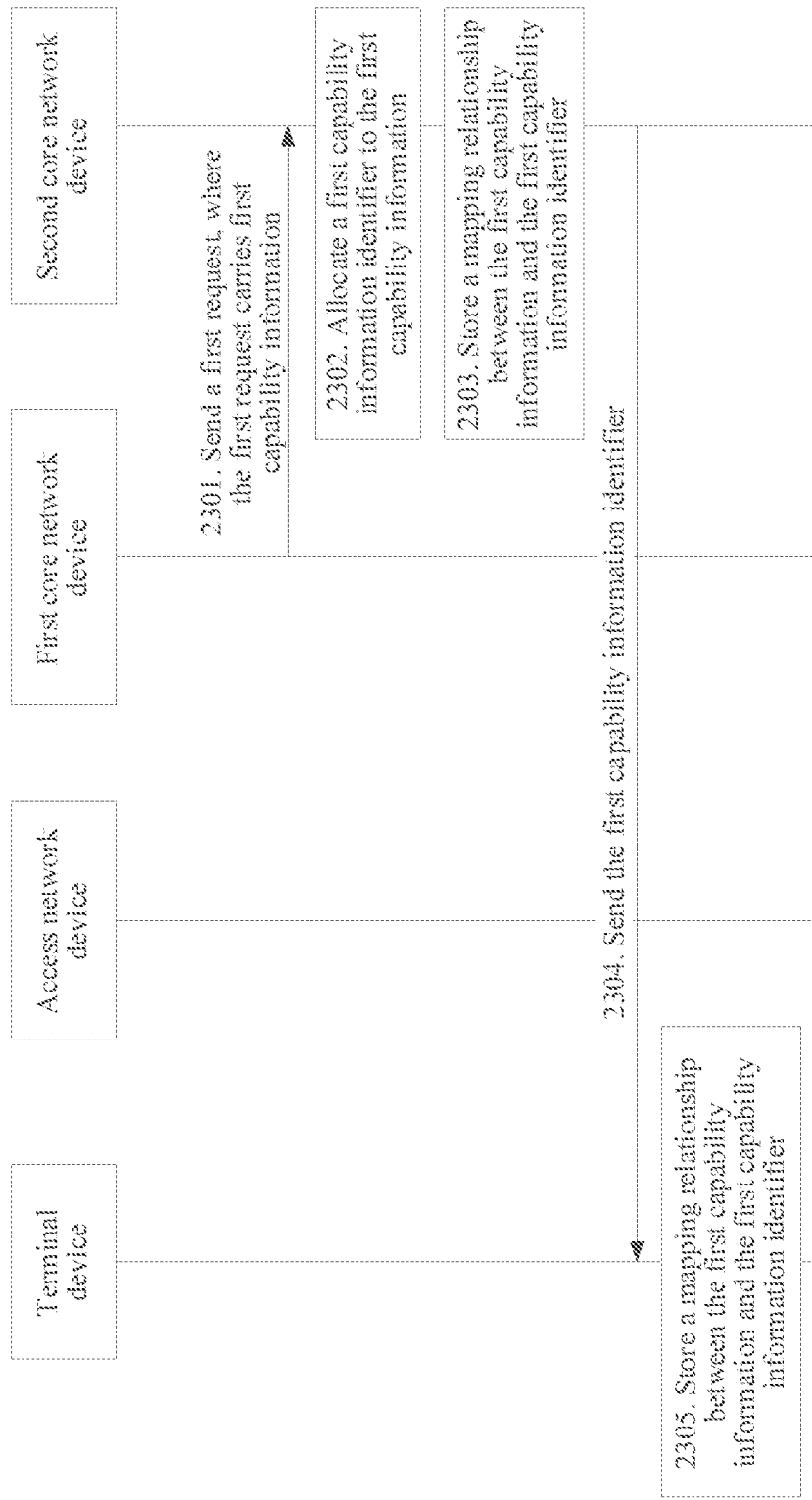

Based on the communication system described in FIG. 2, FIG. 23 is a schematic diagram of an identifier allocation method according to an embodiment of this application. As shown its FIG. 23, the identifier allocation method includes the following step 2301 to step 2305.

2301. The first core network device sends a first request to the second core network device.

The first request carries first capability information of the terminal device. The first capability information is capability information to which an identifier needs to be allocated. Optionally, the first request may be a creation request.

2302. The second core network device allocates a first capability information identifier to the first capability information.

In this embodiment of this application, after receiving the first request, the second core network device allocates a first capability information identifier to the first capability information.

For example, the first capability information Is capability information in a high-speed mode. After receiving the first request, the second core network device allocates ID1 to the capability information in the high-speed mode.

2303. The second core network device stores a mapping relationship between the first capability information and the first capability information identifier.

In this embodiment of this application, alter allocating the first capability information identifier to the first capability information, the second core network device stores a mapping relationship between the first capability information and the first capability information identifier.

2304. The second core network device sends the first capability information identifier to the terminal device.

In this embodiment of this application, alter allocating the first capability information identifier to the first capability information, the second core network device sends the first capability information identifier to the terminal device. Specifically, the second core network device first sends the first capability information identifier to the first core network device. Then, the first core network device sends the first capability information identifier to the terminal device. An order of performing step 2303 and step 2304 is not limited in this embodiment of this application.

2305. The terminal device stores a mapping relationship between the first capability information and the first capability information identifier.

In this embodiment of this application, after receiving the first capability information identifier, the terminal device stores a mapping relationship between the first capability information and the first capability information identifier.

Optionally, before the first core network device sends the first request to the second core network device, the first core network device may receive a second request, such as a registration request, sent by the terminal device. After receiving the second request, the first core network device sends a third request to the access network device. After receiving the third request, the access network device sends a fourth request, such as a query request, to the terminal device. After receiving the fourth request, the terminal device sends first capability information to the access network device. After receiving the first capability information, the access network device sends the first capability information and a third response to the third request to the first core network device. After receiving the first capability information, the first core network device sends the first request to the second core network device.

Optionally, before the first core network device sends the first request to the second core network device, the first core network device may receive a second request, such as a registration request, sent by the terminal device. The second request carries first capability information. After receiving the second request, the first core network device sends the first request to the second core network device.

Optionally, the second core network device may specifically send a first capability information identifier to the terminal device in the following manner: sending, by the second core network device, a first response to the first request to the first core network device, where the first response carries first capability information; and sending, by the first core network device, a second response to the second request to the terminal device after receiving the first response, where the second response carries the first capability information.

It can be seen that, by performing the method described in FIG. 23, the second core network device can allocate a capability information identifier to the terminal device, so that the terminal device can send the capability information identifier instead of capability information to another device. Therefore, the method described in FIG. 23 is performed to help save transmission resources for transmitting the capability information.

Figure 24:
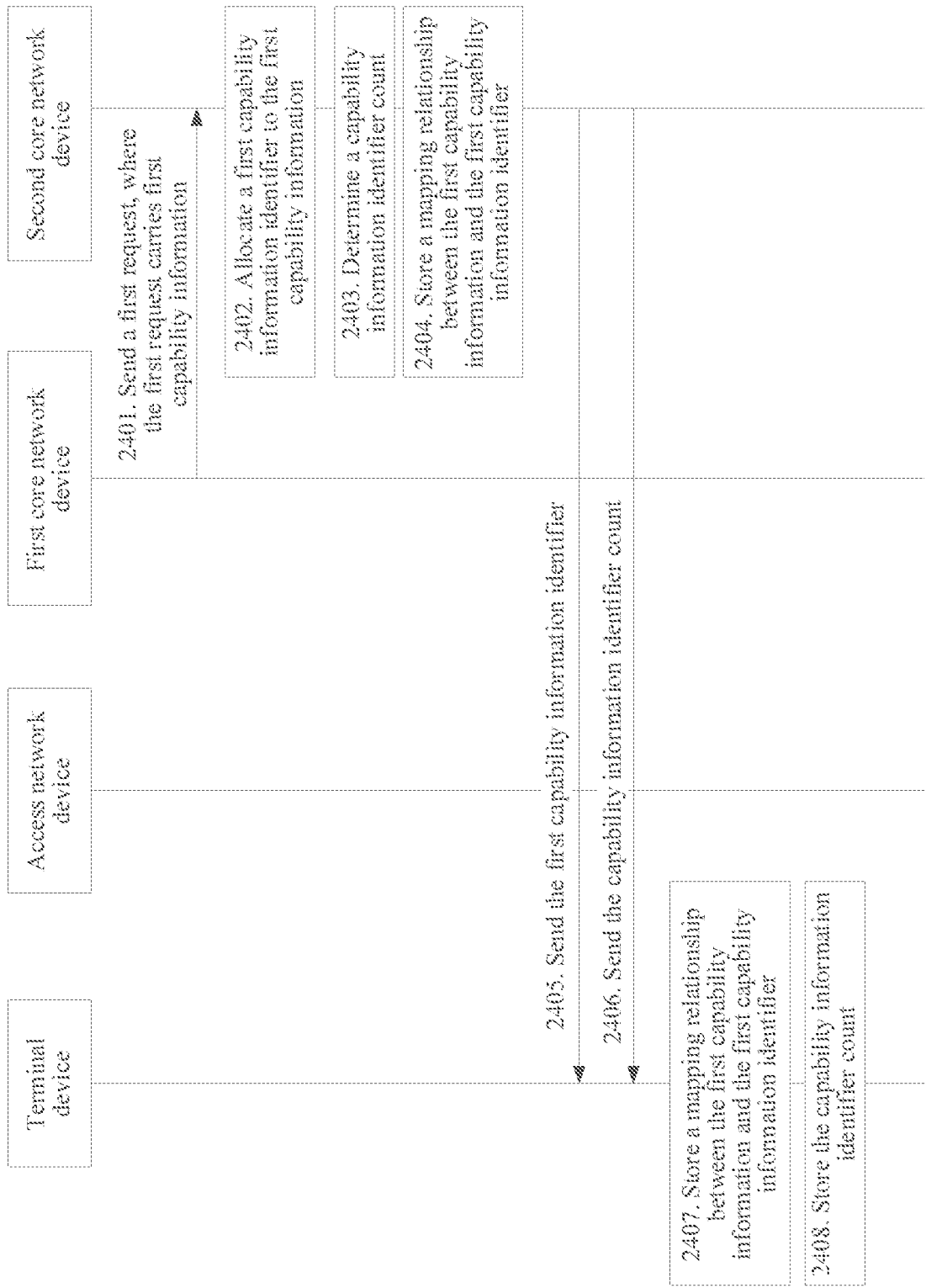

Based on the communication system described in FIG. 2, FIG. 24 is a schematic diagram of an identifier allocation method according to an embodiment of this application. As shown in FIG. 24, the identifier allocation method includes the following step 2401 to step 2408.

2401. The first core network device sends a first request to the second core network device.

2402. The second core network device allocates a first, capability information identifier to the first capability information.

Specific implementations of step 2401 and step 2402 are the same as specific implementations of step 2301 and step 2302. For details, refer to the specific implementations of step 2301 and step 2302. Details are not described herein again.

2403. The second core network device determines a capability information identifier count.

In this embodiment of this application, after receiving the first request, the second core network device determines a capability information identifier count. Optionally, the capability information identifier count is a maximum quantity of capability information identifiers in the terminal device. For example, if capability information identifier data is 3, the terminal device can store a maximum of three capability information identifiers.

An order of performing step 2402 and step 2403 is not limited in this embodiment of this application.

2404. The second core network device stores a mapping relationship between the first capability information and the first capability information identifier.

2405. The second core network device sends the first capability information identifier to the terminal device.

Specific implementations of step 2404 and step 2405 are the same as specific implementations of step 2303 and step 2304. For details, refer to the specific implementations of step 2303 and step 2304. Details are not described herein again.

2406. The second core network device sends the capability information identifier count to the terminal device.

In this embodiment of this application, after allocating the first capability information identifier to the first capability information, the second core network device sends the capability information identifier count to the terminal device. An order of performing step 2404 to step 2406 is not limited in this embodiment of this application.

Optionally, the second core network device may send the first capability information identifier and the capability information identifier count to the terminal device together.

2407. The terminal device stores a mapping relationship between the first capability information and the first capability information identifier.

In this embodiment of this application, after receiving the first capability information identifier, the terminal device stores a mapping relationship between the first capability information and the first capability information identifier.

2408. She terminal device stores the capability information identifier count.

In this embodiment of this application, after receiving the capability information identifier count, the terminal devine stores the capability information identifier count. Step 2408 is an optional step.

An order of performing step 2407 and step 2408 is not limited in this embodiment of this application.

It can be seen that, by performing the method described in FIG. 24, the second core network device can allocate a capability information identifier count to the terminal device, so that capability information identifiers stored by the terminal device can be limited, to prevent the terminal device from applying to the second core network device for a large quantity of capability information identifiers and causing a waste of capability information identifiers.

Figure 25:
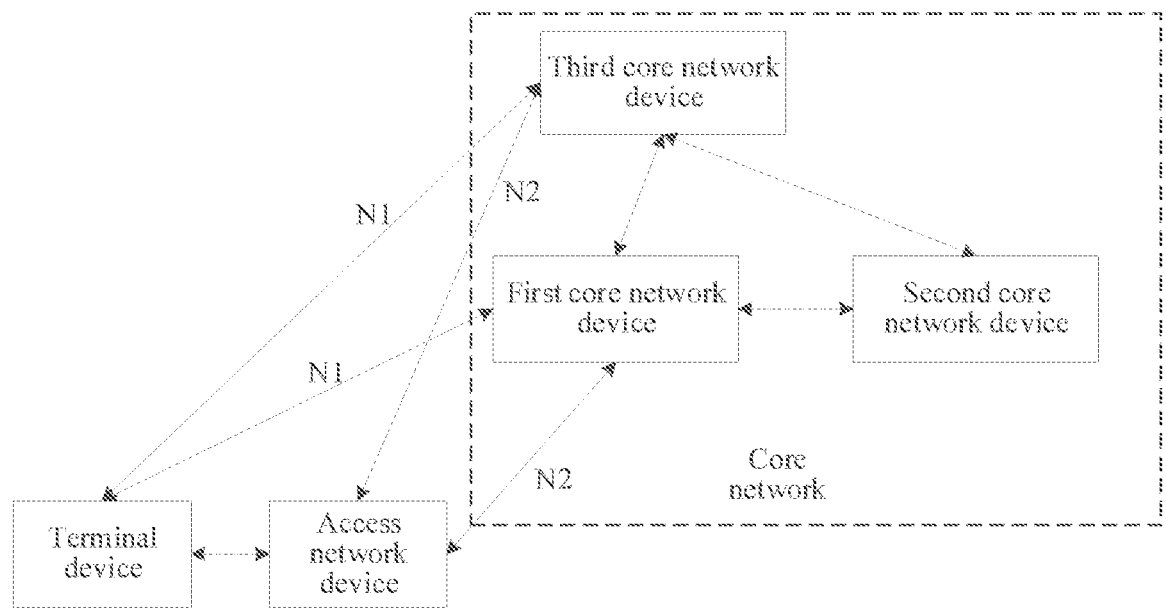
FIG. 25 is a schematic diagram of another communication system according to an embodiment of this application.

FIG. 25 is a schematic diagram of another communication system according to an embodiment of this application. As shown in FIG. 25, the communication system includes a first core network, device, a second core network device, a third core network device, an access network device, and a terminal device. The first core network device and the third core network device may be AMFs or other core network devices. The second core network device may be a UDSF or another core network device having a storage function. For descriptions of the access network device and the terminal device, refer to descriptions corresponding to FIG. 1 and FIG. 2. Details are not described herein again. The communication system described in FIG. 25 is applicable to a scenario in which the terminal device moves from the third core network device to the first core network device. When the terminal device is under the third core network device, the third core network device may allocate a capability information identifier to the terminal device. When the terminal device moves to be under the first core network device, the first core network device may be incapable of identifying the capability information identifier allocated by the third core network device to the terminal device. Therefore, the first core network device needs to reallocate a capability information identifier to the terminal device.

The following further describes a solution in which the first core network device reallocates a capability information identifier to the terminal device.

Based on the communication system described in FIG. 25, FIG. 26 is a schematic diagram of an identifier allocation method according to an embodiment of this application. As shown in FIG. 26, the identifier allocation method includes the following step 2601 to step 2609.

2601. The terminal device sends a first request to the first core network device.

Specifically, the terminal device sends a first request to the access network device, and then the access network device sends the first request to the first cote network device. The first request carries a first globally unique temporary identity allocated by the third core network device to the terminal device. The first globally unique temporary identity may be a globally unique temporary UE identity (GUT), a 5G-GUTI, or another globally unique temporary identity.

Optionally, the first request may be a registration request (registration request). Optionally, the first request further carries an indication indicating that the terminal device supports radio capability signaling. The first core network device may determine, according to the indication, that the terminal device supports and can identify a mapping relationship between a capability information identifier and corresponding capability information, so that the first core network device can allocate a corresponding identifier to capability information of the terminal device.

Optionally, the terminal device specifically sends a first request to the first core network device through the access network device when the terminal device is in an idle state.

2602. The first core network device sends a second request to the second core network device.

In this embodiment of this application, after receiving the first request front the terminal device, the first core network device sends a second request to the second core network device. The second request carries the first globally unique temporary identity. Optionally, the second request is a query request.

2603. The second core network device queries a mapping relationship between capability information and an identifier for an identifier set corresponding to the first globally unique temporary identity.

In this embodiment of this application, after receiving the second request from the first core network device, the second core network device queries a mapping relationship between capability information and an identifier for an identifier set corresponding to the first globally unique temporary identity. The identifier set includes at least one first capability information identifier allocated by the third core network device to the terminal device.

Different globally unique temporary identities correspond to different terminal devices. The second core network device stores a correspondence between a mapping relationship between capability information of the terminal device and an identifier and a globally unique temporary identity of the terminal device. The capability information identifier in the mapping relationship is allocated by the third core network device to the terminal device. Therefore, the second core network device can find the snapping relationship between the capability information of the terminal device and the identifier based on the globally unique temporary identity of the terminal device, and further find, from the mapping relationship between the capability information of the terminal device and the identifier, the at least one first capability information identifier allocated by the third core network device to the terminal device.

2604. The second core network device sends a second response to the first core network device.

In this embodiment of this application, after obtaining the identifier set, the second core network device sends a second response to the first core network device. The second response includes the identifier set. The second response is a response to the second request. Optionally, the second response may be a query response.

2605. The first core network device allocates at least one second capability information identifier to the terminal device.

In this embodiment of this application, after receiving the second response from the second core network device, the first core network device allocates at least one second capability information identifier to the terminal device. For example, if the identifier set includes three first capability information identifiers, ID1, ID2, and ID3, the first core network device may allocate three second capability information identifiers, for example, ID4, ID5, and ID6, to the terminal device. ID4 is used to replace ID1, ID5 is used to replace ID2, and ID6 is used to replace ID3.

In an optional implementation, a specific implementation of al locating, by the first core network device, at least one second capability information identifier to the terminal device is: allocating the at least one second capability information identifier to the terminal device when the first core network device is incapable of identifying a capability information identifier in the identifier set. When the first core network device is capable of identifying a capability information identifier in the identifier set, the first core network device may not reallocate a capability information identifier to the terminal device, and instead, continue using the capability information identifier allocated by the third core network device. An identifier is reallocated to the terminal device only when the capability information identifier in the identifier set cannot be identified, thereby reducing a quantity of times of reallocating the identifier to the terminal device, and helping save network transmission resources.

2606. The first core network device sends a correspondence between the second capability information identifier and a first capability information identifier that needs to be replaced to the second core network device.

In this embodiment of this application, after allocating the at least one second capability information identifier to the terminal device, the first core network device sends a correspondence between the second capability information identifier and a first capability information identifier that needs to be replaced to the second core network device.

2607. The first core network device sends a first response to the terminal device.

In this embodiment of this application, after allocating the at least one second capability information identifier to the terminal device, the first core network device sends a first response to the terminal device through the access network device. The first response carries the correspondence between the second capability information identifier and the first capability information identifier that needs to be replaced. The first response is a response to the first request. Optionally, the first response may be a registration response (registration accept).

An order of performing step 2606 and step 2607 is not limited in this embodiment of this application.

2608. The second core network device replaces, with the second capability information identifier, a corresponding first capability information identifier in a mapping relationship between capability information and an identifier.

In this embodiment of this application, alter receiving the correspondence between the second capability information identifier and the first capability information identifier that needs to be replaced, the second core network device replaces, with the second capability information identifier, a corresponding first capability information identifier in a mapping relationship between capability information and an identifier.

Optionally, the correspondence between the second capability information identifier and the first capability information identifier that needs to be replaced may be specifically carried in an update request and sent to the second core network device. Correspondingly, after receiving the update request, the second core network device replaces, with the second capability information identifier, a corresponding first capability information identifier in a mapping relationship between capability information and an identifier.

2609. The terminal device replaces, with the second capability information identifier, a corresponding first capability information identifier in a mapping relationship between capability information and an identifier.

In this embodiment of this application, after receiving the first response, the terminal device replaces, with the second capability information identifier, a corresponding first capability information identifier in a mapping relationship between capability information and an identifier.

For example, the second core network device stores correspondences shown in Table 1, the terminal device 1 stores a correspondence shown in Table 2, and the terminal device 2 stores a correspondence shown in Table 3. A mapping relationship between capability information 1 and ID1 and a mapping relationship between capability information 2 and ID2 correspond to a globally unique temporary identity 1. A mapping relationship between capability information 3 and ID3 and a mapping relationship between capability information 4 and ID4 correspond to a globally unique temporary identity 2. The globally unique temporary identity f is a globally unique temporary identity of the terminal device 1. The globally unique temporary identity 2 is a globally unique temporary identity of the terminal device 2.

TABLE 1

| Mapping relationship | Globally unique temporary identity |
|---|---|
| Mapping relationship between capability information 1 and ID1 | Globally unique temporary identity 1 |
| Mapping relationship between capability information 2 and ID2 | |
| Mapping relationship between capability information 3 and ID3 | Globally unique temporary identity 2 |
| Mapping relationship between capability information 4 and ID4 | |

TABLE 2

| Mapping relationship | Globally unique temporary identity |
|---|---|
| Mapping relationship between capability information 1 and ID1 | Globally unique temporary identity 1 |
| Mapping relationship between capability information 2 and ID2 | |

TABLE 3

| Mapping relationship | Globally unique temporary identity |
|---|---|
| Mapping relationship between capability information 3 and ID3 | Globally unique temporary identity 2 |
| Mapping relationship between capability information 4 and ID4 | |

An example in which the terminal device 1 moves from the third core network device to be under the first core network device is used. When the terminal device is under the third core network device, the third core network device allocates ID1 and ID2 in Table 1 and Table 2 to the terminal device 1. The terminal device 1 and the second core network device store the mapping relationship between the capability information 1 and ID1 and the mapping relationship between the capability information 2 and ID2, and make the two mapping relationships correspond to the globally unique temporary identity 1. After the terminal device 1 moves from the third core network device to the first core network device, the terminal device 1 may send a first request to the first core network device, where the first request carries a globally unique temporary identity 1. After receiving the first request, the first access network device sends a second request carrying the globally unique temporary identity 1 to the second core network device, where the second request carries the globally unique temporary identity 1. After receiving the second request, the second core network device may obtain an identifier set corresponding to the globally unique temporary identity 1 from the mapping relationship between capability information and an identifier based on the correspondence in Table 1. Thai is, the identifier set includes ID1 and ID2.

After obtaining the identifier set, the second core network device sends a second response to the first core network device, where the second response carries ID1 and ID2. After receiving the second response, the first core network device allocates two second capability information identifiers, ID5 and ID6. ID5 is used to replace ID1, and ID6 is used to replace ID2. After allocating ID5 and ID6, the first core network device sends a correspondence between ID5 and ID1 and a correspondence between ID6 and ID2 to the second core network device, and sends a first response to the terminal device 1 through the access network device, where the first response carries the correspondence between ID5 and ID1 and the correspondence between ID6 and ID2.

After receiving the correspondence between ID5 and ID1 and the correspondence between ID6 and ID2, the second core network device replaces ID1 in Table 1 with ID5, and replaces ID2 in Table 1 with ID6, to obtain a mapping relationship between capability information and an identifier shown in Table 4. After receiving the first response, the terminal device 1 replaces ID1 in Table 2 with ID5, and replaces ID2 in table 2 with ID6, to obtain a snapping relationship between capability information and an identifier shown in Table 5.

Optionally, after receiving the first request, the second core network device may further reallocate a globally unique temporary identity to the terminal device 1. For example, the first core network device reallocates a globally unique temporary identity 3 to the terminal device 1. The first core network device also sends the globally unique temporary identity 3 to the second core network device and the terminal device 1. As shown in Table 4, after receiving the globally unique temporary identity 3, the second core network device replaces the globally unique temporary identity 1 with the globally unique temporary identity 3. As shown in Table 5, after receiving the globally unique temporary identity 3, the terminal device replaces the globally unique temporary identity 1 with the globally unique temporary identity 3.

TABLE 4

| Mapping relationship | Globally unique temporary identity |
|---|---|
| Mapping relationship between capability information 1 and ID5 | Globally unique temporary identity 3 |
| Mapping relationship between capability information 2 and ID6 | |
| Mapping relationship between capability information 3 and ID3 | Globally unique temporary identity 2 |
| Mapping relationship between capability information 4 and ID4 | |

TABLE 5

| Mapping relationship | Globally unique temporary Identity |
|---|---|
| Mapping relationship between capability information 1 and ID5 | Globally unique temporary identity 3 |
| Mapping relationship between capability information 2 and ID6 | |

It can be seen that, by performing the method described in FIG. 26, when the terminal device moves from the third core network device to be under the first core network device, the first core network device may reallocate a capability information identifier to the terminal device, so that the first core network device can identify the capability information identifier sent by the terminal device in a subsequent process.

Figure 27:
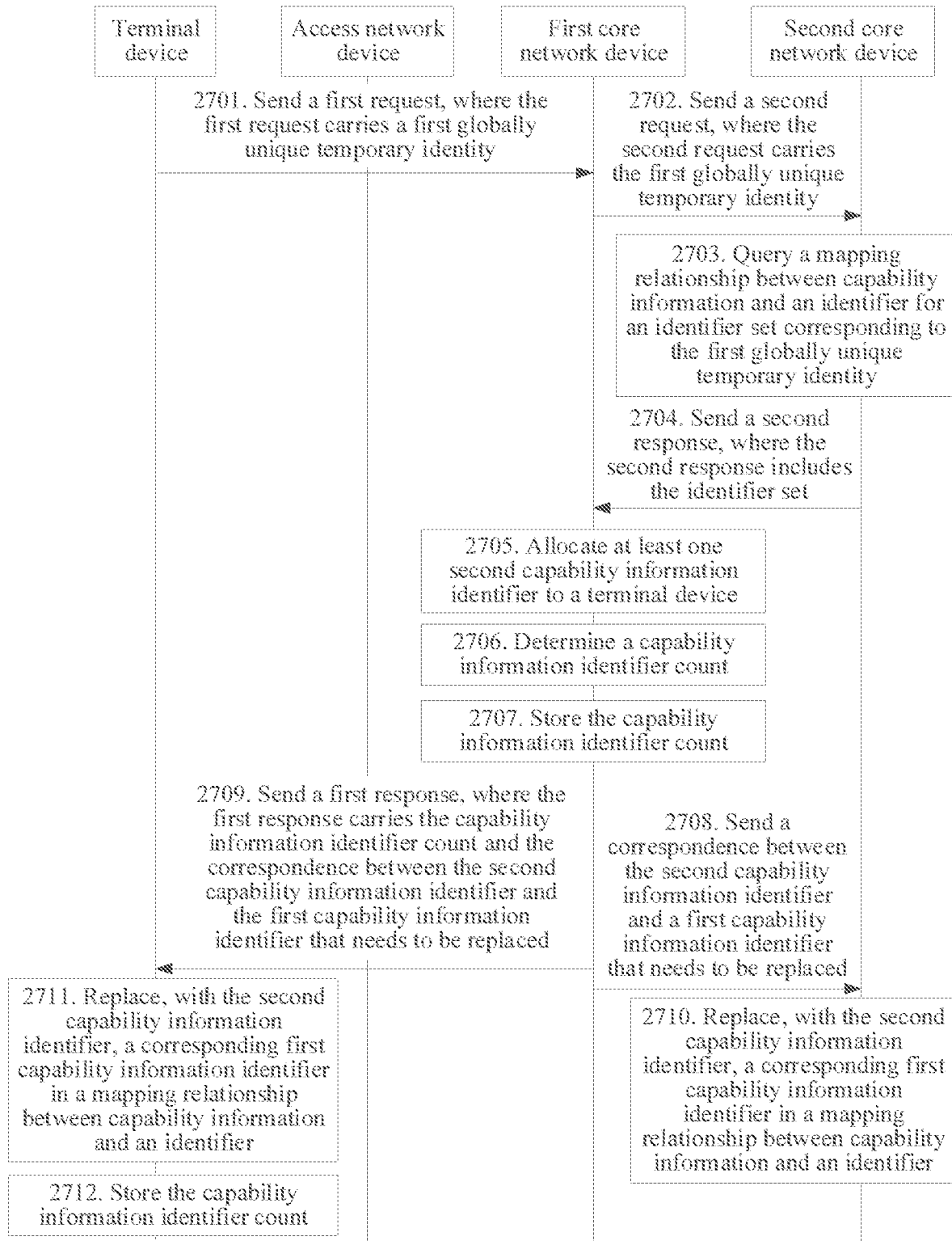

Based on the communication system described in FIG. 25, FIG. 27 is a schematic diagram of an identifier allocation method according to an embodiment of this application. As shown in FIG. 27, the identifier allocation method includes the following step 2701 to step 2712.

2701. The terminal device sends a first request to the first core network device through the access network device.

2702. The first core network device sends a second request to the second core network device.

2703. The second core network device queries a mapping relationship between capability information and an identifier for an identifier set corresponding to the first globally unique temporary identity.

2704. The second core network device sends a second response to the first core network device.

2705. The first core network device allocates at least one second capability information identifier to the terminal device.

For specific implementations of step 2701 to step 2705, refer to specific implementations of step 2601 to step 2605. Details are not described herein again.

2706. The first core network device determines a capability information identifier count.

In this embodiment of this application, after receiving the first request, the first core network device may determine a capability information identifier count. For example, the first core network device may determine the capability information identifier count before receiving the second response, or determine the capability information identifier count after receiving the second response. This is not limited in this embodiment of this application. Regardless of whether the first core network device allocates the second capability information identifier to the terminal device, the first core network device may allocate the capability information identifier count to the terminal device, and after allocating the capability information identifier count, store the capability information identifier count, and send the capability information identifier count to the terminal device by using the first response. Optionally, the capability information identifier count is a maximum quantity of capability information identifiers in the terminal device. For example, if capability information identifier data is 3, the terminal device can store a maximum of three capability information identifiers.

An order of performing step 2705 and step 2706 is not limited in this embodiment of this application.

2707. The first core network device stores the capability information identifier count.

In this embodiment of this application, after determining the capability information identifier count, the first core network device stores the capability information identifier count. Step 2707 is an optional step.

2708. The first core network device sends a correspondence between the second capability information identifier and a first capability information identifier that needs to be replaced to the second core network device.

2709. The first core network device sends a first response to the terminal device through the access network device.

The first response further carries the capability information identifier count.

2710. The second core network device replaces, with the second capability information identifier, a corresponding first capability information identifier in a mapping relationship between capability information and an identifier.

2711. The terminal device replaces, with the second capability information identifier, a corresponding first capability information identifier in a mapping relationship between capability information and an identifier.

For specific implementations of step 2708 to step 2711, refer to specific implementations of step 2606 to step 2609. Details are not described herein again.

2712. The terminal device stores the capability information identifier count.

In this embodiment of this application, after receiving the first response, the terminal device stores the capability information identifier count. Step 2712 is an optional step.

An order of performing steps 2711 and 2712 is not limited in this embodiment of this application.

It can be seen that, by performing the method described in FIG. 27, the first core network device can allocate a capability information identifier count to the terminal device, so that capability information identifiers stored by the terminal device can be limited, to prevent the terminal device from applying to the first core network device for a large quantity of capability information identifiers and causing a waste of capability information identifiers.

Figure 28:
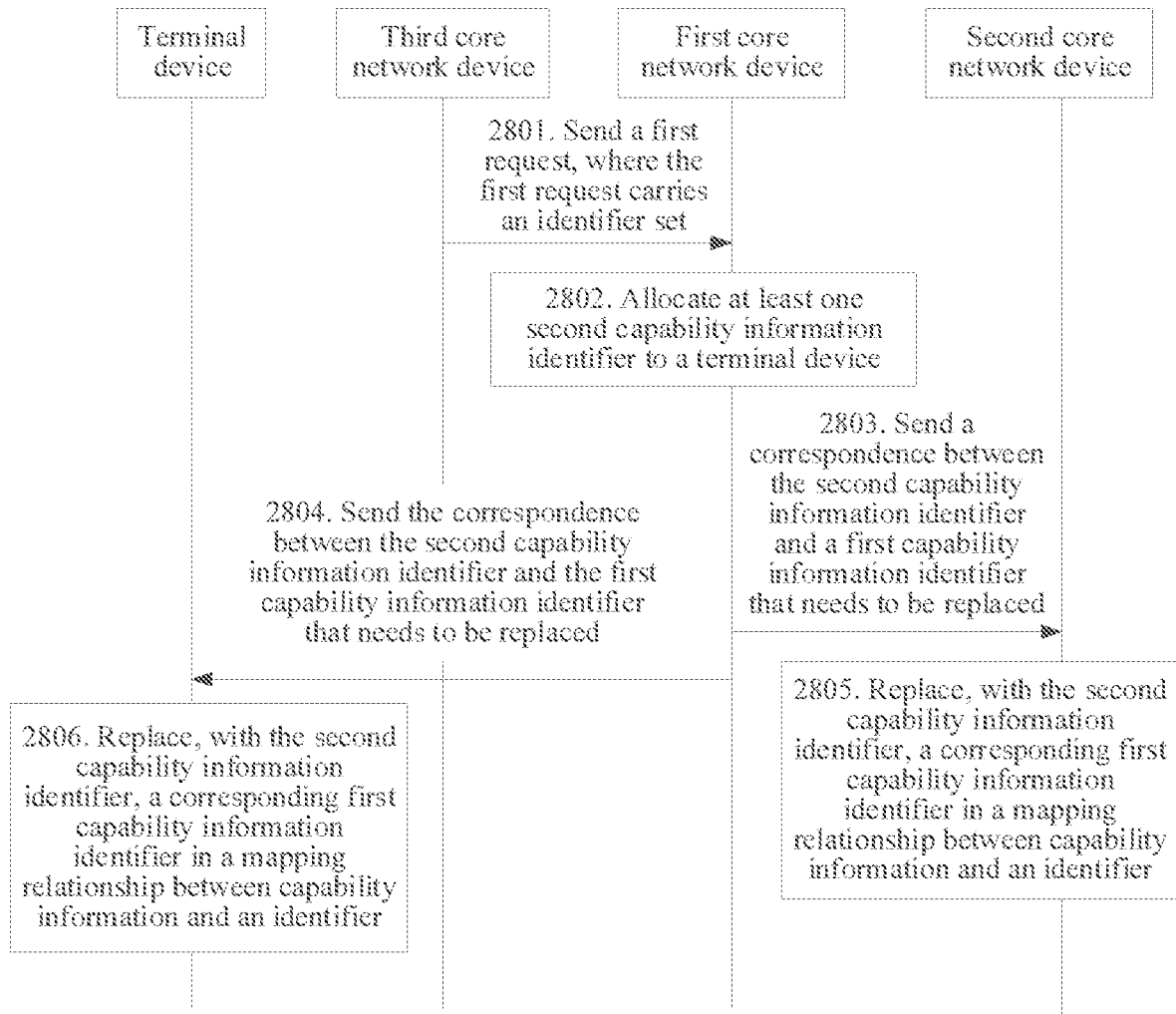

Based on the communication system described in FIG. 25, FIG. 28 is a schematic diagram of an identifier allocation method according to an embodiment of this application. As shown in FIG. 28, the identifier allocation method includes the following step 2801 to step 2806.

2801. The third core network device sends a first request to the first core network device.

In this embodiment of this application, when the terminal device needs to be handed over from the third core network device to the first core network device, the third core network device sends a first request to the first core network device. The first request carries an identifier set, and the identifier set includes at least one first capability information identifier allocated by the third core network device to the terminal device.

Optionally, before the third core network device sends the first request, the third core network device may receive a second request sent by a source access device, where the second request is used for a handover from the source access network device to a target access network device. The second request may be a handover request, for example, a handover required. After the third core network device receives the second request, if the third core network device needs to hand over the terminal device from the third core network device to the first core network device, the third core network device sends a third request to the second core network device, where the third request carries a first globally unique temporary identity of the terminal device. The third request may be a query request. After receiving the third request, the second core network device searches a mapping relationship between capability information and an identifier for an identifier set corresponding to the first globally unique temporary identity. The identifier set includes at least one first capability information identifier allocated by the third core network device to the terminal device. After finding the identifier set, the second core network device sends a third response to the third core network device, where the third response carries the identifier set and the first globally unique temporary identity. After receiving the query response, the third core network device sends the first request to the first tore network device.

Optionally, the first request may further carry the first globally unique temporary identity in addition to the Identifier set. After receiving the first request, the first core network device may reallocate a second globally unique temporary identity to the terminal device, and sends a correspondence between the second globally unique temporary identity and a first globally unique temporary identity that needs to be replaced to the second core network device. After receiving the correspondence, the second core network device replaces the stored first globally unique temporary identity with the second globally unique temporary identity. After reallocating the second globally unique temporary identity to the terminal device, the first core network device also sends the second globally unique temporary identity to the terminal device. After receiving the second globally unique temporary identity, the terminal device replaces the stored first globally unique temporary identity with the second globally unique temporary identity.

2802. The first core network device allocates at least one second capability information identifier to the terminal device.

In this embodiment of this application, after the first core network device receives the first request from the third core network device, the first core network device allocates at least one second capability information identifier to the terminal device. For example, if the identifier set carried in the first request includes two first capability information identifiers, ID1 and ID2, the first tore network device may allocate two second capability information identifiers, for example, ID5 and ID6, to the terminal device, ID5 is used to replace ID1, and ID6 is used to replace ID2.

In an optional implementation, a specific implementation of allocating, by the first core network device, at least one second capability information identifier to the terminal device is: allocating the at least one second capability information identifier to the terminal device when the first core network device is incapable of identifying a capability information identifier in the identifier set. When the first core network device is capable of identifying a capability information identifier in the identifier set, the first core network device may not reallocate a capability information identifier to the terminal device, and instead, continue using the capability information identifier allocated by the third core network device. An identifier is reallocated to the terminal device only when the capability information identifier in the identifier set cannot be identified, thereby reducing a quantity of times of reallocating the identifier to the terminal device, and helping save network transmission resources.

2803. The first, core network device sends a correspondence between the second capability information identifier and a first capability information identifier that needs to be replaced to the second core network device.

In this embodiment of this application, after allocating the at least one second capability information identifier to the terminal device, the first core network device sends a correspondence between the second capability information identifier and a first capability information identifier that needs to be replaced to the second core network device.

2804. The first core network device sends the correspondence between the second capability information identifier and the first capability information identifier that needs to be replaced to the terminal device.

In this embodiment of this application, after allocating the at least one second capability information identifier to the terminal device, the first core network device sends the correspondence between the second capability information identifier and the first capability information identifier that needs to be replaced to the terminal device. Specifically, the first core network device first sends the correspondence between the second capability information identifier and the first capability information identifier that needs to be replaced to the access network device, and then the access network device sends the correspondence between the second capability information identifier and the first capability information identifier that needs to be replaced to foe terminal device. An order of performing step 2803 and step 2804 is not limited in this embodiment of this application.

Optionally, after allocating the at least one second capability information identifier to the terminal device, the first core network device may receive a registration request sent by the terminal device, and the first core network device adds the correspondence between the second capability information identifier and the first capability information identifier that needs to be replaced to a registration response, and sends the registration response to the terminal device.

2805. The second core network device replaces, with the second capability information identifier, a corresponding first capability information identifier in a mapping relationship between capability information and an identifier.

In this embodiment of this application, after receiving the correspondence between the second capability information identifier and the first capability information identifier that needs to be replaced, the second core network device replaces, with the second capability information identifier, a corresponding first capability information identifier in a mapping relationship between capability information and an identifier.

2806. The terminal device replaces, with the second capability information identifier, a corresponding first capability information identifier in a mapping relationship between capability information and an identifier.

In this embodiment of this application, after receiving the correspondence between the second capability Information identifier and the first capability information identifier that needs to be replaced, the terminal device replaces, with the second capability information identifier, a corresponding first capability information identifier in a mapping relationship between capability information and an identifier.

It can be seen that, by performing the method described in FIG. 28, when the terminal device moves from the third core network device to be under the first core network device, the first core network device may reallocate a capability information identifier to the terminal device, so that the first core network device can identify the capability information identifier sent by the terminal device in a subsequent process.

Figure 29:
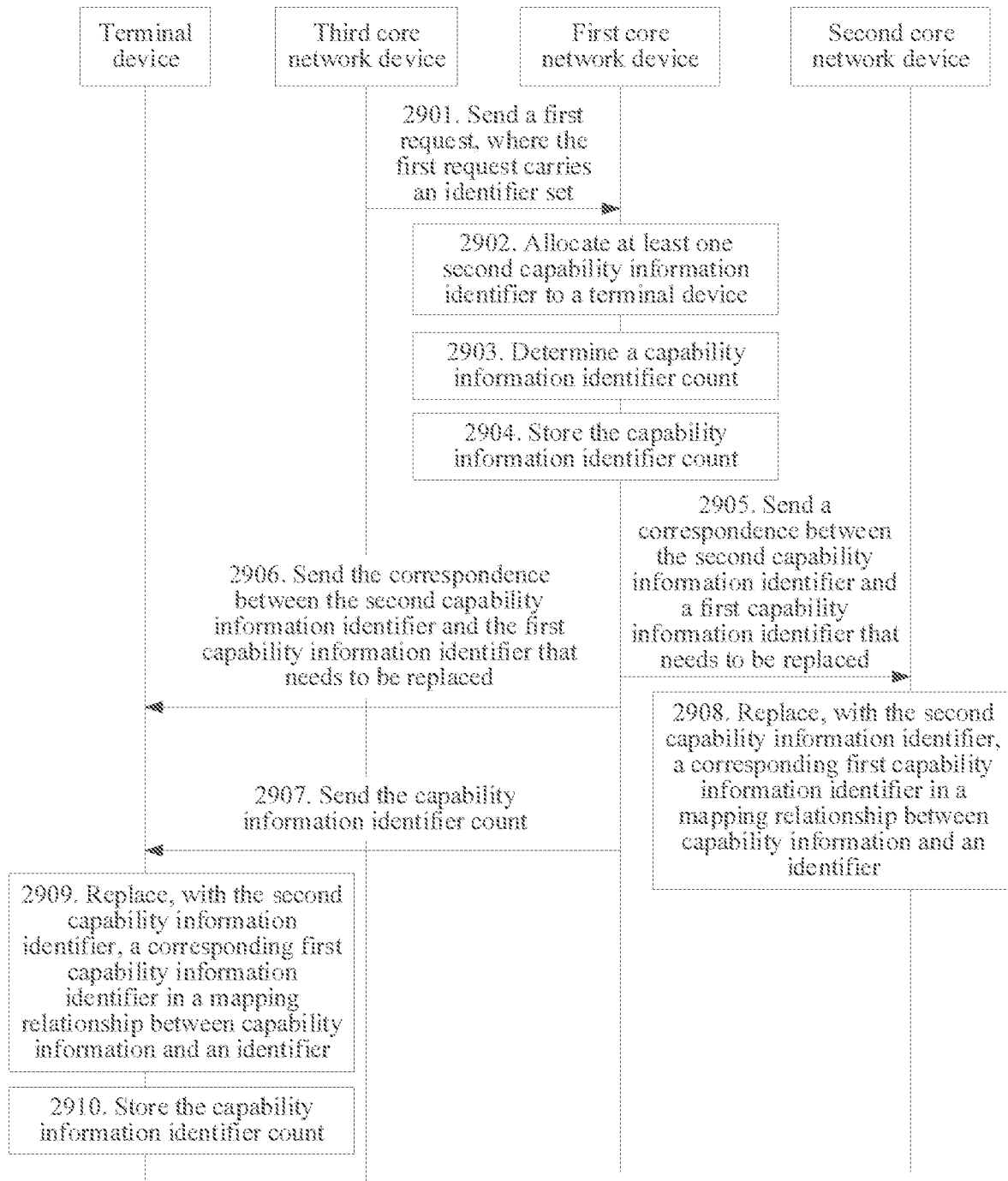

Based on the communication system described in FIG. 25, FIG. 29 is a schematic diagram of an identifier allocation method according to an embodiment of this application. As shown in FIG. 29, the identifier allocation method includes the following step 2901 to step 2906.

2901. The third core network device sends a first request to the first core network device.

2902. The first core network device allocates at least one second capability information identifier to the terminal device.

For specific implementations of step 2901 and step 2902, refer to specific implementations of step 1801 and step 1802. Details are not described herein again.

2903. The first core network device determines a capability information identifier count.

In this embodiment of this application, after receiving the first request, the first core network device may determine a capability information identifier count. Regardless of whether the first core network device allocates the second capability information identifier to the terminal device, the first core network device may allocate the capability information identifier count to the terminal device, and after allocating the capability information identifier count, store the capability information identifier count and send the capability information identifier count to the terminal device by using the first response. Optionally, the capability information identifier count is a maximum quantity of capability information identifiers in the terminal device. For example, if capability information identifier data is 3, the terminal device can store a maximum of three capability information identifiers.

An order of performing step 2902 and step 2903 is not limited in this embodiment of this application.

2904. The first core network device stores the capability information identifier count.

In this embodiment of this application, after determining the capability information identifier count, the first core network device stores the capability information identifier count. Step 2904 is an optional step.

2905. The first core network device sends a correspondence between the second capability information identifier and a first capability information identifier that needs to be replaced to the second core network device.

2906. The first core network device sends the correspondence between the second capability information identifier and the first capability information identifier that needs to be replaced to the terminal device.

For specific implementations of step 2905 to step 2906, refer to specific implementations of step 1803 to step 1804. Details are not described herein again.

2907. The first core network device sends the capability information identifier count to the terminal device.

In this embodiment of this application, after determining the capability information identifier count, the first core network device sends the capability information identifier count to the terminal device. An order of performing step 2004 to step 2907 is not limited in this embodiment of this application. Optionally, the capability information identifier count and the correspondence between the second capability information identifier and the first capability information identifier that needs to be replaced may be sent to the terminal device together.

2908. The second core network device replaces, with the second capability information identifier, a corresponding first capability information identifier in a mapping relationship between capability information and an identifier.

2909. The terminal device replaces, with the second capability information identifier, a corresponding first capability information identifier in a mapping relationship between capability information and an identifier.

For specific implementations of step 2908 and step 2908, refer to specific implementations of step 1805 and step 1806. Details are not described herein again.

2910. The terminal device stores the capability information identifier count.

In this embodiment of this application, after receiving the capability information identifier count, the terminal device stores the capability information identifier count. Step 2910 is an optional step.

An order of performing step 2909 and step 2910 is not limited in this embodiment of this application.

It can be seen that, by performing the method described in FIG. 29, the first core network device can allocate a capability information identifier count to the terminal device, so that capability information identifiers stored by the terminal device can be limited, to prevent the terminal device from applying to the first core network device for a large quantity of capability information identifiers and causing a waste of capability information identifiers.

In this embodiment of the present invention, functional modules of the network device may be divided based on the foregoing method examples. For example, each functional module may be divided according to each function, or two or more functions may be integrated into one processing module. The integrated module may be implemented in a form of hardware, or may be implemented in a form of a software functional module. It should be noted that, in this embodiment of the present invention, module division is exemplary, and is merely a logical function division. In actual implementation, another division manner may be used.

Figure 30:
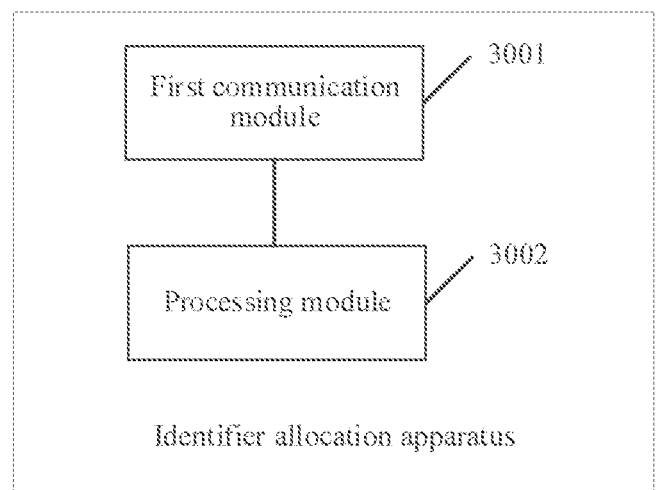
FIG. 30 to FIG. 36 are schematic structural diagrams of identifier allocation apparatuses according to embodiments of this application.

FIG. 30 is a schematic structural diagram of an identifier allocation apparatus according to an embodiment of this application. The identifier allocation apparatus in this embodiment of this application is applicable to the first core network device in the foregoing embodiment of the identifier allocation method. The identifier allocation apparatus may be configured to implement some or all functions of the first cote network device in the foregoing embodiment of the identifier allocation method. The identifier allocation apparatus may include a first communication module 3001 and a processing module 3002.

The first communication module 3001 is configured to receive a first request from a terminal device. The processing module 3002 is configured to allocate a first capability information identifier. The first communication module 3003 is further configured to send a first response to the terminal device, where the first response carries the first capability information identifier.

Optionally, the first communication module 3001 is further configured to receive a second request from the terminal device. The processing module 3002 is further configured to allocate a capability information identifier count to the terminal device. The first communication module 3001 is further configured to send a second response to the terminal device, where the second response carries the capability information identifier count.

Optionally, the first request carries a first indication, and the first indication is used to set capability information of the terminal device.

Optionally, the setting capability information of the terminal device includes an addition operation.

Optionally, the first indication is used to indicate to add storage of a group of capability information of the terminal device.

Optionally, the first request carries first capability in formation of the terminal de vice. A manner in which the processing module 3002 allocates a first capability information identifier is specifically: allocating the first capability information identifier to the first capability information.

Optionally, the first communication module 3001 is further configured to send a third request to an access network device. The first communication module 3001 is further configured to receive first capability information of the terminal device from an access network device. A manner in which the processing module 3002 allocates a first capability information identifier is specifically: allocating the first capability information identifier to the first capability information.

Optionally, the apparatus further includes a second communication module, configured to store a mapping relationship between the first capability information and the first capability information identifier into a second core network device.

Optionally, the first communication module 3001 is further configured to receive a fifth request from the terminal device, where the fifth request carries a fifth capability information identifier, and the fifth capability information identifier is an identifier corresponding to capability information that the terminal device needs to use. The second communication module is configured to send a sixth request to the second core network device, where the sixth request carries the fifth capability information identifier. The second communication module is configured to receive a sixth response from the second core network device, where the sixth response includes the capability information corresponding to the fifth capability information identifier. The first communication module 3001 is further configured to send the capability information corresponding to the fifth capability information identifier to the access network device.

Optionally, a manner in which the second communication module sends a sixth request to the second core network device is specifically: sending the sixth request to the second core network device when the capability information corresponding to the fifth capability information identifier does not exist in a preset database of the first core network device, where the preset database stores a preconfigured mapping relationship between capability information and an identifier. The first communication module 3001 is further configured to obtain the capability information corresponding to the fifth capability information identifier from the preset database when the capability information corresponding to the fifth identifier exists in the preset database, and send the capability information corresponding to the fifth capability information identifier to the access network device.

Optionally, the second core network device stores mapping relationships between at least two groups of capability information of the terminal device and identifiers.

Optionally, the processing module 3002 is configured to store a mapping relationship between the first capability information and the first capability information identifier.

Optionally, the first communication module 3001 is further configured to receive a fifth request from the terminal device, where tire fifth request currier a fifth, capability information identifier, and the fifth capability information identifier is an identifier corresponding to capability information that the terminal device needs to use. The first communication module 3001 is further configured to send the capability information corresponding to the fifth capability information identifier to the access network device.

Optionally, the first core network device stores mapping relationships between at least two groups of capability information of the terminal device and identifiers.

Optionally, the processing module 3002 is further configured to allocate a capability information identifier count to the terminal device. The processing module 3002 is further configured to store the capability information identifier count. The first response further includes the capability information identifier count.

Optionally, the first request carries an indication indicating that the terminal device supports radio capability signaling.

An embodiment of this application further provides an identifier allocation apparatus. The identifier allocation apparatus is applicable to the terminal device in the foregoing embodiment of the identifier allocation method. The identifier allocation apparatus may be configured to implement some or all functions of the terminal device in the foregoing embodiment of the identifier allocation method. The identifier allocation apparatus may include a communication module.

The communication module is configured to send a first request to a first core network device. Tire communication module is further configured to receive a first response from the first core network device, where the first response carries a first capability information identifier.

Optionally, the communication module is further configured to send a second request to the first core network device. The communication module is further configured to receive a second response from the first core network device, where the second response carries a capability information identifier count.

Optionally, the first request carries a first indication, and the first indication is used to set capability information of the terminal device.

Optionally, the setting capability information of the terminal device includes an addition operation.

Optionally, the first indication is used to indicate to add storage of a group of capability information of the terminal device.

Optionally, the first request carries first capability information of the terminal device.

Optionally, the communication module is further configured to receive a fourth request from an access network device. The communication module is further configured to send first capability information to the access network device.

Optionally, the apparatus further includes a processing module, configured to store a mapping relationship between the first capability information and Site first capability information identifier.

Optionally, the communication module is further configured to send a fifth request to the first core network device, where the fifth request carries a fifth capability information identifier, and the fifth capability information identifier is an identifier corresponding to capability information that the terminal device needs to use.

Optionally, the terminal device stores mapping relationships between at least two groups of capability information of the terminal device and identifiers.

Optionally, the first response further carries the capability information identifier count.

Optionally, a manner in which the communication module sends a first request to a first core network device is specifically: sending the first request to the first core network device when no identifier corresponding to the first capability information exists in a preset database of the terminal device, where the preset database stores a preconfigured mapping relationship between capability information and an identifier.

Optionally, the first request carries an indication indicating that the terminal device supports radio capability signaling.

An embodiment, of this application further provides a schematic structural diagram of an apparatus for setting capability information. The apparatus for setting capability information in this embodiment of this application is applicable to the first core network device in the foregoing embodiment of the method for setting capability information. The apparatus for setting capability information may be configured to implement some or all functions of the first core network device in the foregoing embodiment of the method for setting capability information. The apparatus for setting capability information may include a first communication module.

The first communication module is configured to receive a first request from a terminal device, where the first request carries a first indication and a first capability information identifier, and the first indication is used to set capability information of the terminal device. The first communication module is further configured to send a first response to the terminal device.

Optionally, the apparatus further includes a processing module. The first communication module is further configured to receive a second request from the terminal device. The processing module is configured to allocate a capability information identifier count to the terminal device. The first communication module is further configured to send a second response to the terminal device, where the second response carries the capability information identifier count.

Optionally, the setting capability information of the terminal device includes one of an activation operation, an update operation, and a deletion operation.

Optionally, when the setting capability information of the terminal device includes the activation operation, the first indication Is used to indicate to activate a group of capability information of the terminal device.

Optionally, when the setting capability information of the terminal device includes the update operation, the first indication is used to indicate to update a group of capability information of the terminal device.

Optionally, when the setting capability information of the terminal device includes the deletion operation, the first indication is used to indicate to delete a group of capability information of the terminal device.

Optionally, the setting capability information of the terminal device includes the activation operation, and the apparatus further includes a second communication module. The second communication module is configured to send a third request to a second core network device, where the third request carries the first capability information identifier. The second communication module is further configured to receive a third response from the second core network device, where the third response carries first capability information corresponding to the first capability information identifier. The first communication module is further configured to send the first capability information to an access network device.

Optionally, the setting capability information of the terminal device includes the update operation, the first request further includes first capability information, and the apparatus further includes a second communication module. The second communication module is configured to send a fourth request to a second core network device, where the fourth request carries the first capability information and the first capability information identifier, and the fourth request is used to indicate the second core network device to replace, with the first capability information, capability information corresponding to the first capability information identifier in a mapping relationship between capability information and an identifier. The second communication module is further configured to receive a fourth response from the second core network device, where the fourth response carries indication information used to indicate that the update succeeds.

Optionally, the setting capability information of the terminal device includes the update operation, and the apparatus further includes a second communication module. The first communication module is further configured to send a fourth request to an access network device. The first communication module is further configured to receive first capability information of the terminal device from the access network device. The second communication module is configured to send a sixth request to a second core network device, where the sixth request carries the first capability information and the first capability information identifier, and the sixth request is used to indicate the second core network device to replace, with the first capability information, capability information corresponding to the first capability information identifier in a mapping relationship between capability information and an identifier. The second communication module is further configured to receive a sixth response from the second core network device, where the sixth response carries indication information used to indicate that the update succeeds.

Optionally, the setting capability information of the terminal device includes the deletion operation, and the apparatus further includes a second communication module. The second communication module is configured to send a seventh request to a second core network device, where the seventh request carries the first capability information identifier, and the seventh request is used to indicate the second core network device to delete the first capability information identifier and capability information corresponding to the first capability information identifier. The second communication module is further configured to receive a seventh response from the second core network device, where the seventh response carries indication information used to indicate that the deletion succeeds.

Optionally, the second core network device stores mapping relationships between at least two groups of capability information of the terminal device and identifiers.

Optionally, the setting capability information of the terminal device includes the activation operation, and the first communication module is further configured to send first capability information to aa access network device.

Optionally, the setting capability information of the terminal device includes the update operation, the first request further includes first capability information, and the apparatus further includes a processing module.

The processing module is configured to replace, with the first capability information, capability information corresponding to the first capability information identifier in a mapping relationship between capability information and an identifier.

Optionally, the setting capability information of the terminal device includes the update operation, and the apparatus further includes a processing module. The first communication module is further configured to send a fourth request to an access network device. The first communication module is further configured to receive first capability information of the terminal device from the access network device. The processing module is configured to replace, with the first capability information, capability information corresponding to the first capability information identifier in a mapping relationship between capability information and an identifier.

Optionally, the apparatus further includes a processing module, and the processing module is configured to delete She stored first capability information identifier and capability information corresponding to the first capability information identifier.

Optionally, the first core network device stores mapping relationships between at least two groups of capability information of the terminal device and identifiers.

Optionally, the first request further carries an indication indicating that the terminal device supports radio capability signaling.

An embodiment of this application further provides a schematic structural diagram of an apparatus for setting capability information. The apparatus for setting capability information in this embodiment of this application is applicable to the terminal device in the foregoing embodiment of the method for setting capability information. The apparatus for setting capability information may be configured to implement some or all functions of the terminal device in the foregoing embodiment of the method for setting capability information. The apparatus for setting capability information may include a communication module.

The communication module is configured to send a first request to a first core network device, where the first request carries a first indication and a first capability information identifier, and the first indication is used to set capability information of the terminal device. The communication module is further configured to receive a first response from the fast core network device.

Optionally, the communication module is further configured to send a second request to the first core network device. The communication module is further configured to receive a second response, where the second response carries a capability information identifier count.

Optionally, the setting capability information of the terminal device includes one of an activation operation, an update operation, and a deletion operation.

Optionally, when the setting capability information of the terminal device includes the activation operation, the first indication is used to indicate to activate a group of capability information of the terminal device.

Optionally, when the setting capability information of the terminal device includes the update operation, the first indication is used to indicate to update a group of capability information of the terminal device.

Optionally, when tire setting capability information of the terminal device includes the deletion operation, the first indication is used to indicate to delete a group of capability information of the terminal device.

Optionally, the setting capability information of the terminal device includes the update operation, the first request further includes first capability information, and the apparatus further includes: a processing module, configured to replace, with the first capability information, capability information corresponding to the first capability information identifier in a mapping relationship between capability information and an identifier.

Optionally, the setting capability information of the terminal device includes the update operation, and the apparatus further includes a processing module. The communication module is further configured to receive a fifth request from an access network device. The communication module is further configured to send first capability information to the access network device. The processing module is configured to replace, with the first capability information, capability information corresponding to the first capability information identifier in a mapping relationship between capability information and an Identifier.

Optionally, the setting capability information of the terminal device includes the deletion operation, and the apparatus further includes: a processing module, configured to delete the first capability information identifier and capability information corresponding to the first capability information identifier.

Optionally, the terminal device stores mapping relationships between at least two groups of capability information of the terminal device and identifiers.

Optionally, the first request further carries an indication indicating that the terminal device supports radio capability signaling.

Figure 31:
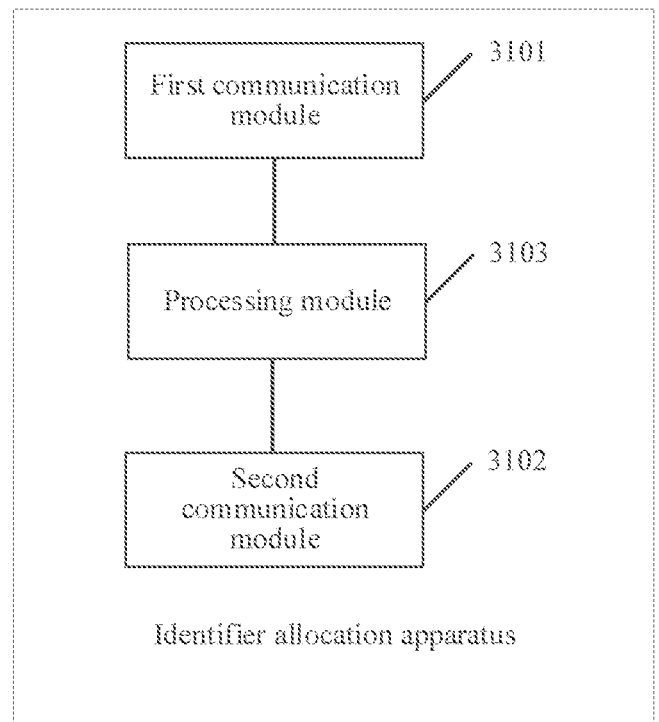

FIG. 31 is a schematic structural diagram of an identifier allocation apparatus according to an embodiment of this application. The identifier allocation apparatus in this embodiment of this application is applicable to the first core network device in the foregoing embodiment of the identifier allocation method. The identifier allocation apparatus may be configured to implement some or all functions of the first core network device in the foregoing embodiment of the identifier allocation method. The identifier allocation apparatus may include a first communication module 3101, a second communication module 3102, and a processing module 3103.

The first communication module 3101 is configured to receive a first request from a terminal device, where the first request carries a first globally unique temporary identity allocated by a third core network device to the terminal device. The second communication module 3102 is configured to send a second request to a second core network device, where the second request carries the first globally unique temporary identity. The second communication module 3102 is further configured to receive a second response from the second core network device, where the second response carries an identifier set, and the identifier set includes at least one first capability information identifier allocated by the third core network device to the terminal device. The processing module 3103 is configured to allocate at least one second capability information identifier to the terminal device. The second communication module 3102 is further configured to send a correspondence between the second capability information identifier and a first capability information identifier that needs to be replaced to the second core network device. The first communication module 3101 is further configured to send a first response to site terminal device, where the first response carries the correspondence between the second capability information identifier and the first capability information identifier that needs to be replaced.

Optionally, She processing module 3103 is further configured to determine a capability information identifier count. The first response further carries the capability information identifier count.

Optionally, a manner in which the processing module 3103 allocates at least one second capability information identifier to the terminal device is specifically: allocating the at least, one second capability information identifier to the terminal device when the processing module 3103 is incapable of identifying a capability information identifier in the identifier set.

Optionally, the first request carries an indication indicating that the terminal device supports radio capability signaling.

Figure 32:
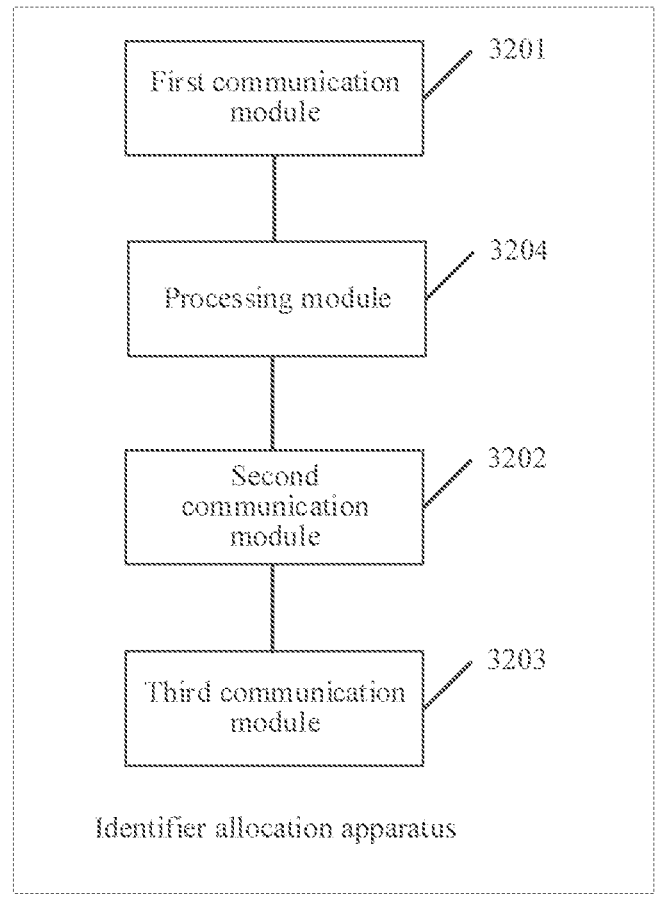

FIG. 32 is a schematic structural diagram of an identifier allocation apparatus according to an embodiment of this application. Site identifier allocation apparatus in this embodiment of this application is applicable to the fir st core network device in the foregoing embodiment of the identifier allocation method. The identifier allocation apparatus may be configured to implement some or all functions of the first core network device in the foregoing embodiment of the identifier allocation method. The identifier allocation apparatus may include a first communication module 3201, a second communication module 3202, a third communication module 3203, and a processing module 3204.

The first communication module 3201 is configured to receive a first request sent by a third core network device, where the first request carries an identifier set, and the identifier set includes at least one first capability information identifier allocated by the third core network device to a terminal device. The processing module 3204 is configured to allocate at least one second capability information identifier to the terminal device. The second communication module 3202 is configured to send a correspondence between the second capability information identifier and a first capability information identifier that needs to be replaced to a second core network device. The third communication module 3203 is configured to send the correspondence between the second capability information identifier and the first capability information identifier that needs to be replaced to the terminal device.

Optionally, the processing module 3204 is further configured to determine a capability information identifier count. The third communication module 3203 is further configured to send the capability information identifier count to the terminal device.

Optionally, a manner in which the processing module 3204 allocates at least one second capability information identifier to the terminal device is specifically: allocating the at least one second capability information identifier to the terminal device when the processing module 3204 is incapable of identifying a capability information identifier in the identifier set.

Figure 33:
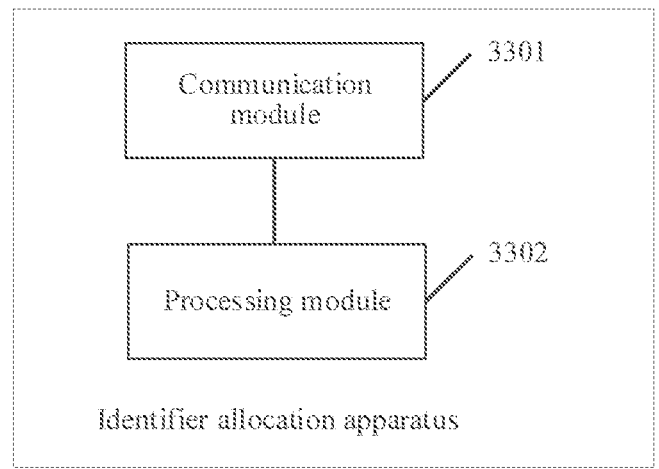

FIG. 33 is a schematic structural diagram of an identifier allocation apparatus according to an embodiment of this application. The identifier allocation apparatus in this embodiment of this application is applicable to the second core network device in the foregoing embodiment of the identifier allocation method. The identifier allocation apparatus may be configured to implement some or all functions of the second core network device in the foregoing embodiment of the identifier allocation method. The identifier allocation apparatus may include a communication module 3301 and a processing module 3302.

The communication module 3301 is configured to receive a first request front a first core network device, where the first request carries first capability information of a terminal device. The processing module 3302 is configured to allocate a first capability information identifier to the first capability information. The processing module 3302 is further configured to store a mapping relationship between the first capability information and the first capability information identifier. The communication module 3301 is further configured to send the first capability information identifier to the terminal device.

Optionally, the processing module 3302 is further configured to determine a capability information identifier count. The communication module 3301 is further configured to send the capability information identifier count to the terminal device.

Figure 34:
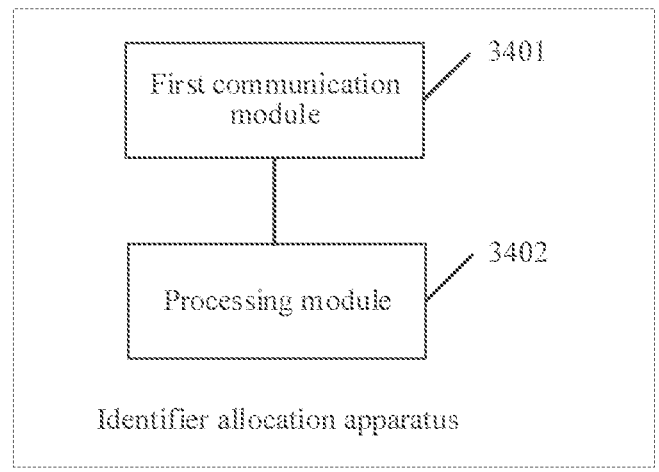
Figure 35:
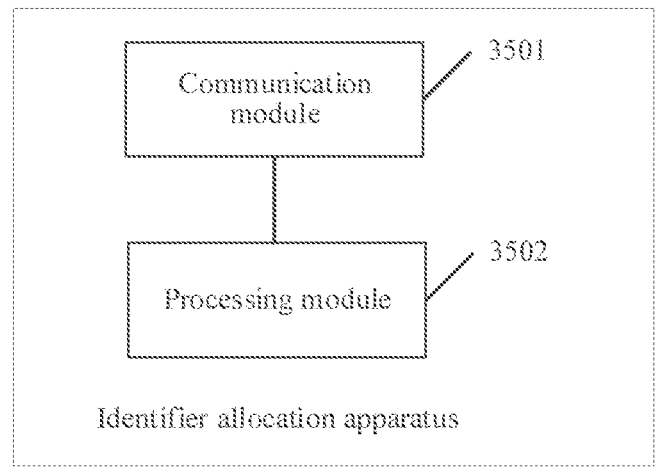

FIG. 34 is a schematic structural diagram of an identifier allocation apparatus according to an embodiment of this application. The identifier allocation apparatus in this embodiment of this application is applicable to the first core network device in the foregoing embodiment of the identifier allocation method. The identifier allocation apparatus may be configured to implement some or all functions of the first core network device in the foregoing embodiment of the identifier allocation method. The identifier allocation apparatus may include a first communication module 3401 and a processing module 3402.

The first communication module 3401 is configured to receive a first request from a terminal device. The processing module 3402 is configured to allocate a first capability information identifier to capability information of the terminal device. The first communication module 3401 is further configured to send a second request to an access network device, where the second request carries the first capability information identifier.

Optionally, the first communication module 3401 is further configured to receive a fourth request from the terminal device. The processing module 3402 is further configured to allocate a capability information identifier count to the terminal device. The processing module 3402 is further configured to store the capability information identifier count. The first communication module 3401 is further configured to send a fourth response to the terminal device, where the fourth response carries the capability information identifier count.

Optionally, the first request carries a first indication, and the first indication is used to sot capability information of the terminal device.

Optionally, the setting capability information of the terminal device includes an addition operation.

Optionally, the first indication is used to indicate to add storage of a group of capability information of the terminal device.

Optionally, the first communication module 3401 is further configured to receive first capability information of the terminal device from an access network device. The processing module 3402 is further configured to store a mapping relationship between the first capability information and the first capability information identifier into the second core network device.

Optionally, the apparatus further includes a second communication module. The first communication module 3401 is further configured to receive a fifth request from the terminal device, where the fifth request carries a fifth capability information identifier, and the fifth capability information identifier is an identifier corresponding to capability information that the terminal device needs to use. The second communication module is configured to send a sixth request to the second core network device, where the sixth request carries the fifth capability information identifier. The second communication module is further configured to receive a sixth response from the second core network device, where the sixth response includes the capability information corresponding to the fifth capability information identifier. The first communication module 3401 is further configured to send the capability information corresponding to the fifth capability information identifier to the access network device.

Optionally, a manner in which the second communication module sends a sixth request to the second core network device is specifically: sending the sixth request to the second core network device when the capability information corresponding to the fifth capability information identifier does not exist in a preset database of the first core network device, w here the preset database stores a preconfigured mapping relationship between capability information and an identifier. The first communication module 3401 is further configured to obtain the capability information corresponding to the fifth capability information identifier from the preset database when She capability information corresponding to the fifth identifier exists in the preset database, and send the capability information corresponding to the fifth capability information identifier to the access network device.

Optionally, the second core network device stores mapping relationships between at least two groups of capability information of the terminal device and identifiers.

Optionally, the first communication module 3401 is further configured to receive first capability information of the terminal device from an access network device. The processing module 3402 is further configured to store a mapping relationship between the first capability information and the first capability information identifier.

Optionally, the first communication module 3401 is further configured to receive a fifth request from the terminal device, where the fifth request carries a fifth capability information identifier, and the fifth capability information identifier is an identifier corresponding to capability information that the terminal device needs to use. The first communication module 3401 is further configured to send the capability information corresponding to the fifth capability information identifier to the access network device.

Optionally, the first core network device stores mapping relationships between at least two groups of capability information of the terminal device and identifiers.

Optionally, the processing module 3402 is further configured to allocate a capability information identifier count to the terminal device. The second request further includes the capability information identifier count.

Optionally, the first request carries an indication indicating that the terminal device supports radio capability signaling.

An embodiment of this application further provides a schematic structural diagram of an identifier allocation apparatus. The identifier allocation apparatus in this embodiment of this application is applicable to the terminal device in the foregoing embodiment of the identifier allocation method. The identifier allocation apparatus may be configured to implement some or all functions of the terminal device in the foregoing embodiment of the identifier allocation method. The identifier allocation apparatus may include a communication module.

The communication module is configured to send a first request to a first core network device. The communication module is further configured to receive a third request front an access network device, where the third request carries a first capability information identifier.

Optionally, the communication module is further configured to staid a fourth request to the first core network device. The communication module is further configured to receive a fourth response from the first core network device, where the fourths response carries a capability information identifier count.

Optionally, the first request carries a first indication, and the first indication is used to set capability information of the terminal device.

Optionally, the setting capability information of the terminal device includes an addition operation.

Optionally, the first indication is used to indicate to add storage of a group of capability information of the terminal device.

Optionally, the apparatus further includes a processing module. The communication module is further configured to send first capability information to the access network device. The processing module is configured to store a mapping relationship between the first capability information and the first capability information identifier.

Optionally, the communication module is further configured to send a fifth request to the first core network device, where the fifth request carries a fifth capability information identifier, and the fifth capability information identifier is an identifier corresponding to capability information that the terminal device needs to use.

Optionally, the terminal device stores mapping relationships between at least two groups of capability information of the terminal device and identifiers.

Optionally, the third request further carries the capability information identifier count.

Optionally, a specific implementation of sending, by the communication module, a first request to the first core network device is: sending, by the terminal device, the first request to the first core network device when no identifier corresponding to the first capability information exists in a preset database of the terminal device, where the preset database stores a preconfigured mapping relationship between capability information and an identifier.

Optionally, the first request carries an indication indicating that the terminal device supports radio capability signaling.

Figure 36:
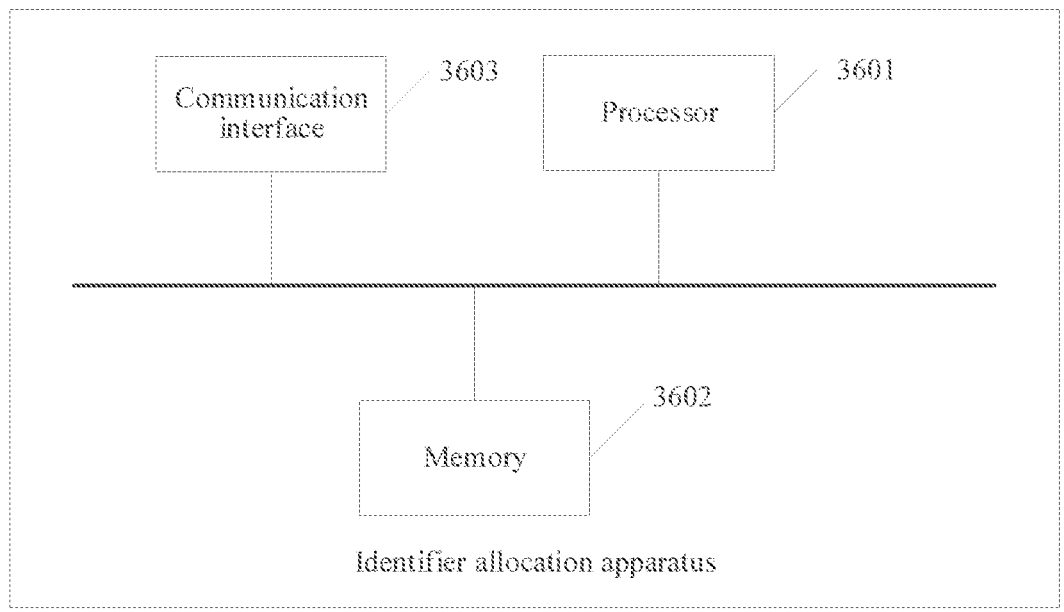

FIG. 36 is a schematic structural diagram of an identifier allocation apparatus disclosed in an embodiment of this application. The identifier allocation apparatus may perform a behavior function of the first core network device in the foregoing embodiment of the identifier allocation method. As shown in FIG. 36, the identifies allocation apparatus includes a processor 3601, a memory 3602, and a communication interface 3603. The processor 3601, the memory 3602, and the communication interface 3603 are connected to each other.

The processor 3601 may be a central processing unit (central processing unit, CPU), a general-purpose processor, a coprocessor, a digital signal processor (digital signal processing, DSP), an application-specific integrated circuit (application-specific integrated circuit, ASIC), a field programmable gate array (field programmable gate array. FPGA), or another programmable logical device, a transistor logical device, a hardware component, or any combination thereof. Alternatively, the processor 3601 may be a combination of processors implementing a computing function, for example, a combination of one or more microprocessors, or a combination of the DSP and a microprocessor.

The memory 3602 may include a volatile memory (volatile memory). The memory 3602 may alternatively include a non-volatile memory (non-volatile memory). The memory 3602 may alternatively include a combination of the foregoing types of memories.

The communication interface 3603 is configured to implement communication with another network element.

The processor 3601 invokes program code stored in the memory 3602, to perform the following steps:

receiving a first request from a terminal device by using the communication interface 3603; allocating a first capability information identifier; and sending a first response to the terminal device by using the communication interface 3603, where the first response carries the first capability information identifier.

Optionally, the processor 3601 invokes the program code stored in the memory 3602, to further perform the following steps: receiving a second request from the terminal device by using the communication interface 3603; allocating a capability information identifier count to the terminal device; and sending a second response to the terminal device by using the communication interface 3603, where the second response carries the capability information identifier count.

Optionally, the first request carries a first indication, and the first indication is used to set capability information of the terminal device. Optionally, the setting capability information of the terminal device includes an addition operation. Optionally, the first indication is used to indicate to add storage of a group of capability information of the terminal device.

Optionally, the first request carries first, capability information of the terminal device. A manner in which the processor 3601 invokes the program code stored in the memory 3602 to allocate a first capability information identifier is specifically: allocating the first capability information identifier to the first capability information.

Optionally, the processor 3601 invokes the program code stored in the memory 3602, to further perform the following steps: sending a third request to an access network device by using the communication interface 3603; and receiving first capability information of the terminal device from the access network device by using the communication interface 3603. A manner in which the processor 3601 invokes the program code stored in the memory 3602 to allocate a first capability information identifier is specifically: allocating the first capability information identifier to the first capability information.

Optionally, the processor 3601 invokes the program code stored in the memory 3602, to further perform the following step: storing a mapping relationship between the first capability information and the first capability information identifier into the second core network device by using the communication interface 3603.

Optionally, the processor 3601 invokes the program code stored in the memory 3602, to further perform the following steps: receiving a fifth request from the terminal device by using the communication interface 3603, where the fifth request carries a fifth capability information identifier, and the fifth capability information identifier is an identifier corresponding to capability information that the terminal device needs to use; sending a sixth request to the second core network device by using the communication interlace 3603, where the sixth request carries the fifth capability information identifier; receiving a sixth response from the second core network device by using the communication interface 3603, where the sixth response includes the capability information corresponding to the fifth capability information identifier; and sending the capability information corresponding to the fifth capability information identifier to the access network device by using the communication interface 3603.

Optionally, a manner in which the processor 3601 invokes the program code stored in the memory 3602 to send a sixth request to the second core network device by using the communication interface 3603 is specifically: sending the sixth request to the second core network device by using the communication interface 3603 when the capability information corresponding to the fifth capability information identifier does not exist in a preset database of the first core network device, where the preset database stores a p reconfigured mapping relationship between capability information and an identifier. The processor 3601 invokes the program code stored in the memory 3602, to further perform the following step: obtaining the capability information corresponding to the fifth capability information identifier from the preset database when the capability information corresponding to the fifth identifier exists in the preset database, and sending the capability information corresponding to the fifth capability information identifier to the access network device by using the communication interface 3603.

Optionally, the second core network device stores mapping relationships between at least two groups of capability information of the terminal device and identifiers.

Optionally, the processor 3601 invokes the program code stored in the memory 3602, to further perform the following step: storing a mapping relationship between the first capability information and the first capability information identifier.

Optionally, the processor 3601 invokes the program code stored in the memory 3602, to further perform the following steps: receiving a fifth request from the terminal device by using the communication interface 3603, where the fifth request carries a fifth capability information identifier, and the fifth capability information identifier is an identifier corresponding to capability information that the terminal device needs to use; and sending the capability information corresponding to the fifth capability information identifier to the access network device by using the communication interface 3603.

Optionally, the first core network device stores mapping relationships between at least two groups of capability information of the terminal device and identifiers.

Optionally, the processor 3601 invokes the program code stored in the memory 3602, to further perform the following step: allocating a capability information identifier count to the terminal device, where the first response further includes the capability information identifier count.

Optionally, the first request carries an indication indicating that the terminal device supports radio capability signaling.

Based on a same inventive concept, for a principle of resolving a problem by the identifier allocation apparatus and beneficial effects, refer to the implementations and beneficial effects of the method embodiments. Details are not described again.

FIG. 36 is a schematic structural diagram of an identifier allocation apparatus disclosed in an embodiment of (his application. The identifier allocation apparatus may perform a behavior function of the terminal device in the foregoing embodiment of the identifier allocation method. As shown in FIG. 36, the identifier allocation apparatus includes a processor 3601, a memory 3602, and a communication interface 3603. The processor 3601, the memory 3602, and the communication interface 3603 are connected to each other.

The processor 3601 may be a central processing unit (central processing unit, CPU), a general-purpose processor, a coprocessor, a digital signal processor (digital signal processing, DSP), an application-specific integrated circuit (application-specific integrated circuit, ASIC), a field programmable gate array (field programmable gate array, FPGA), or another programmable logical device, a transistor logical device, a hardware component, or any combination thereof. Alternatively, the processor 3601 may be a combination of processors implementing a computing function, for example, a combination of one or more microprocessors, or a combination of the DSP and a microprocessor.

The memory 3602 may include a volatile memory (volatile memory). The memory 3602 may alternatively include a non-volatile memory (non-volatile memory). The memory 3602 may alternatively include a combination of the foregoing types of memories.

The communication interface 3603 is configured to implement communication with another network element.

The processor 3601 invokes program code stored in the memory 3602, to perform the following steps: sending a first request to a first core network device by using the communication interface 3603; and receiving a first response from the first core network device by using the communication interface 3603, where the first response carries a first capability information identifier.

Optionally, the processor 3601 invokes the program code stored in the memory 3602, to further perform the following steps: sending a second request to the first core network device by using the communication interface 3603; and receiving a second response from the first core network device by using the communication interface 3603, where the second response carries a capability information identifier count.

Optionally, the first request carries a first indication, and the first indication is used to set capability information of the terminal device. Optionally, the setting capability information of the terminal device includes an addition operation. Optionally, the first indication is used to indicate to add borage of a group of capability information of the terminal device.

Optionally, the first request carries first capability information of the terminal device.

Optionally, the processor 3601 invokes the program code stored in the memory 3602, to further perform the following steps: receiving a fourth request from an access network device by using the communication interface 3603; and sending first capability information to the access network device by using the communication interface 3603.

Optionally, the terminal device stores a mapping relationship between the first capability information and the first capability information identifier.

Optionally, the processor 3601 invokes the program code stored in the memory 3602, to further perform the following step: sending a fifth request to the first core network device by using the communication interface 3603, where the fifth request carries a fifth capability information identifier, and the fifth capability information identifier is an identifier corresponding to capability information that the terminal device needs to use.

Optionally, the terminal device stores mapping relationships between at least two groups of capability information of the terminal device and identifiers.

Optionally, the first response further carries the capability information identifier count.

Optionally, a manner in which the processor 3601 invokes the program code stored in the memory 3602 to send a first request to a first core network device is specifically: sending the first request to the first core network device by using the communication interface 3603 when no identifier corresponding to the first capability information exists in a preset database of the terminal device, where the preset database stores a preconfigured mapping relationship between capability information and an identifier.

Optionally, the first request carries an indication indicating that the terminal device supports radio capability signaling.

Figure 37:
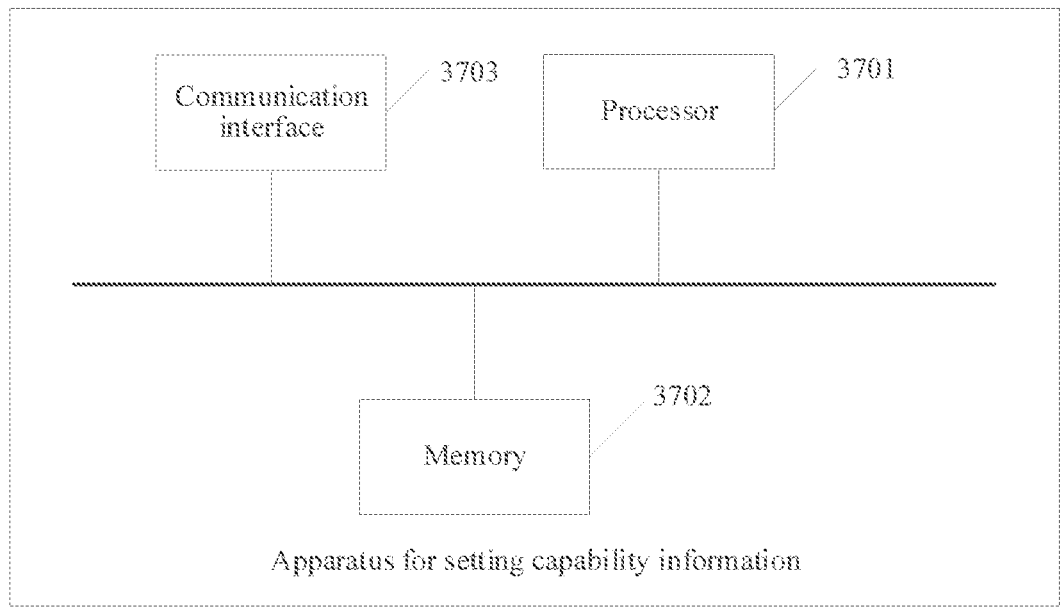
FIG. 37 is a schematic structural diagram of an apparatus for setting capability information according to an embodiment of this application.

FIG. 37 is a schematic structural diagram of an apparatus for setting capability information disclosed in an embodiment of this application. The apparatus for setting capability information may perform a behavior function of the first core network device in the foregoing embodiment of the method for setting capability information. As shown in FIG. 37, the apparatus for setting capability information includes a processor 3701, a memory 3702, and a communication interface 3703. The processor 3701, the memory 3702, and the communication interface 3703 are connected to each other.

The processor 3701 may be a central processing unit (central processing unit, CPU), a general-purpose processor, a coprocessor, a digital signal processor (digital signal processing, DSP), an application-specific integrated circuit (application-specific integrated circuit, ASIC), a field programmable gate array (field programmable gate array, FPGA), or another programmable logical device, a transistor logical device, a hardware component, or any combination thereof. Alternatively, the processor 3701 may be a combination of processors implementing a computing function, for example, a combination of one or more microprocessors, or a combination of the DSP and a microprocessor.

The memory 3702 may include a volatile memory (volatile memory). The memory 3702 may alternatively include a non-volatile memory (non-volatile memory). The memory 3702 may alternatively include a combination of the foregoing types of memories.

The communication interface 3703 is configured to implement communication with another network element.

The processor 3701 invokes program code stored in the memory 3702, to perform the following steps: receiving a first request from a terminal device by using the communication interface 3703, where the first request carries a first indication and a first capability information identifier, and the first indication is used to set capability information of the terminal device; and sending, by the first core network device, a first response to the terminal device.

Optionally, the processor 3701 invokes the program code stored in the memory 3702 to further perform the following steps: receiving a second request from the terminal device by using the communication interlace 3703; allocating a capability information identifier count to the terminal device; and sending a second response to the terminal device by using the communication interface 3703, where the second response carries the capability information identifier count.

Optionally, the setting capability information of the terminal device includes one of an activation operation, an update operation, and a deletion operation. Optionally, when the setting capability information of the terminal device includes the activation operation, the first indication is used to indicate to activate a group of capability information of the terminal device. Optionally, when the setting capability information of the terminal device includes the update operation, the first indication is used to indicate to update a group of capability information of the terminal device. Optionally, when the setting capability information of the terminal device includes the deletion operation, the first indication is used to indicate to delete a group of capability information of the terminal device.

Optionally, the setting capability information of the terminal device includes the activation operation, and the processor 3701 invokes the program code stored in the memory 3702, to further perform the following steps: sending a third request to a second core network device by using the communication interface 3703, where the third request carries the first capability information identifier; receiving a third response from the second core network device by using the communication interlace 3703, where the third response includes first capability information corresponding to the first capability information identifier; and sending the first capability information to an access network device by using the communication interface 3703.

Optionally, the setting capability information of the terminal device includes the update operation, the first request further includes first capability information, and the processor 3701 invokes the program code stored in the memory 3702, to further perform the following steps: sending a fourth request to a second core network device by using the communication interface 3703, where the fourth request carries the first capability information and the first capability information identifier, and the fourth request is used to indicate the second core network device to replace, with the first capability information, capability information corresponding to the first capability information identifier in a mapping relationship between capability information and an identifier; and receiving a fourth response from the second core network device by using the communication interface 3703, where the fourth response carries indication information used to indicate that the update succeeds.

Optionally, the setting capability information of the terminal device includes the update operation, and the processor 3701 invokes the program code stored in the memory 3702, to further perform the following steps: sending a fourth request to an access network device by using the communication interface 3703; and receiving first capability information of the terminal device from the access network device by using the communication interface 3703; sending a sixth request to a second core network device by using the communication interface 3703, where the sixth request carries the first capability information and the first capability information identifier, and the sixth request is used to indicate the second core network device to replace, with the first capability information, capability information corresponding to the first capability information identifier in a mapping relationship between capability information and an identifier; and receiving a sixth response from the second core network device by using the communication interface 3703, where the sixth response carries indication information used to indicate that the update succeeds.

Optionally, the setting capability information of the terminal device includes the deletion operation, and the processor 3701 invokes the program code stored in the memory 3702, to further perform the following steps: sending a seventh request to a second core network device by using the communication interface 3703, where the seventh request carries the first capability information identifier, and the seventh request is used to indicate the second core network device to delete the first capability information identifier and capability information corresponding to the first capability information identifier; and receiving a seventh response from the second core network device by using the communication interface 3703, where the seventh response carries indication information used to indicate that the deletion succeeds.

Optionally, the second core network device stores mapping relationships between at least two groups of capability information of the terminal device and identifiers.

Optionally, the setting capability information of the terminal device includes the activation operation, and the processor 3701 invokes the program code stored in the memory 3702, to further perform the following step: sending first capability information to an access network device by using the communication interface 3703.

Optionally, the setting capability information of the terminal device includes the update operation, the first request further includes first capability information, and the processor 3701 invokes the program code stored in the memory 3702, to further perform the following step: replacing, with the first capability information, capability information corresponding to the first capability information identifier in a mapping relationship between capability information and an identifier.

Optionally, the setting capability information of the terminal device includes the update operation, and the processor 3701 invokes the program code stored in the memory 3702, to further perform the following steps: sending a fourth request to an access network device by using the communication interface 3703; receiving first capability information of the terminal device from the access network device by using the communication interface 3703; and replacing, with the first capability information, capability information corresponding to the first capability information identifier in a mapping relationship between capability information and an identifier.

Optionally, the setting capability information of the terminal device includes the deletion operation, and the processor 3701 invokes the program code stored in the memory 3702, to further perform the following step: deleting She stored first capability information Identifier and capability information corresponding to the first capability information identifier.

Optionally, the first core network device stores mapping relationships between at least two groups of capability information of the terminal device and identifiers.

Optionally, the first request further carries an indication indicating that the terminal device supports radio capability signaling.

FIG. 37 is a schematic structural diagram of an apparatus for setting capability information disclosed in an embodiment of the application. The apparatus for setting capability information may perform a behavior function of the terminal device in the foregoing embodiment of the method for setting capability information. As shown in FIG. 37, the apparatus for setting capability information includes a processor 3701, a memory 3702, and a communication interface 3703. The processor 3701, the memory 3702, and the communication interface 3703 are connected to each other.

The processor 3701 may be a central processing unit (central processing unit, CPU), a general-purpose processor, a coprocessor, a digital signal processor (digital signal processing, DSP), an application-specific integrated circuit (application-specific integrated circuit, ASIC), a field programmable gate array (field programmable gate array, I-PGA), or another programmable logical device, a transistor logical device, a hardware component, or any combination thereof. Alternatively, the processor 3701 may be a combination of processors implementing a computing function, for example, a combination of one or more microprocessors, or a combination of the DSP and a microprocessor.

The memory 3702 may include a volatile memory (volatile memory). The memory 3702 may alternatively include a non-volatile memory (non-volatile memory). The memory 3702 may alternatively include a combination of the foregoing types of memories.

The communication interface 3703 is configured to implement communication with another network element.

The processor 3701 invokes program code stored in the memory 3702, to perform the following steps: sending a first request to a first core network device by using the communication interface 3703, where the first request carries a first indication and a first capability information identifier, and the first indication is used to set capability information of the terminal device; and receiving a first response front the first core network device by using the communication interlace 3703.

Optionally, the processor 3701 invokes the program code stored in the memory 3702, to further perform the following steps: sending a second request to the first core network device by using the communication interface 3703; and receiving a second response by using site communication interface 3703, where the second response carries a capability information identifier count.

Optionally, the setting capability information of the terminal device includes one of an activation operation, an update operation, and a deletion operation. Optionally, when the setting capability information of the terminal device includes the activation operation, the first indication is used to indicate to activate a group of capability information of the terminal device. Optionally, when the setting capability information of the terminal device includes the update operation, the first indication is used to indicate to update a group of capability information of the terminal device. Optionally, when the setting capability information of the terminal device includes She deletion operation, site first indication is used to indicate to delete a group of capability information of the terminal device.

Optionally, the setting capability information of the terminal device includes the update operation, the first request further includes first capability information, and the processor 3701 invokes the program code stored in the memory 3702, to further perform the following step: replacing, with the first capability information, capability information corresponding to the first capability information identifier in a mapping relationship between capability information and an identifier.

Optionally, the setting capability information of the terminal device Includes the update operation, and the processor 3701 invokes the program code stored in site memory 3702, to further perform the following steps: receiving a fifth request from an access network device by using the communication interface 3703; sending first capability information to the access network device by using the communication interface 3703; and replacing, with the first capability information, capability information corresponding to the first capability information identifier in a mapping relationship between capability information and an identifier.

Optionally, the setting capability information of the terminal device includes the deletion operation, and the processor 3701 invokes the program code stored in the memory 3702, to further perform the following step: deleting the first capability information identifier and capability information corresponding to the first capability information identifier.

Optionally, the terminal device stores mapping relationships between at least two groups of capability information of the terminal device and identifiers.

Optionally, the first request further carries an indication indicating that the terminal device supports radio capability signaling.

FIG. 36 is a schematic structural diagram of an identifier allocation apparatus disclosed in an embodiment of this application. The identifier allocation apparatus may perform a behavior function of the first core network device in the foregoing embodiment of the identifier allocation method. As shown in FIG. 36, the identifier allocation apparatus includes a processor 3601, a memory 3602, and a communication interface 3603. The processor 3601, the memory 3602, and the communication interface 3603 are connected to each other.

The processor 3601 may be a central processing unit (central processing unit, CPU), a general-purpose processor, a coprocessor, a digital signal processor (digital signal processing, DSP), an application-specific integrated circuit (application-specific integrated circuit, ASIC), a field programmable gate array (field programmable gate arrays FPGA), or another programmable logical device, a transistor logical device, a hardware component, or any combination thereof. Alternatively, the processor 3601 may be a combination of processors implementing a computing function, for example, a combination of one or more microprocessors, or a combination of the DSP and a microprocessor.

The memory 3602 may include a volatile memory (volatile memory). The memory 3602 may alternatively include a non-volatile memory (non-volatile memory). The memory 3602 may alternatively include a combination of the foregoing types of memories.

The communication interface 3603 is configured to implement communication with another network element.

The processor 3601 invokes program code stored in the memory 3602, to perform the following steps: receiving a first request front a terminal device by using the communication interface 3603, where the first request carries a first globally unique temporary identity allocated by a third core network device to the terminal device; sending a second request to a second core network device by using the communication interface 3603, where the second request carries the first globally unique temporary identity; receiving a second response front the second core network device by using the communication interface 3603, where the second response carries an identifier set and the identifier set includes at least one first capability information identifier allocated by the third core network device to the terminal device; allocating at least one second capability information identifier to the terminal device; sending, by using the communication interface 3603, a correspondence between the second capability information identifier and a first capability information identifier that needs to be replaced to the second core network device; and sending a first response to the terminal device by using the communication interface 3603, where the first response carries the correspondence between the second capability information identifier and the first capability information identifier that needs to be replaced.

Optionally, the processor 3601 invokes the program code stored in the memory 3602, to further perform the following step: determining a capability information identifier count, where the first response further carries the capability information identifier count.

Optionally, a manner in which the processor 3601 invokes the program code stored in the memory 3602 to allocate at least one second capability information identifier to the terminal device is specifically: allocating the at least one second capability information identifier to the terminal device when the first core network device is incapable of identifying a capability information identifier in the identifier set.

Optionally, the first request carries an indication indicating that the terminal device supports radio capability signaling.

FIG. 36 is a schematic structural diagram of an identifier allocation apparatus disclosed in an embodiment of this application. The identifier allocation apparatus may perform a behavior function of the first core network device in the foregoing embodiment of the identifier allocation method. As shown in FIG. 36, the identifier allocation apparatus includes a processor 3601, a memory 3602, and a communication interface 3603. The processor 3601, the memory 3602, and the communication interface 3603 are connected to each other.

The processor 3601 may be a central processing unit (central processing unit, CPU), a general-purpose processor, a coprocessor, a digital signal processor (digital signal processing, DSP), an application-specific integrated circuit (application-specific integrated circuit. ASIC), a field programmable gate array (field programmable gate array, FPGA), or another programmable logical device, a transistor logical device, a hardware component, or any combination thereof. Alternatively, the processor 3601 may be a combination of processors implementing a computing function, for example, a combination of one or more microprocessors, or a combination of the DSP and a microprocessor.

The memory 3602 may include a volatile memory (volatile memory). The memory 3602 may alternatively include a non-volatile memory (non-volatile memory). The memory 3602 may alternatively include a combination of the foregoing types of memories.

The communication interface 3603 is configured to implement communication with another network element.

The processor 3601 invokes program code stored in the memory 3602, to perform the following steps:

receiving, by using the communication interface 3603, a first request sent by a third core network device, where the first request carries an identifier set, and the identifier set includes at least one first capability information identifier allocated by the third core network device to a terminal device; allocating at least one second capability information identifier to the terminal device; sending, by using the communication interface 3603, a correspondence between the second capability information identifier and a first capability information identifier that needs to be replaced to a second core network device; and sending, by using the communication interface 3603, the correspondence between the second capability information identifier and the first capability information identifier that needs to be replaced to the terminal device.

Optionally, the processor 3601 invokes the program code stored in the memory 3602, to further perform the following steps: determining a capability information identifier count; and sending the capability information identifier count to the terminal device by using the communication interface 3603.

Optionally, a manner in which the processor 3601 invokes the program code stored in the memory 3602 to allocate at least, one second capability information identifier to the terminal device is specifically: allocating the at least one second capability information identifier to the terminal device when the first core network device is incapable of identifying a capability information identifier in the identifier set.

FIG. 36 is a schematic structural diagram of an identifier allocation apparatus disclosed in an embodiment of this application. The identifier allocation apparatus may perform a behavior function of the second core network device in the foregoing embodiment of the identifier allocation method. As shown in FIG. 36, the identifier allocation apparatus includes a processor 3601, a memory 3602, and a communication interface 3603. The processor 3601, the memory 3602, and the communication interface 3603 are connected to each other.

The processor 360S may be a central processing unit (central processing unit, CPU), a general-purpose processor, a coprocessor, a digital signal processor (digital signal processing, DSP), an application-specific integrated circuit (application-specific integrated circuit, ASIC), a field programmable gate array (field programmable gate array, FPGA), or another programmable logical device, a transistor logical device, a hardware component, or any combination thereof. Alternatively, the processor 3601 may be a combination of processors implementing a computing function, for example, a combination of one or more microprocessors, or a combination of the DSP and a microprocessor.

The memory 3602 may include a volatile memory (volatile memory). The memory 3602 may alternatively include a non-volatile memory (non-volatile memory). The memory 3602 may alternatively include a combination of the foregoing types of memories.

The communication interface 3603 is configured to implement communication with another network element.

The processor 3601 invokes program code stored in the memory 3602, to perform the following steps:

receiving a first request from a first core network device by using the communication interface 3603, where the first request carries first capability information of a terminal device; and allocating a first capability information identifier to the first capability information; storing a mapping relationship between the first capability information and the first capability information identifier; and sending the first capability information identifier to the terminal device by using the communication interface 3603.

Optionally, tire processor 3601 invokes the program code stored in the memory 3602, to further perform the following steps: determining a capability information identifier count; and sending the capability information identifier count to the terminal device by using the communication interface 3603.

FIG. 36 is a schematic structural diagram of an identifier allocation apparatus disclosed in an embodiment of this application. The identifier allocation apparatus may perform a behavior function of the first core network device in the foregoing embodiment of the identifier allocation method. As shown in FIG. 36, the identifier allocation apparatus includes a processor 3601, a memory 3602, and a communication interface 3603. The processor 3601, the memory 3602, and the communication interface 3603 are connected to each other.

The processor 3601 may be a central processing unit (central processing unit. CPU), a general-purpose processor, a coprocessor, a digital signal processor (digital signal processing, DSP), an application-specific integrated circuit (application-specific integrated circuit, ASIC), a field programmable gate array (field programmable gate array, FPGA), or another programmable logical device, a transistor logical device, a hardware component, or any combination thereof. Alternatively, the processor 3601 may be a combination of processors implementing a computing function, for example, a combination of one or more microprocessors, or a combination of the DSP and a microprocessor.

The memory 3602 may include a volatile memory (volatile memory). The memory 3602 may alternatively include a non-volatile memory (non-volatile memory). The memory 3602 may alternatively include a combination of the foregoing types of memories.

The communication interface 3603 is configured to implement communication with another network element.

The processor 3601 invokes program code stored in the memory 3602, to perform the following steps: receiving a first request from the terminal device by using the communication interface 3603; allocating a first capability information identifier to capability information of the terminal device; and sending a second request to an access network device by using the communication interface 3603, where the second request carries the first capability information identifier.

Optionally, the processor 3601 invokes the program code stored in the memory 3602, to further perform the following steps: receiving a fourth request from the terminal device by using the communication interface 3603; allocating a capability information identifier count to the terminal device; and sending a fourth response to the terminal device by using the communication interface 3603, where the fourth response carries the capability information identifier count.

Optionally, the first request carries a first indication, and the first indication is used to set capability information of the terminal device. Optionally, the setting capability information of the terminal device includes an addition operation. Optionally, the first indication is used to indicate to add storage of a group of capability information of tire terminal device.

Optionally, the processor 3601 invokes the program code stored in She memory 3602, to further perform the following steps: receiving first capability information of the terminal device from the access network device by using the communication interface 3603; and storing a mapping relationship between the first capability information and the first capability information identifier into a second core network device by using the communication interface 603.

Optionally, the processor 3601 invokes the program code stored in the memory 3602, to further perform the following steps: receiving a fifth request from the terminal device by using the communication interface 3603, where the fifth request carries a fifth capability information identifier, and the fifth capability information identifier is an identifier corresponding to capability information that the terminal device needs to use; sending a sixth request to the second core network device by using the communication interface 3603, where the sixth request carries the fifth capability information identifier; receiving a sixth response from the second core network device by using the communication interface 3603, where the sixth response includes the capability information corresponding to the fifth capability information identifier; and sending the capability information corresponding to the fifth capability information identifier to the access network device by using the communication interface 3603.

Optionally, a manner in which the processor 3601 invokes the program code stored in the memory 3602 to send a sixth request to a second core network device is specifically: sending the sixth request to the second core network device by using the communication interface 3603 when tire capability information corresponding to the fifth capability information identifier does not exist in a preset database of the first core network device, where the preset database stores a preconfigured mapping relationship between capability information and an Identifier. The processor 3601 invokes the program code stored in the memory 3602, to further perform the following step: obtaining the capability information corresponding to the fifth capability information identifier from the preset database when the capability information corresponding to the fifth identifier exists in the preset database, and sending the capability information corresponding to the fifth capability information identifier to the access network device by using the communication interface 3603.

Optionally, the second core network device stores mapping relationships between at least two groups of capability information of the terminal device and identifiers.

Optionally, the processor 3601 invokes the program code stored in the memory 3602, to further perform the following steps: receiving first capability information of the terminal device from the access network device by using the communication interface 3603; and storing a mapping relationship between the first capability information and the first capability information identifier.

Optionally, the processor 3601 invokes the program code stored in the memory 3602, to further perform the following steps: receiving a fifth request from the terminal device by using the communication interface 3603, where the fifth request carries a fifth capability information identifier, and the fifth capability information identifier is an identifier corresponding to capability information that the terminal device needs to use; and sending the capability information corresponding to the fifth capability information identifier to the access network device by using the communication interface 3603.

Optionally, the first core network device stores mapping relationships between at least two groups of capability information of the terminal device and identifiers.

Optionally, the processor 3601 invokes the program code stored in the memory 3602, to further perform the following steps: allocating a capability information identifier count to the terminal device; and storing the capability information identifier count, where the second request further includes the capability information identifier count.

Optionally, the first request carries an indication indicating that the terminal device supports radio capability signaling.

FIG. 36 is a schematic structural diagram of an identifier allocation apparatus disclosed in an embodiment of this application. The identifier allocation apparatus may perform a behavior function of the terminal device in the foregoing embodiment of the identifier allocation method. As shown in FIG. 36, the identifier allocation apparatus includes a processor 3601, a memory 3602, and a communication interface 3603. The processor 3601, the memory 3602, and the communication interface 3603 are connected to each other.

The processor 3601 may be a central processing unit (central processing unit, CPU), a general-purpose processor, a coprocessor, a digital signal processor (digital signal processing, DSP), an application-specific integrated circuit (application-specific integrated circuit, ASIC), a field programmable gate array (field programmable gate array, FPGA), or another programmable logical device, a transistor logical device, a hardware component, or any combination thereof. Alternatively, the processor 3601 may be a combination of processors implementing a computing function, for example, a combination of one or more microprocessors, or a combination of the DSP and a microprocessor.

The memory 3602 may include a volatile memory (volatile memory). The memory 3602 may alternatively include a non-volatile memory (non-volatile memory). The memory 3602 may alternatively include a combination of the foregoing types of memories.

The communication interface 3603 is configured to implement communication with another network element.

The processor 3601 invokes the program code stored in the memory 3602, to perform the following steps: sending a first request to a first core network device by using the communication interface 3603; receiving a third request from an access network device by using the communication interface 3603, where the third request carries the first capability information identifier; sending first capability information to the access network device by using the communication interface 3603; and storing a mapping relationship between the first capability information and the first capability information identifier.

Optionally, the processor 3601 invokes the program code stored in the memory 3602, to further perform the following steps: sending a fourth request to the first core network device by using the communication interface 3603; and receiving a fourth response from the first core network device by using the communication interface 3603, where the fourth response carries a capability information identifier count.

Optionally, the first request carries a first indication, and the first indication is used to set capability information of the terminal device. Optionally, the setting capability information of the terminal device includes an addition operation. Optionally, the first indication is used to indicate to add storage of a group of capability information of the terminal device.

Optionally, the processor 3601 invokes the program code stored in the memory 3602, to further perform the following step: sending a fifth request to the first core network device by using the communication interface 3603, where the fifth request carries a fifth capability information identifier, and the fifth capability information identifier is an identifier corresponding to capability information that the terminal device needs to use.

Optionally, the terminal device stores mapping relationships between at least two groups of capability information of the terminal device and identifiers.

Optionally, the third request further carries the capability information identifier count.

Optionally, a manner in which the processor 3601 invokes the program code stored in the memory 3602 to send a first request to a first core network device is specifically: sending the first request to the first core network device by using the communication interface 3603 when no identifier corresponding to She first capability information exists in a preset database of She terminal device, where the preset database stores a preconfigured mapping relationship between capability information and an identifier.

Optionally, the first request carries an indication indicating that the terminal device supports radio capability signaling.

Based on a same inventive concept, for principles of resolving a problem by the identifier allocation apparatus and the apparatus for setting capability information and beneficial effects, refer to the implementations and beneficial effects of the method embodiments. Details are not described again.

It should be noted that, in the foregoing embodiments, the description of each embodiment has respective focuses. For a part that is not described in detail in an embodiment, refer to related descriptions in other embodiments.

A sequence of the steps of the method in the embodiments of the present invention may be adjusted, and specific steps may also be combined or deleted according to an actual requirement.

Modules in the terminal device and the access network device in the embodiments of the present invention may be combined, divided, and deleted according to an actual requirement.

Finally, it should be noted that the foregoing embodiments are merely intended for describing the technical solutions of this application other than limiting this application. Although this application is described in detail with reference to the foregoing embodiments, a person of ordinary skill in the an should understand that they may still make modifications to the technical solutions described in the foregoing embodiments or make equivalent replacements to some or all technical features thereof, without departing from the scope of the technical solutions of the embodiments of this application.

What is claimed is:

1. A method implemented by a terminal device, wherein the method comprises:
sending a first request to a core network device, wherein the first request comprises a first indication indicating to set first capability information and to add storage of a group of capability information of the terminal device;
setting the capability information by performing an addition operation; and
receiving, from the core network device in response to the first request, a first response comprising a first capability information identifier corresponding to first capability information stored on the terminal device.

2. The method of claim 1, further comprising:
sending a second request to the core network device; and
receiving, from the core network device in response to the second request, a second response comprising a capability information identifier count.

3. The method of claim 1, wherein the first request comprises the first capability information.

4. The method of claim 3, further comprising storing a mapping relationship between the first capability information and the first capability information identifier.

5. The method of claim 1, further comprising:
receiving a third request from an access network device; and
sending the first capability information to the access network device in response to the third request.

6. The method of claim 1, further comprising sending, to the core network device, a fourth request comprising a second capability information identifier, wherein the second capability information identifier corresponds to second capability information of the terminal device.

7. The method of claim 1, further comprising storing mapping relationships between at least two groups of capability information of the terminal device and capability information identifiers.

8. The method of claim 1, wherein the first response further comprises a capability information identifier count.

9. The method of claim 1, further comprising sending the first request to the core network device when a preset database of the terminal device does not comprise an identifier corresponding to first capability information, wherein the preset database stores a preconfigured mapping relationship between a plurality of group of capability information and identifiers.

10. The method of claim 1, wherein the first request comprises an indication indicating that the terminal device supports radio capability signaling.

11. A terminal device comprising:
a memory configured to store instructions; and
a processor coupled to the memory, wherein the instructions cause the processor to be configured to:
send a first request to a first core network device, wherein the first request comprises a first indication indicating to set capability information of the terminal device and to add storage of a group of capability information of the terminal device;
set the capability information by performing an addition operation; and
receive, from the first core network device in response to the first request, a first response comprising a capability information identifier corresponding to first capability information stored on the terminal device.

12. The terminal device of claim 11, wherein the instructions cause the processor to be configured to:
send a second request to the core network device; and
receive, from the core network device in response to the second request, a second response comprising a capability information identifier count.

13. The terminal device of claim 11, wherein the first response further comprises a capability information identifier count.

14. The terminal device of claim 11, wherein the first request comprises the first capability information.

15. The terminal device of claim 14, wherein the instructions cause the processor to be configured to store a mapping relationship between the first capability information and the first capability information identifier.

16. The terminal device of claim 11, wherein the instructions cause the processor to be configured to:
receive a third request from an access network device; and
send the first capability information to the access network device in response to the third request.

17. The terminal device of claim 11, wherein the instructions cause the processor to be configured to send, to the core network device, a fourth request comprising a second capability information identifier, wherein the second capability information identifier corresponds to second capability information of the terminal device.

18. A method implemented by a first core network device, wherein the method comprises:
receiving a first request from a terminal device, wherein the first request comprises a first indication indicating to set capability information of the terminal device and to add storage of a group of capability information of the terminal device;
setting the capability information by performing an addition operation;
allocating a capability information identifier to the terminal in response to the first request; and
sending a first response comprising the capability information identifier to the terminal device.

19. The method of claim 18, further comprising:
receiving a second request from the terminal device;
allocating a capability information identifier count to the terminal device in response to the second request; and
sending a second response comprising the capability information identifier count to the terminal device.

20. The method of claim 18, wherein the first request comprises capability information of the terminal device, and wherein the method further comprises allocating the capability information identifier to the capability information.

* * * * *